(12) United States Patent
Schmitt et al.

(10) Patent No.: US 12,250,221 B2
(45) Date of Patent: Mar. 11, 2025

(54) AUTOMATED INFRASTRUCTURE MANAGEMENT FOR COMPUTER SYSTEMS BASED ON SYSTEM RULES, TEMPLATES, AND SYSTEM STATE WITH COUPLING OF A STORAGE RESOURCE TO A PHYSICAL COMPUTE RESOURCE

(71) Applicant: Net-Thunder, LLC, Wheeling, IL (US)

(72) Inventors: Parker John Schmitt, Winnetka, IL (US); Sean Michael Richardson, Chicago, IL (US); Neil Benjamin Semmel, Chicago, IL (US); Cameron Tyler Spry, Clarksville, IN (US)

(73) Assignee: Net-Thunder, LLC, Wheeling, IL (US)

( * ) Notice: Subject to any disclaimer, the term of this patent is extended or adjusted under 35 U.S.C. 154(b) by 0 days.

(21) Appl. No.: 18/606,719

(22) Filed: Mar. 15, 2024

(65) Prior Publication Data

US 2024/0223563 A1 Jul. 4, 2024

Related U.S. Application Data

(63) Continuation of application No. 17/990,264, filed on Nov. 18, 2022, now Pat. No. 11,997,094, which is a
(Continued)

(51) Int. Cl.
*H04L 9/40* (2022.01)
*G06F 3/06* (2006.01)
(Continued)

(52) U.S. Cl.
CPC ............ *H04L 63/10* (2013.01); *G06F 3/0604* (2013.01); *G06F 3/0659* (2013.01);
(Continued)

(58) Field of Classification Search
CPC ....... H04L 63/10; H04L 41/12; G06F 3/0604; G06F 3/0659; G06F 3/0664; G06F 3/067; G06F 9/4416
See application file for complete search history.

(56) References Cited

U.S. PATENT DOCUMENTS 5,787,449 A 7/1998 Vulpe et al.
6,424,991 B1 7/2002 Gish
(Continued)

FOREIGN PATENT DOCUMENTS

CN 109799998 A 5/2019
CN 112840318 A 5/2021
(Continued)

OTHER PUBLICATIONS

Decision to Grant for the JP Application 2020-550052 dated Oct. 24, 2023.
(Continued)

*Primary Examiner* — Tammara R Peyton
(74) *Attorney, Agent, or Firm* — Thompson Coburn LLP

(57) ABSTRACT

Disclosed herein are systems, methods, and apparatuses where a controller can automatically manage a physical infrastructure of a computer system based on a plurality of system rules, a system state for the computer system, and a plurality of templates. Techniques for automatically adding resources such as computer, storage, and/or networking resources to the computer system are described. Also described are techniques for automatically deploying applications and services on such resources. These techniques provide a scalable computer system that can serve as a turnkey scalable private cloud.

56 Claims, 60 Drawing Sheets

Related U.S. Application Data continuation of application No. 17/558,738, filed on Dec. 22, 2021, now Pat. No. 11,533,311, which is a continuation of application No. 16/505,267, filed on Jul. 8, 2019, now Pat. No. 11,212,286, which is a continuation of application No. PCT/US2018/064624, filed on Dec. 7, 2018.

(60) Provisional application No. 62/596,355, filed on Dec. 8, 2017, provisional application No. 62/694,846, filed on Jul. 6, 2018.

(51) Int. Cl.
  G06F 9/4401 (2018.01)
  H04L 41/12 (2022.01)
  G06F 9/455 (2018.01)
  H04L 67/1095 (2022.01)
  H04L 67/1097 (2022.01)

(52) U.S. Cl.
  CPC ............ *G06F 3/0664* (2013.01); *G06F 3/067* (2013.01); *G06F 9/4416* (2013.01); *H04L 41/12* (2013.01); G06F 9/45541 (2013.01); H04L 67/1095 (2013.01); H04L 67/1097 (2013.01)

(56) References Cited

U.S. PATENT DOCUMENTS

| | | |
|---|---|---|
| 6,886,035 B2 | 4/2005 | Wolff |
| 7,222,147 B1 | 5/2007 | Black et al. |
| 7,290,258 B2 | 10/2007 | Steeb et al. |
| 7,401,104 B2 | 7/2008 | Shah et al. |
| 7,636,801 B1 | 12/2009 | Kekre et al. |
| 7,730,259 B2 | 6/2010 | Taguchi et al. |
| 7,756,954 B2 | 7/2010 | Schmidt et al. |
| 8,146,091 B2 | 3/2012 | Johnson et al. |
| 8,171,174 B2 | 5/2012 | Lambert et al. |
| 8,219,724 B1 | 7/2012 | Caruso et al. |
| 8,234,515 B2 | 7/2012 | Collier et al. |
| 8,312,449 B2 | 11/2012 | Dawson et al. |
| 8,356,088 B2 | 1/2013 | Montagna et al. |
| 8,522,005 B2 | 8/2013 | Mahmoud et al. |
| 8,627,309 B2 | 1/2014 | Scheidel et al. |
| 8,731,991 B2 | 5/2014 | Altuwaijri et al. |
| 8,745,216 B2 | 6/2014 | Pasala et al. |
| 8,819,650 B2 | 8/2014 | Barcia et al. |
| 8,898,763 B1 | 11/2014 | Mannepalli et al. |
| 8,918,848 B2 | 12/2014 | Sharma et al. |
| 8,966,198 B1 | 2/2015 | Harris et al. |
| 9,135,269 B2 | 9/2015 | Shetty et al. |
| 9,148,465 B2 | 9/2015 | Gambardella et al. |
| 9,164,800 B2 | 10/2015 | Alicherry et al. |
| 9,317,268 B2 | 4/2016 | Levijarvi |
| 9,318,108 B2 | 4/2016 | Gruber et al. |
| 9,350,623 B2 | 5/2016 | Shadi et al. |
| 9,350,632 B2 | 5/2016 | Skerry et al. |
| 9,495,371 B2 | 11/2016 | Fortune et al. |
| 9,501,233 B2 | 11/2016 | Harris et al. |
| 9,639,402 B2 | 5/2017 | Dochez |
| 9,641,394 B2 | 5/2017 | Jubran et al. |
| 9,654,599 B1 | 5/2017 | Wheeler et al. |
| 9,819,540 B1 | 11/2017 | Bahadur et al. |
| 10,038,494 B1 | 7/2018 | Paraschis et al. |
| 10,044,517 B2 | 8/2018 | Huang et al. |
| 10,044,522 B1 | 8/2018 | Shamis et al. |
| 10,122,596 B2 | 11/2018 | Mordani et al. |
| 10,127,055 B2 | 11/2018 | Shih |
| 10,223,262 B2 | 3/2019 | Long et al. |
| 10,257,254 B2 | 4/2019 | Lee |
| 10,282,211 B2 | 5/2019 | Parmar et al. |
| 10,320,897 B2 | 6/2019 | Lucas et al. |
| 10,474,488 B2 | 11/2019 | Aleksandrov et al. |
| 10,481,949 B2 | 11/2019 | Dobrev |
| 10,567,231 B2 | 2/2020 | Maes |
| 10,567,308 B1 | 2/2020 | Subbiah et al. |
| 10,664,348 B2 | 5/2020 | Johnson et al. |
| 10,740,133 B2 | 8/2020 | Singh et al. |
| 10,754,708 B2 | 8/2020 | Chaganti et al. |
| 10,826,770 B2 | 11/2020 | Sethi et al. |
| 10,826,941 B2 | 11/2020 | Jain et al. |
| 10,855,537 B2 | 12/2020 | Tembey et al. |
| 10,868,845 B2 | 12/2020 | Ithal et al. |
| 10,877,972 B1 | 12/2020 | Althouse |
| 10,909,553 B1 | 2/2021 | Schulte et al. |
| 10,942,720 B1 | 3/2021 | Nejad et al. |
| 10,949,237 B2 | 3/2021 | Piwonka et al. |
| 10,951,529 B2 | 3/2021 | Duan et al. |
| 10,977,071 B2 | 4/2021 | Gaurav et al. |
| 11,016,799 B1 | 5/2021 | Kim |
| 11,023,301 B1 | 6/2021 | Hornbeck |
| 11,061,739 B2 | 7/2021 | Staffelbach et al. |
| 11,132,226 B2 | 9/2021 | Jadhav et al. |
| 11,134,104 B2 | 9/2021 | Qureshi et al. |
| 11,144,398 B2 | 10/2021 | Wilding |
| 11,153,173 B1 | 10/2021 | Rebeja |
| 11,212,286 B2 | 12/2021 | Schmitt et al. |
| 11,237,837 B2 | 2/2022 | Gore et al. |
| 11,244,261 B2 | 2/2022 | To et al. |
| 11,258,777 B2 | 2/2022 | Stöhr et al. |
| 11,275,570 B1 | 3/2022 | Collins et al. |
| 11,281,452 B2 | 3/2022 | Liljeback et al. |
| 11,314,521 B2 | 4/2022 | Bhaskar et al. |
| 11,354,101 B2 | 6/2022 | Collins et al. |
| 11,360,807 B2 | 6/2022 | Azhakesan Sujatha et al. |
| 11,367,140 B2 | 6/2022 | Mehedy et al. |
| 11,385,905 B2 | 7/2022 | Aghaiepour et al. |
| 11,409,619 B2 | 8/2022 | Gopalan et al. |
| 11,422,894 B2 | 8/2022 | Wilding |
| 11,442,781 B2 | 9/2022 | McBrearty |
| 11,449,354 B2 | 9/2022 | Fu et al. |
| 11,469,942 B2 | 10/2022 | Reid et al. |
| 11,474,915 B2 | 10/2022 | Killadi et al. |
| 11,481,251 B2 | 10/2022 | Wilding |
| 11,489,720 B1 | 11/2022 | Kempanna et al. |
| 11,500,669 B2 | 11/2022 | Kumar et al. |
| 11,507,462 B2 | 11/2022 | Wilding |
| 11,513,786 B2 | 11/2022 | Juang et al. |
| 11,516,881 B2 | 11/2022 | Shimojou et al. |
| 11,522,814 B2 | 12/2022 | Guendert et al. |
| 11,528,186 B2 | 12/2022 | Atur et al. |
| 11,528,613 B2 | 12/2022 | Sathaye et al. |
| 11,533,311 B2 | 12/2022 | Schmitt et al. |
| 11,544,410 B2 | 1/2023 | Peschka |
| 11,573,820 B2 | 2/2023 | Kim |
| 11,606,420 B1 | 3/2023 | Gilani et al. |
| 11,609,985 B1 | 3/2023 | Shemesh et al. |
| 11,637,910 B2 | 4/2023 | Bathla et al. |
| 11,706,127 B2 | 7/2023 | Michael et al. |
| 11,997,094 B2 | 5/2024 | Schmitt et al. |
| 2002/0116485 A1 | 8/2002 | Black et al. |
| 2006/0070056 A1 | 3/2006 | Watson et al. |
| 2006/0271677 A1* | 11/2006 | Mercier ............... H04L 63/1433 709/224 |
| 2007/0100656 A1 | 5/2007 | Brown |
| 2007/0162810 A1 | 7/2007 | Sato et al. |
| 2007/0180490 A1 | 8/2007 | Renzi et al. |
| 2007/0239944 A1 | 10/2007 | Rupanagunta et al. |
| 2007/0245142 A1 | 10/2007 | Rios et al. |
| 2007/0266136 A1 | 11/2007 | Esfahany et al. |
| 2008/0040455 A1 | 2/2008 | Macleod et al. |
| 2008/0098321 A1 | 4/2008 | Krithivas |
| 2008/0127172 A1 | 5/2008 | Dawson et al. |
| 2008/0201707 A1 | 8/2008 | Lavery et al. |
| 2008/0276033 A1 | 11/2008 | DeCenzo et al. |
| 2009/0113195 A1 | 4/2009 | Mohrmann et al. |
| 2009/0113198 A1 | 4/2009 | Liu et al. |
| 2010/0110933 A1 | 5/2010 | Wilcock et al. |
| 2010/0115490 A1 | 5/2010 | Wilcock et al. |
| 2010/0262680 A1 | 10/2010 | Song et al. |
| 2010/0287363 A1 | 11/2010 | Thorsen |
| 2010/0313185 A1 | 12/2010 | Gupta et al. |

(56) References Cited

U.S. PATENT DOCUMENTS

| | | | |
|---|---|---|---|
| 2010/0318999 A1* | 12/2010 | Zhao | G06F 9/5044 718/104 |
| 2011/0110236 A1 | 5/2011 | Kadambi et al. | |
| 2011/0173328 A1 | 7/2011 | Park et al. | |
| 2011/0252072 A1 | 10/2011 | Johnson et al. | |
| 2011/0320236 A1 | 12/2011 | Altuwaijri et al. | |
| 2012/0030442 A1 | 2/2012 | Nakanishi et al. | |
| 2012/0089726 A1 | 4/2012 | Doddavula | |
| 2012/0324069 A1 | 12/2012 | Nori et al. | |
| 2012/0331519 A1 | 12/2012 | Yu et al. | |
| 2013/0014107 A1 | 1/2013 | Kirchhofer | |
| 2013/0074068 A1 | 3/2013 | Ciano et al. | |
| 2013/0132561 A1 | 5/2013 | Pasala et al. | |
| 2013/0205292 A1 | 8/2013 | Levijarvi | |
| 2013/0232463 A1 | 9/2013 | Nagaraja et al. | |
| 2013/0283263 A1 | 10/2013 | Elemary | |
| 2013/0297772 A1 | 11/2013 | Ashok et al. | |
| 2014/0215030 A1 | 7/2014 | Terwilliger et al. | |
| 2014/0317293 A1 | 10/2014 | Shatzkamer | |
| 2015/0039871 A1 | 2/2015 | Shetty et al. | |
| 2015/0124815 A1 | 5/2015 | Beliveau et al. | |
| 2015/0186124 A1 | 7/2015 | Hoy et al. | |
| 2015/0207625 A1 | 7/2015 | Sathaye et al. | |
| 2016/0026457 A1 | 1/2016 | Scheidel et al. | |
| 2017/0003950 A1 | 1/2017 | Newell et al. | |
| 2017/0020154 A1 | 1/2017 | Fu et al. | |
| 2017/0317881 A1 | 11/2017 | Smartt et al. | |
| 2018/0060051 A1 | 3/2018 | Ramalingam et al. | |
| 2018/0165071 A1 | 6/2018 | Raghavan et al. | |
| 2018/0191856 A1 | 7/2018 | Chang et al. | |
| 2018/0246747 A1 | 8/2018 | Asayag et al. | |
| 2019/0018760 A1 | 1/2019 | Webb et al. | |
| 2019/0073372 A1 | 3/2019 | Venkatesan et al. | |
| 2019/0188094 A1 | 6/2019 | Ramamoorthi et al. | |
| 2019/0203999 A1 | 7/2019 | Kulankara | |
| 2019/0303213 A1 | 10/2019 | Chaganti et al. | |
| 2020/0013107 A1 | 1/2020 | Kusano | |
| 2020/0019516 A1 | 1/2020 | Sobolewski et al. | |
| 2020/0036593 A1 | 1/2020 | Sethi et al. | |
| 2020/0159573 A1 | 5/2020 | Dobrev | |
| 2020/0169467 A1 | 5/2020 | Maes | |
| 2020/0278920 A1 | 9/2020 | Khakare et al. | |
| 2021/0011816 A1 | 1/2021 | Mitkar et al. | |
| 2021/0117083 A1 | 4/2021 | Gallant et al. | |
| 2021/0357246 A1 | 11/2021 | Kumar et al. | |
| 2022/0032143 A1 | 2/2022 | Ho et al. | |
| 2022/0116394 A1 | 4/2022 | Schmitt et al. | |
| 2022/0269494 A1 | 8/2022 | Malleni | |
| 2023/0034901 A1 | 2/2023 | Kita et al. | |
| 2023/0057210 A1 | 2/2023 | Kita et al. | |
| 2023/0073891 A1 | 3/2023 | Wang et al. | |

FOREIGN PATENT DOCUMENTS

| | | |
|---|---|---|
| CN | 113065314 A | 7/2021 |
| CN | 113900670 A | 1/2022 |
| CN | 112162756 B | 4/2022 |
| CN | 112579256 B | 4/2022 |
| CN | 116450301 A | 7/2023 |
| EP | 3361700 A1 | 8/2018 |
| EP | 3343878 B1 | 7/2019 |
| JP | 2005100387 A | 4/2005 |
| JP | 2012048330 A | 3/2012 |
| JP | 2014524608 A | 9/2014 |
| JP | 2015512079 A | 4/2015 |
| JP | 2015170344 A | 9/2015 |
| JP | 20210100 A | 1/2021 |
| KR | 102382317 B1 | 4/2022 |
| TW | 201308073 A | 2/2013 |
| TW | 201733314 A | 9/2017 |
| TW | I774529 B | 8/2022 |
| TW | I776612 B | 9/2022 |
| WO | 2010114855 A1 | 10/2010 |
| WO | 2021152375 A1 | 8/2021 |
| WO | 2021171211 A1 | 9/2021 |

OTHER PUBLICATIONS

Ebina, "Nikkei Systems", Nikkei, ISSN 1881-1620, Apr. 26, 2014, pp. 70-75, No. 253, Japan.

International Preliminary Report on Patentabiity for PCT Application PCT/US2018/064624, dated Jun. 9, 2020.

International Search Report and Written Opinion for PCT Application PCT/US2018/064624, dated Apr. 8, 2019.

Prosecution History for U.S. Appl. No. 16/505,267, filed Jul. 8, 2019, now U.S. Pat. No. 11,212,286, granted Dec. 28, 2021.

Prosecution History for U.S. Appl. No. 17/558,738, filed Dec. 22, 2021, now U.S. Pat. No. 11,533,311, granted Dec. 20, 2022.

Van Vugt, "Pro Linux High Availability Clustering", 2014, 154 pages, Apress.

Vanbrabant et al. "Integrated Management of Network and Security Devices in IT Infrastructures", Network and Service Management (CNSM), 2011 7th International Conference on, IEEE, Oct. 24, 2011, pp. 1-5.

Prosecution History for U.S. Appl. No. 17/990,264, now U.S. Pat. No. 11,997,094, filed Nov. 18, 2022.

* cited by examiner

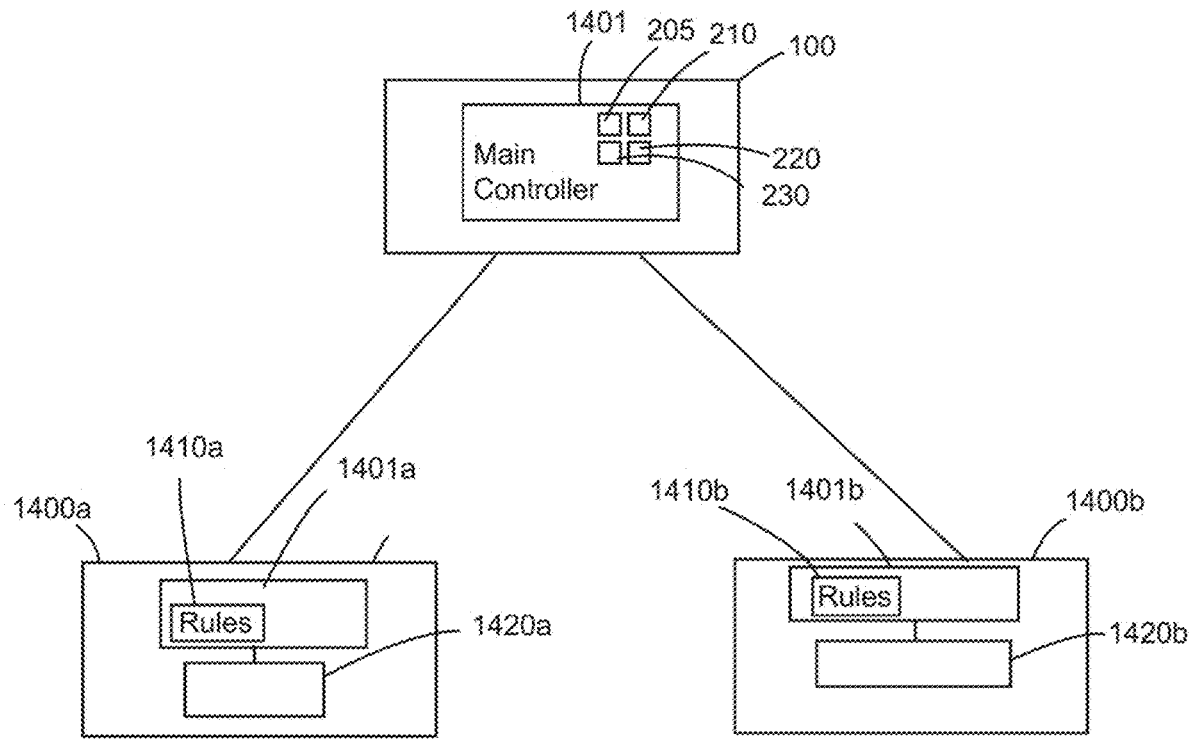
Fig. 14A
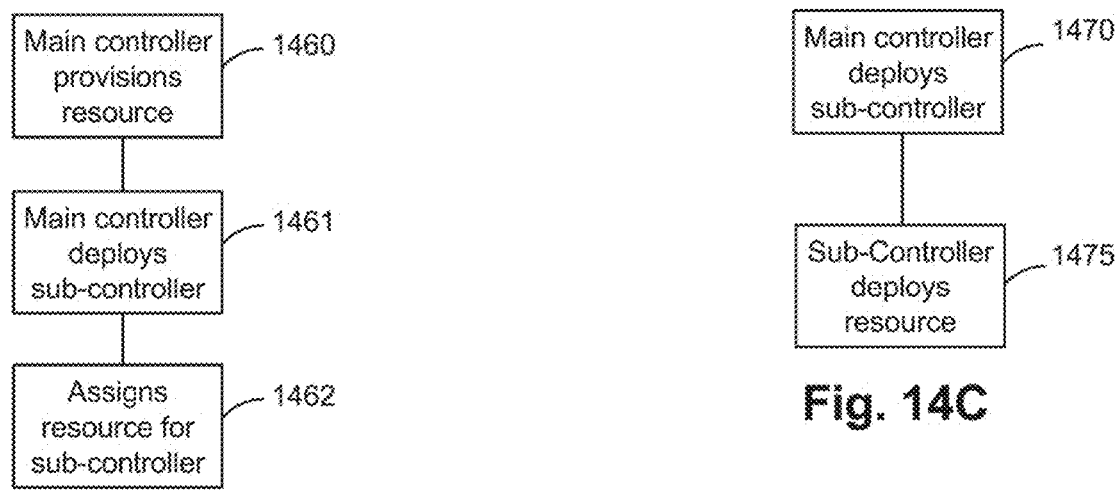
Fig. 14B
Fig. 14C

```
/-----------------------------\
| Volatile Layer (LV)   (RW) |
+-----------------------------+
| Service Layer         (RO) |
+-----------------------------+
| Platform Layer        (RO) |
\-----------------------------/
```

Figure 19

```
/
+-- platform/
   +-- bin/
   +-- .../
+-- service/
   +-- data/ [optional]
   +-- bin/
   +-- ...
+-- volatile
   +-- work/
   +-- root/
      +-- bin/
      +-- data/ [if present in /service/]
      +-- ...
   +-- new_root/
   +-- ...
```

Figure 20

AUTOMATED INFRASTRUCTURE MANAGEMENT FOR COMPUTER SYSTEMS BASED ON SYSTEM RULES, TEMPLATES, AND SYSTEM STATE WITH COUPLING OF A STORAGE RESOURCE TO A PHYSICAL COMPUTE RESOURCE

CROSS-REFERENCE AND PRIORITY CLAIM TO RELATED PATENT APPLICATIONS

This patent application is a continuation of U.S. patent application Ser. No. 17/990,264, filed Nov. 18, 2022, and entitled "Automatically Deployed Information Technology (IT) System and Method", now U.S. Pat. No. 11,997,094, which is a continuation of U.S. patent application Ser. No. 17/558,738, filed Dec. 22, 2021, and entitled "Automatically Deployed Information Technology (IT) System and Method", now U.S. Pat. No. 11,533,311, which is a continuation of U.S. patent application Ser. No. 16/505,267, filed Jul. 8, 2019, and entitled "Automatically Deployed Information Technology (IT) System and Method", now U.S. Pat. No. 11,212,286, which (1) is a continuation of PCT patent application PCT/US18/64624, filed Dec. 7, 2018, and entitled "Automatically Deployed Information Technology (IT) System and Method", which claims priority to (i) U.S. provisional patent application 62/596,355, filed Dec. 8, 2017, and entitled "Automatically Deployed Information Technology (IT) System and Method", and (ii) U.S. provisional patent application 62/694,846, filed Jul. 6, 2018, and entitled "Automatically Deployed Information Technology (IT) System and Method", and (2) claims priority to U.S. provisional patent application 62/694,846, filed Jul. 6, 2018, and entitled "Automatically Deployed Information Technology (IT) System and Method", the entire disclosures of each of which are incorporated herein by reference

INTRODUCTION

Demands, uses and needs for computing have skyrocketed over the last several decades. Along with it demands for greater storage, speed, computing capability, applications, accessibility, have resulted in a rapidly changing field of computing, providing tools to entities of a variety of types and sizes. As a result, the use of public virtual computing and cloud computing systems have developed to provide greater computing resources for a multitude of users and types of users. This exponential growth is expected to continue. At the same time greater failure and security risks have made infrastructure set-up, management, change management, updating more complicated and costly. Scalability, or growing a system over the course of time, has become a major challenge in the field of information technology as well.

Problems in most IT systems, many relating to performance and security, may be difficult to diagnose and address. Constraints on time and resources allowed to set up, configure and deploy a system may lead to error and result in future IT problems. Over time a number of different administrators may be involved in changing, patching or updating IT systems including users, applications, services, security, software and hardware. Often documentation and history of configuration and changes may be inadequate or get lost making it difficult to understand at a later time how a particular system has been configured and works. This may make future changes or trouble shooting difficult. IT configurations and settings may be difficult to recover and reproduce when problems or failures arise. In addition, system administrators can easily make mistakes, for example incorrect commands or other mistakes, which in turn may bring down computer and web databases and services. Furthermore, while increased risks of security breaches are commonplace, changes, updates, patches to avoid the security breaches may cause undesirable downtime.

Once critical infrastructure is in place, working, and live, the cost or risk often may seem to outweigh the benefit of changing the system. The problems involved in making changes to live IT systems or environments can create substantial and at times catastrophic problems for users or entities that rely on these systems. At the very least, the amount of time it takes to trouble shoot and fix failures or problems occurring during change management may require substantial resources of time, personnel and money. The technical problems potentially created when changes are made to live environments can have cascading effects and may not be solved solely by undoing the changes made. Many of these issues contribute to inability to expeditiously rebuild a system if there are failures during the change management.

Furthermore, a bare metal cloud node or resource within an IT system may be vulnerable to security issues, compromised, or accessed by a rogue user. A hacker, attacker or rogue user may pivot off of that node or resource to access or hack into any other portions of the IT system or networks coupled to the node. A baremetal cloud node or a controller of an IT system may also be vulnerable through a resource connected to an applications network that may expose system to security threats or otherwise compromise the system. According to various example embodiments disclosed herein, an IT system may be configured to improve security in bare metal cloud nodes or resources interfacing the internet or from application networks whether or not connected to an external network.

According to example embodiments, an IT system comprises a bare metal cloud node or physical resource. When the bare metal cloud node or physical resource is turned on, set up, managed or used, if it may be connected to a network with nodes that other people or customers may be using, the in band management may be omitted, switchable, disconnectable or filtered from the controller. In addition, an application or applications network within a system may be disconnected, disconnectable, switchable, or filtered from the controller by way of resource(s) to which the application network is coupled to a controller.

A physical resource that comprises a virtual machine or hypervisor may also be vulnerable to security issues, compromised or accessed by a rogue user where the hypervisor may be used to pivot to another hypervisor that is a shared resource. An attacker may break out of the virtual machine and may have network access to management and or administration systems by way of the controller. According to various example embodiments disclosed herein the IT system may be configured to improve security where one or more physical resources that comprise a virtual resource on a cloud platform may disconnected, disconnectable, filtered, filterable or not connected to a controller by way of in-band management connection.

According to example embodiments, a physical resource of an IT system may comprise one or more virtual machines or hypervisors where the in band management connection between the controller and the physical resource may be omitted, disconnected, disconnectable or filtered/filterable from the resource.

BRIEF DESCRIPTION OF THE DRAWINGS

FIG. 14A shows an example system where a main controller has deployed controllers on different systems.

FIGS. 14B and 14C show example flows illustrating possible steps to provision a controller with a main controller.

FIG. 19 shows an OverlayFS configuration.

FIG. 20 shows a Kernel Filesystem layout.

DETAILED DESCRIPTION OF EXAMPLE EMBODIMENTS

Figure 1:
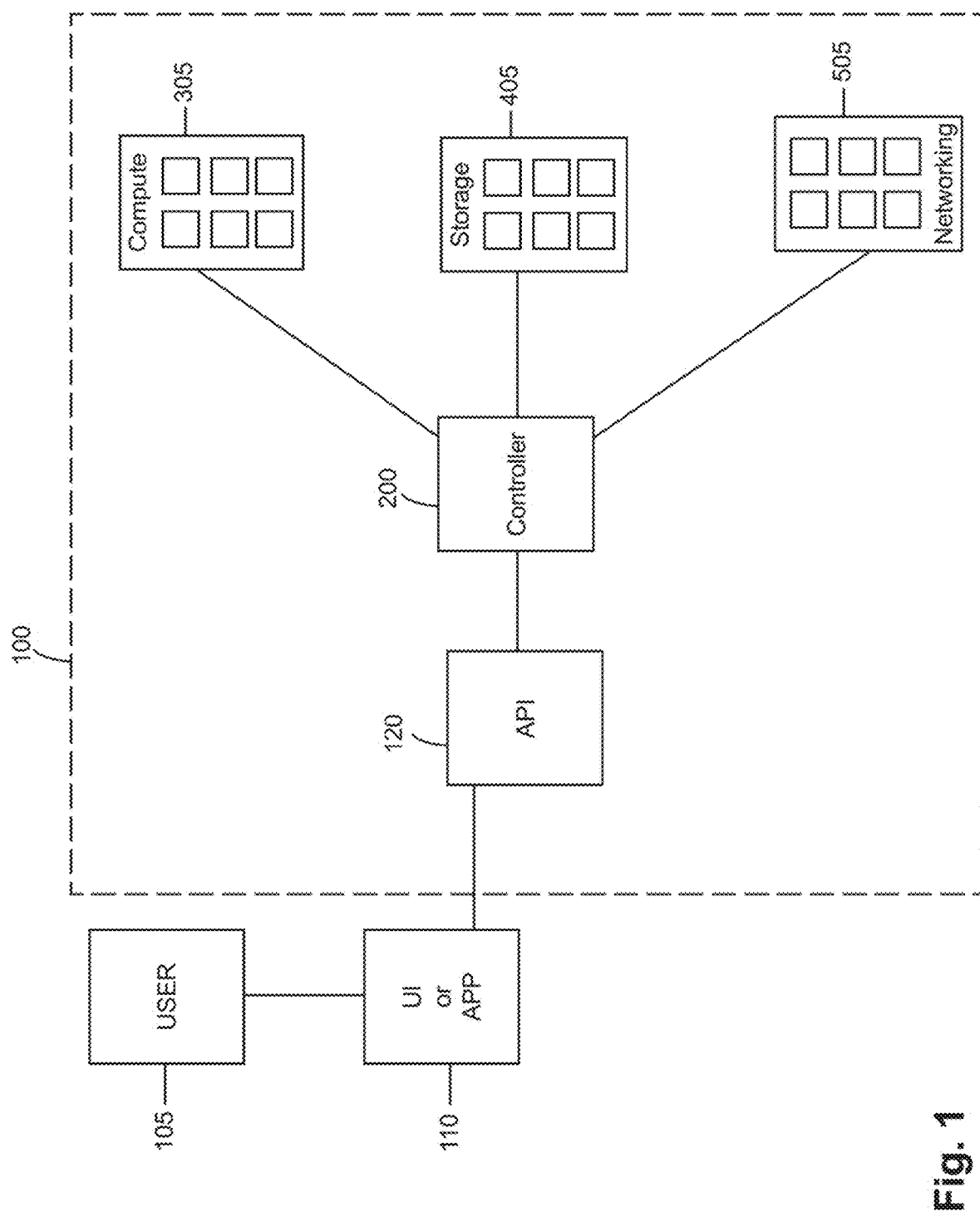
FIG. 1 is a schematic illustration of a system according to an example embodiment.

In an effort to provide technical solutions to needs in the art as discussed above, the inventors disclose a variety of inventive embodiments relating to systems and methods for information technology that provide automated IT system set up, configuration, maintenance, testing, change management and/or upgrade. For example, the inventors disclose a controller that is configured to automatically manage a computer system based on a plurality of system rules, a system state for the computer system, and a plurality of templates. As another example, the inventors disclose a controller that is configured to automatically manage physical infrastructure for a computer system based on a plurality of system rules, a system state for the computer system, and a plurality of templates. Examples of automated management that can be performed by the controller may include remotely or locally accessing and changing settings or other information on computers that may run an application or service, building an IT system, changing an IT system, building an individual stack in an IT system, creating a service or application, loading a service or application, configuring a service or application, migrating a service or application, changing a service or application, removing a service or application, cloning a stack onto another stack on a different network, creating, adding, removing, setting up, configuring, reconfiguring and/or changing a resource or system component, automatically adding, removing, and/or reverting a resource, service, application, IT system, and/or IT stack, configuring the interaction between applications, services, stacks, and/or other IT systems, and/or monitoring the health of IT system components. In example embodiments, the controller can be embodied as a physical or virtual computing resource that can be remote or local. Additional examples of controllers that can be employed include but are not limited to one of or any of a combination of processes, virtual machines, containers, remote computing resources, applications deployed by other controller, and/or services. The controller may be distributed across multiple nodes and/or resources, and may be in other locations or networks.

IT infrastructure is most often constructed from discrete hardware and software components. Hardware components used generally comprises servers, racks, power supply equipment, interconnection, display monitors, and other communication equipment. The methods and techniques of selecting and then interconnecting these discrete components are highly complex with extremely large numbers of optional configurations that will function with varying degrees of efficiency, cost effectiveness, performance, and security. Individual technicians/engineers that are skilled at connecting these infrastructure components are expensive to hire and train. In addition, the extremely large number of possible iterations of hardware and software create complexity in maintaining and updating the hardware and software. This has created additional challenges when the individuals and/or engineering companies that originally installed the IT Infrastructure are not available to perform the updating. Software components such as operating systems are designed either generically to work on a broad scope of hardware or are very specialized to specific components. In most cases a complex plan, or blue print, is drawn up and executed. Changes, growth, scaling, and other challenges require that the complex plan be updated.

While some IT users purchase cloud computing services from a growing industry of suppliers, this does not resolve the problems and challenges of setting up infrastructure, but rather shifts them from the IT user to the cloud service provider. Furthermore, large cloud service providers have addressed the challenges and problems of setting up infrastructure in a manner that may reduce flexibility, customization, scalability and rapid adoption of new hardware and software technologies. In addition cloud computing services do not provide out of the box bare-metal set up, configuration deployment and updating or allow for transition to, from or between bare-metal and virtual IT infrastructure components. These and other limitation of cloud computing services may lead to a number of computing, storage and networking inefficiencies. For example, speed or latency inefficiencies in computing and networking may be presented by cloud services or in applications or services utilizing cloud services.

The system and method of an example embodiment provide a novel and unique IT infrastructure deployment, use and management. According to an example embodiment, the complexity of resource choice, installation, interconnections, management and updates are rooted within the core controller system and its parameter files, templates, rules, and IT system state. The system comprises a set of self-assembly rules and operating rules configured so that components self-assemble rather than requiring a technician to assemble, connect, and manage. Further the system and methods of an example embodiment allow greater customization, scalability, and flexibility using rules of self-assembly without requiring a currently typical external planning document. They also allow for efficient resource usage and repurposing.

A system and method are provided that ameliorate many of the issues and problems in current IT systems whether physical or virtual in whole in part. The system and method of an example embodiment allow flexibility, reduce variability and human error, and provide a structure with potential for increased system security.

While some solutions may exist individually for one or more of the problems in current IT systems, such solutions do not comprehensively address a multitude of the problems as are solved by example embodiments described herein. Furthermore such existing solutions may address a particular problem while compounding the others.

Some of the current challenges addressed include, but are not limited to, issues related to the set-up, configuring, infrastructure deployment, asset tracking, security, application deployment, service deployment, documentation for maintenance and compliance, maintenance, scaling, resource allocation, resource management, load balancing, software failures, updating/patching software and security, testing, recovering IT systems, change management, and hardware updates.

IT systems as used herein may include but are not limited to: servers, virtual and physical hosts, databases and database applications including but not limited to IT services, business computing services, computer applications, customer facing applications, web applications, mobile applications, back-ends, case number management, customer tracking, ticketing, business tools, desk top management tools, accounting, e-mail, documentation, compliance, data storage, back-ups, and/or network management.

One problem users may face prior to setting up IT systems is predicting infrastructure needs. The user might not know how much storage, compute power, or other requirements will be needed either initially or over time during growth or change. According to an example embodiment an IT system and infrastructure allow flexibility in that if system needs change, the self-deploying infrastructure (both physical and/or virtual) of an example embodiment may be used to automatically add, remove, or reallocate from within the infrastructure at a later time. Thus, the challenge of predicting future needs presented when setting up a system is addressed by providing the ability to add on to the system using its global rules, templates, and system state and by tracking the changes of such rules, templates and the system state.

Other challenges may also relate to correct configuration, uniformity of configuration, interoperability, and/or interdependency, which may include, for example, future incompatibilities due to changes to configured system elements or configurations thereof over time. For example when the IT system is initially set up, there may be missing elements or a failure to configure some elements. And, for example when iterations of elements or infrastructure components are set up there may be a lack of uniformity between the iterations. Configuration may need to be revamped when changes to a system are made. A difficult choice has been presented between optimal configuration versus flexibility with future infrastructure changes. According to an example embodiment when first deploying a system, configuration is self-deployed using global system rules from templates to the infrastructure components so the configuration is uniform, repeatable or predictable allowing for optimal configuration. Such initial system deployment may be done on physical components while subsequent components may be added or modified and which may or may not be physical. Further, such initial system deployment may be done on physical components while subsequent environments may be cloned from the physical structure and may or may not be physical. This allows the system configuration to be optimal while permitting minimally disruptive future changes.

In the deployment phase, there are typically challenges of interoperability of bare-metal and/or software defined infrastructure. There may also be challenges of interoperability of software with other applications, tools or infrastructure. These may include but are not limited to challenges due to deployed products originating from different vendors. Inventors disclose an IT system that may provide interoperability of infrastructure regardless of whether bare-metal, virtual or any combination thereof. Accordingly, the interoperability, the ability of the parts to work together, may be built into the disclosed infrastructure deployment where the infrastructure is automatically configured and deployed. For example, different applications may depend on each other, and they may exist on separate hosts. To allow for such applications to interact with each other, the controller logic, templates, system state, and system rules as discussed herein contain the information and configuration instructions to be used for configuring the applications' interdependencies and track the interdependencies. Thus, the infrastructural features discussed herein provide a way to manage how each application or service talks to one another. As examples, making sure that email services communicate properly with authentication services; and/or making sure groupware services communicate properly with email services. Further still, such management can go down to the infrastructure level to permit tracking of how compute resources are communicating with storage resources, for example. Otherwise, complexity in IT systems can rise with $O(n'')$.

According as disclosed, automatic deployment of resources does not necessitate preconfiguring the operating system software due to the controller's ability to deploy based on global system rules, templates, and IT system state/system self-knowledge. According to an example embodiment, a user or IT professional may not need to know if the addition, allocation or reallocation of the resources will work together in order to ensure interoperability. Additional resources according to an example embodiment may be added to a network automatically.

Using applications requires many different resources typically including compute, storage and networking. It also requires interoperability of the resources and system components, including knowledge of what is in place and running and interoperability with other applications. Applications may need to connect to other services and get configuration files and make sure every component works together properly. Application configuring can therefore be time and resource intensive. Application configuring can lead to cascading effects with the rest of the infrastructure if there are problems of interoperability with other applications. This can lead to outages or breaches. The inventors disclose automated application deployment to address these issues. Accordingly, as disclosed by the inventors, applications may be made self-deploying by reading from the IT system state, global system rules and templates, using knowledge of what is going on the system and intelligently configuring. Furthermore, according to an example embodiment pre-deployment testing of configuration may be performed using change management features as described herein.

Another issue addressed by an example embodiment concerns problems that may arise relating to intermediary configurations where it is desired to switch to a different vendor or to other tools. According to an aspect of an example embodiment, template translation is provided between rules and templates of the controller and an application template from a particular vendor. This allows the system to change vendors of software or other tools automatically.

Many security issues arise from misconfigurations, failure to patch, and inability to test patching prior to deployment. Often security issues may be created at the configuration stage of set-up. For example misconfigurations may leave sensitive applications exposed to the internet or allow forged emails from an email server The inventors disclose a system set up that is automatically configured thereby protecting against attackers avoiding unnecessary exposure to attackers and providing greater knowledge of the system to security engineers and application security architects. The automation reduces security flaws due to human error or misconfigurations. In addition, the disclosed infrastructure provides introspection between services and may allow rule based access and limit communications between services to only those that actually need to have it. The inventors disclose a system and method with the ability to safely test patches prior to deployment for example as discussed with respect to change management.

Documentation frequently is a problematic area of IT management. During set up and configuration, a primary goal may typically be to get the components working together. Typically this involves troubleshooting and a trial and error process where at times, it is difficult to know what actually made a system work. While the exact commands as executed are typically documented, the troubleshooting or trial and error process that may have achieved a working system often is not well documented or even documented at all. Problems or inadequacies in documentation may create problems with audit trails and auditing. The documentation problems that arise may create problems in showing compliance. Often compliance issues may not be well known when building a system or its components. Applicable compliance determinations may only become known after a set up and configuration of an IT system. Thus documentation is crucial for auditing and compliance. The inventors disclose a system comprising global system rules database, templates, and an IT system state database, which provide an automatically documented set up and configuration. Any configuration that occurs is a recorded in a database. According to an example embodiment, automatically documented configuration provides audit trails and can be used to show compliance. Inventory management may use the automatically documented and tracked information.

Another challenge that arises from IT system set-up, configuration, and operation involves inventory management of hardware and software. For example, it is typically important to know how many servers there are, whether they are up and still functioning, what are their capabilities, in which rack each server is, which power supplies are connected to which servers, what network cards and what network ports each server is using, which IT system the components are operated in and many other important notes. In addition to inventory information, passwords used for inventory management and other sensitive information should be managed effectively. Particularly in larger IT systems, data centers or data centers where equipment changes frequently, the gathering and retention of this information is a time consuming task that is often managed manually or using a variety of software tools. Compliant protection of the secure passwords is a large risk factor that can be an important issue in assuring secure computing environments. Inventors disclose and IT system where the gathering and maintaining of the inventory and operational status of all servers and other components is automatically updated, stored and secured as part of the IT system state, global system rules, templates, and controller logic of the controller.

In addition to problems with set-up and configuration of an IT system, the inventors disclose an IT system that may also address problems and issues that appear in the maintenance of IT systems. A number of problems arise with the continuous functioning of data centers with hardware failures, for example, power supply failure, memory failure, network failure, network card failure, and/or CPU failures among other things. Additional failures emerge when migrating a host during hardware failures. Accordingly, the inventors disclose dynamic resource migration, e.g., migrating resource from one resource provider to another resource provider when a host goes down. In such situation according to an example embodiment, the IT system can migrate to other servers, nodes or resources, or to other IT systems. A controller may report the system's status. A duplicate of the data is on another host having a known and automatically set up configuration. If a hardware failure is detected, then any resource that the hardware may have been providing may be migrated automatically after automatically detecting the failure.

A significant issue with many IT systems is scalability. Growing businesses or other organizations typically add on or reconfigure their IT systems as they grow and their needs change. Problems arise when more resources are needed for an existing IT system, for example adding hard drive space, storage space, CPU processing, more network infrastructure; more end points, more clients and/or more security. Problems also arise in configuration, set up and deployment when different services and applications or changes to infrastructure are needed. According to an example embodiment, a data center may be scaled automatically. Nodes or resources may be added to or removed from the pools of resources dynamically and automatically. Resources added and removed from the resource pool may be automatically allocated or reallocated. Services may be provisioned and moved over to new hosts rapidly. The controller may detect and add more resources to the resource pools dynamically and know where to allocate/reallocate resources. A system according to an example embodiment may scale from a single node IT system to a scaled system needing numerous physical and/or virtual nodes or resources across multiple datacenters or IT systems.

The inventors disclose a system that enables flexible resource allocation and management. The system comprises compute, storage and networking resources that may be in resource pools and may be dynamically allocated. The controller may recognize new nodes or hosts on a network and then configure them so that they can be part of the resource pools. For example, whenever a new server is plugged in, the controller configures that as part of the resource pool and can add it to the resources and can begin using it dynamically. The nodes or resources may be detected by the controller and added to the different pools. Resource requests may be made, e.g., through an API request to a controller. The controller may then deploy or allocate the needed resources from the pools according to the rules. This allows the controller and/or an application through the controller, to load balance and dynamically distribute the resources based on needs of the request.

Examples of load balancing include but are not limited to: deploying new resources when hardware or software failures occur; deploying one or more instances of the same application in response to an increased user load; and deploying one or more instances of the same application in response to an imbalance in storage, computing or networking requirements.

The problems involved in making changes to live IT systems or environments may create substantial, and at times, catastrophic problems for users or entities that rely on these systems to be consistently up and running. Not only do these outages represent potential losses in use of the system, but losses of data, economic losses due to substantial resources of time, personnel and money required to fix the problems. The problems can be exacerbated by difficulties rebuilding a system where there are errors in documentation of configuration or lack understanding of the system. Because of this problem many IT system users are reluctant to patch IT resources to eliminate known security risks. They thus remain more vulnerable to security breaches.

A host of problems arising in maintenance of IT systems are related to software failures due to change management or control where configuration may be required. Situations in which such failures may occur include but are not limited to upgrading to new software versions, migrating to a different piece of software; password or authentication management changes; switches between services or between different providers of a service Manually configured and maintained infrastructure is typically difficult to recreate. Recreating infrastructure may be important for several reasons including, but not limited to, rolling back problematic changes, power outages or for other disaster recovery. Problems in manually configured systems are difficult to diagnose. Manually configured and maintained infrastructure is difficult to remake. In addition, system administrators can easily make mistakes for instance an incorrect command which in turn have been known to have brought down computer systems Making changes to live IT systems or environments can create substantial and at times catastrophic problems for users or entities that rely on these systems to be consistently up and running. Not only do these outages represent potential losses in use of the system, but such outages can also cause losses of data as well as economic losses due to substantial resources of time, personnel and money required to fix the problems. The problems can be exacerbated by difficulties rebuilding a system where there are errors in documentation of configuration or lack understanding of the system. And, in many cases, it is very difficult to restore a system to a previous state after a significant or major change.

Furthermore the technical problems potentially created when changes are made to live environments may have cascading effects. These cascading effects may make it challenging and sometimes not possible to going back to the pre-change state. Thus, even if changes need to be reverted back due to problems with implemented changes, the state of the system has already changed. It has been recently stated that it is an unsolved problem to undo infrastructure and system administration errors as well as faulty changes to a production environment. Additionally, it has been known to be problematic to test changes to a system before deployment to a live environment.

Accordingly, the inventors disclose a number of example embodiments for systems and methods configured to revert a change to a live system back to a pre-change state. Further, inventors disclose a system and method are provided that is configured to enable a substantial reversion of a state of system or environment undergoing live changes that may prevent or ameliorate one or more of the problems described above.

According to a variation of an example embodiment, the IT system has full system knowledge with the global system rules, templates, and IT system state. The infrastructure may be cloned using the full system knowledge. The system or a system environment may be cloned as a software defined infrastructure or environment. A system environment including a volatile database that is in use, referred to as the production environment, may be written into a non-volatile read only database to be used as development environment in a development and testing process. Desired changes may be made to and tested in the development environment. A user or controller logic may make changes the global rules to create a new version. The versions of the rules may be tracked. According to another aspect of an example embodiment a newly developed environment may be then implemented automatically. The previous production environment may also be maintained or fully functional so the revision to the earlier state production environment is possible without losing data. The development environment may then be booted with the new specification, rules, and templates and the databases or the system are synced with the production database and may be switched to a writeable database. The original production database may then be switched to a read only database to which the system may revert if recovery is necessary.

With respect to upgrading or patching software, a new host may be deployed if a service is detected that needs an upgrade or patch. The new service may be deployed while change reversion is possible as described above, in the event there is a failure due to the upgrade or patch.

Hardware upgrades are significant in many situations particularly where up-to-date hardware is essential. An example of this type of situation occurs in the high frequency trading industry where an IT system with milliseconds of speed advantage may enable a user to achieve superior trading results and profits. In particular, problems arise in ensuring interoperability with current infrastructure so that the new hardware will know how to communicate with protocols and work with existing infrastructure. In addition to ensuring interoperability of components, the components would require integration with an existing set up.

Referring to FIG. 1, an IT system 100 of an example embodiment is illustrated. The system 100 may be one or more types of IT systems including but not limited to those described herein.

A user interface (UI) 110 is shown coupled through an application program interface (API) application 120 that may or may not reside on a standalone physical or virtual server to the controller 200. Controller 200 may be deployed on or more processors and one or more memories to implement any of the control operations discussed herein. Instructions for execution by the processor(s) to carry out such control operations can be resident on a non-transitory computer-readable storage medium such as processor memory. The API 120 may comprise one or more API applications, which may be redundant and/or operate in parallel. The API application 120 receives requests to configure system resources, parse the requests and passes them to the controller 200. The API application 120 receives one or more responses from the controller, parses the response(s) and passes them to the UI (or application) 110. Alternatively or additionally, an application or service may communicate with the API application 120. The controller 200 is coupled to a compute resource(s) 300, a storage resource(s) 400 and a networking resource(s) 500. The resources 300, 400, 500 may or may not reside on a single node. One or more of the resources 300, 400, 500 may be virtual. The resources 300, 400, 500 may or may not reside on multiple nodes or in various combinations on multiple nodes. A physical device may comprise one or more or each of the resource types including but not limited to compute resources 300, storage resources 400, and networking resources 500. Resources 300, 400, 500 may also comprise pools of resources whether or not at different physical locations, and whether or not virtual. Bare-metal compute resources may also be used to enable the use of virtual or container compute resources.

In addition to the known definition of a node, a node as used herein may be any system, device or resource connected to a network(s) or other functional unit that performs a function on a stand alone or network connected device. A node may also include but is not limited to, for example, a server, a service/application/plurality of services on a physical or virtual host, a virtual server, and/or a plurality or singular service on a multi-tenant server or running inside a container.

The controller 200 may comprise one or more physical or virtual controller servers, which may also be redundant and/or operate in parallel. A controller may run on a physical or virtual host that is serving as a compute host. As an example, a controller may comprise a controller that runs on a host that is also serving other purposes, for example due to it having access to sensitive resources. A controller receives requests from the API application 120, parses requests and makes appropriate tasking for and instructs other resources; monitors and receives information from the resources; maintains the state of the system and a history of changes; and may communicate with other controllers in the IT system. The controller may also contain the API application 120.

A compute resource as defined herein may comprise a single compute node or a resource pool with one or more compute nodes, real or virtual. The compute resource or a compute node may comprise one or more physical or virtual machines or container hosts, that may host one or more services or run one or more applications. A compute resource may also be on hardware designed for multiple purposes including but not limited to, computing, storage, caching, networking, specialized computing, including but not limited to GPUs, ASICs, co-processors, CPU, FPGA, and other specialized computing methods. Such devices may be added with a PCI express switch or similar device and may be added dynamically in such a manner. A compute resource or a compute node may comprise or may run one or more hypervisors or container hosts that contains a plurality of different virtual machines that run services or applications or can be virtual compute resources. While the compute resource's emphasis may be on providing compute functions, it may also comprise data storage and/or networking capabilities.

A storage resource as defined herein may comprise a storage node or a pool or storage resources. A storage resource may comprise any data storage medium, for example, fast, slow, hybrid, cached and/or RAM. A storage resource may comprise one or more types of network, machine, device, nodes or any combination thereof, which may or may not be directly attached to other storage resources. According to aspects of an example embodiment the storage resources may be may be bare-metal or virtual or a combination thereof. While the storage resource's emphasis may be on providing storage functions, it may also comprise compute and/or networking capabilities.

The networking resource(s) 500 may comprise a single networking resource, a plurality of networking resources or a pool of networking resources. Networking resource(s) may comprise physical or virtual device(s), tool(s), switches, routers or other interconnects between system resources, or applications for managing networking. Such system resources may be physical or virtual, and may include computing, storage, or other networking resources, A networking resource may provide connections between outside networks and applications networks and may host core network services including but not limited to Domain Name System (DNS or dns), Dynamic Host Configuration Protocol (DHCP), subnet management, layer 3 routing, Network Address Translation (NAT), and other services. Some of these services may be deployed on compute resources, storage resources, or networking resources on physical or virtual machines. The networking resources may utilize one or more fabrics or protocols including but not limited to Infiniband, Ethernet, Remote Direct Memory Access (RDMA or rdma) over Converged Ethernet (RoCE), fibre channel and/or Omnipath, an may contain interconnects between a plurality of fabrics. A networking resource may or may not be software-defined networking (SDN) capable. The controller 200 may be able to directly alter networking resources 300 using SDN's, Virtual Local Area Networks (VLANs) or the like, to configure topology of IT systems. While the networking resource's emphasis may be on providing networking functions, it may also comprise compute and/or storage capabilities.

An applications network as used herein means a networking resource, or any combinations thereof to connect or couple applications, resources, services, and/or other networks, or to couple users and/or clients to applications, resources, and/or services. An application network may comprise a network used for servers to communicate with other application servers (physical or virtual) and to communicate with clients. Applications networks may communicate with machines or networks outside the system 100. For example, an application network may connect a web frontend to a database. A user may connect to a web application through the internet or another network that may or may not be managed by a controller.

According to an example embodiment, the compute, storage and networking resources 300, 400, 500, respectively, may be automatically added, removed, set up, allocated, reallocated, configured, reconfigured and/or deployed by the controller 200. According to an example embodiment, additional resources may be added to the resource pools.

While a user interface 110 is shown, such as a Web UI or other user interface through which a user 105 may access, and interact with the system, alternatively or in addition, an application may communicate with or interact with the controller 200 through the API application(s) 120 or otherwise. For example, a user 105 or application may send requests including but not limited to: Build an IT system; Build an individual stack in an IT system; Create a service or application; Migrate a service or application; Change a service or application; Remove a service or application; Clone a stack onto another stack on a different network; Create, Add; Remove; Set Up or Configure; Reconfigure a resource or system component.

The system 100 of FIG. 1 may comprise a server with connections or other communication interfaces to various elements, components or resources which may be either physical or virtual or any combination thereof. According to a variation, the system 100 illustrated in FIG. 1 may comprise bare metal server with connections.

As described in more detail herein, the controller 200 may be configured to power on resources or components, to automatically set-up, configure, and/or control boot up of resources, to add resources, to allocate resources, to manage resources and update available resources. The power up process may begin with powering the controller so that the order of devices being booted may be consistent and not dependent on the user powering on devices. The process may also involve detection of powered up resources.

Referring to FIG. 2A to FIG. 10, a controller 200, controller logic 205, global system rules database 210, IT system state 220, and templates 230 are illustrated.

The system 100 comprises global system rules 210. The global system rules 210, among other things may declare the rules that set up, configure, boot, allocate and manage the resources that may include compute, storage and networking. The global system rules 210 comprise minimum requirements for the system 100 to be in the correct or desired state. Those requirements may comprise IT tasks expected to be completed and an updatable list of expected hardware needed to predictably build a desired system. An updatable list of expected hardware may allow the controller to verify that needed resources (from e.g., before starting rules or using templates) are available. The global rules may comprise a list of operations required for various tasks and corresponding instructions relating to the ordering of operations and tasks. For example, the rules may specify the order to power components on, to boot resources, applications and services, dependencies, when to start different tasks, e.g., loading configuring, starting, reloading applications, or updating hardware. The rules 210 may also comprise one or more of: a list of resource allocations, e.g., required for applications and services; a list of templates that may be used; a list of applications to be loaded and how to configure; a list of services to be loaded and how to configure a list of application networks and which applications go with which networks; a list of configuration variables specific to different applications and user specific application variables; an expected state, which allows the controller to check the system state to verify the state is as expected and the results of each instruction are as expected; and/or a version list, comprising a list of changes to rules, (e.g. a snapshot) that may allow tracking of changes to rules and an ability to test or revert to different rules in different circumstances. The controller 200 may be configured to apply global system rules 210 to an IT system 100 on physical resources. The controller 200 may be configured to apply global system rules 210 to an IT system 100 on virtual resources. The controller 200 may be configured to apply global system rules 210 to an IT system 100 on a combination of physical and virtual resources.

Figure 2A:
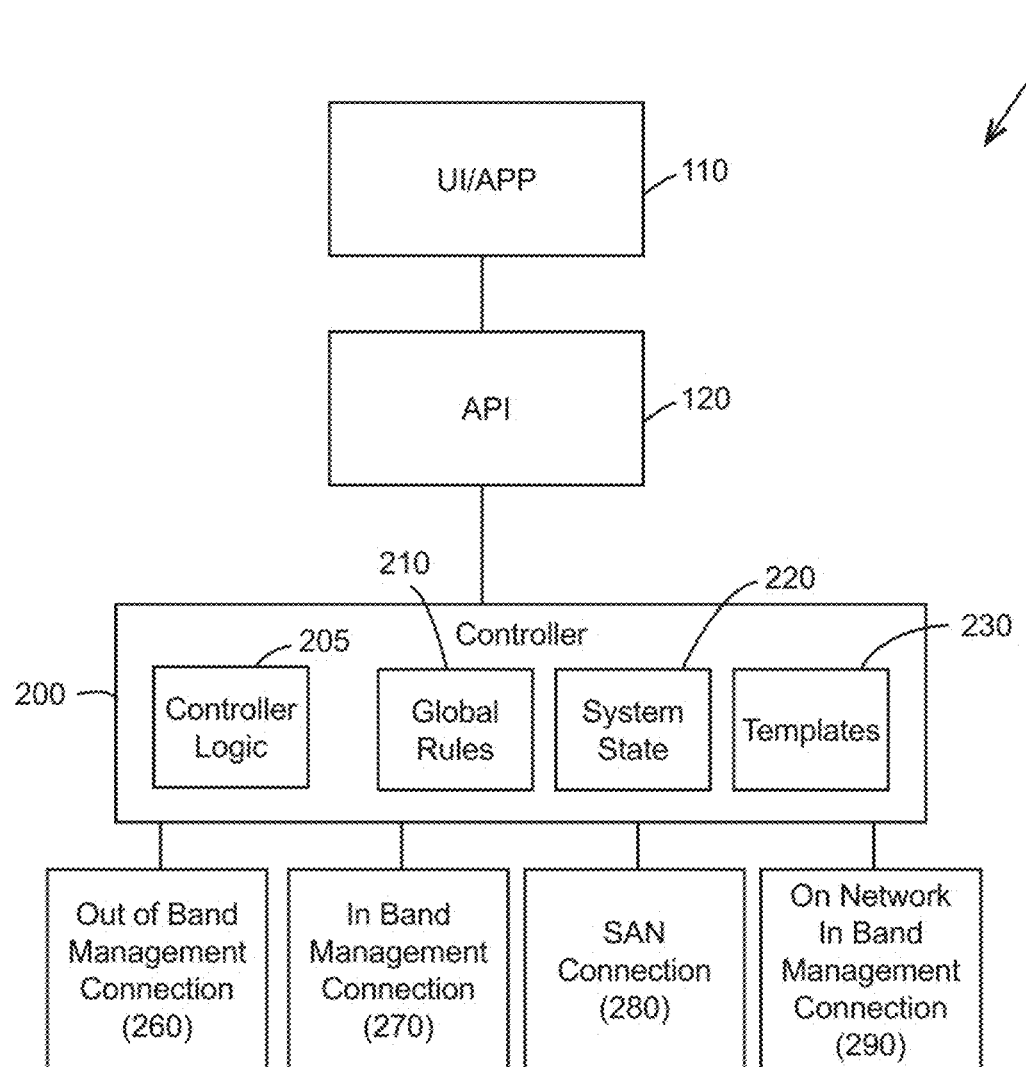
FIG. 2A is a schematic illustration of an example controller for the system of FIG. 1.
Figure 2B:
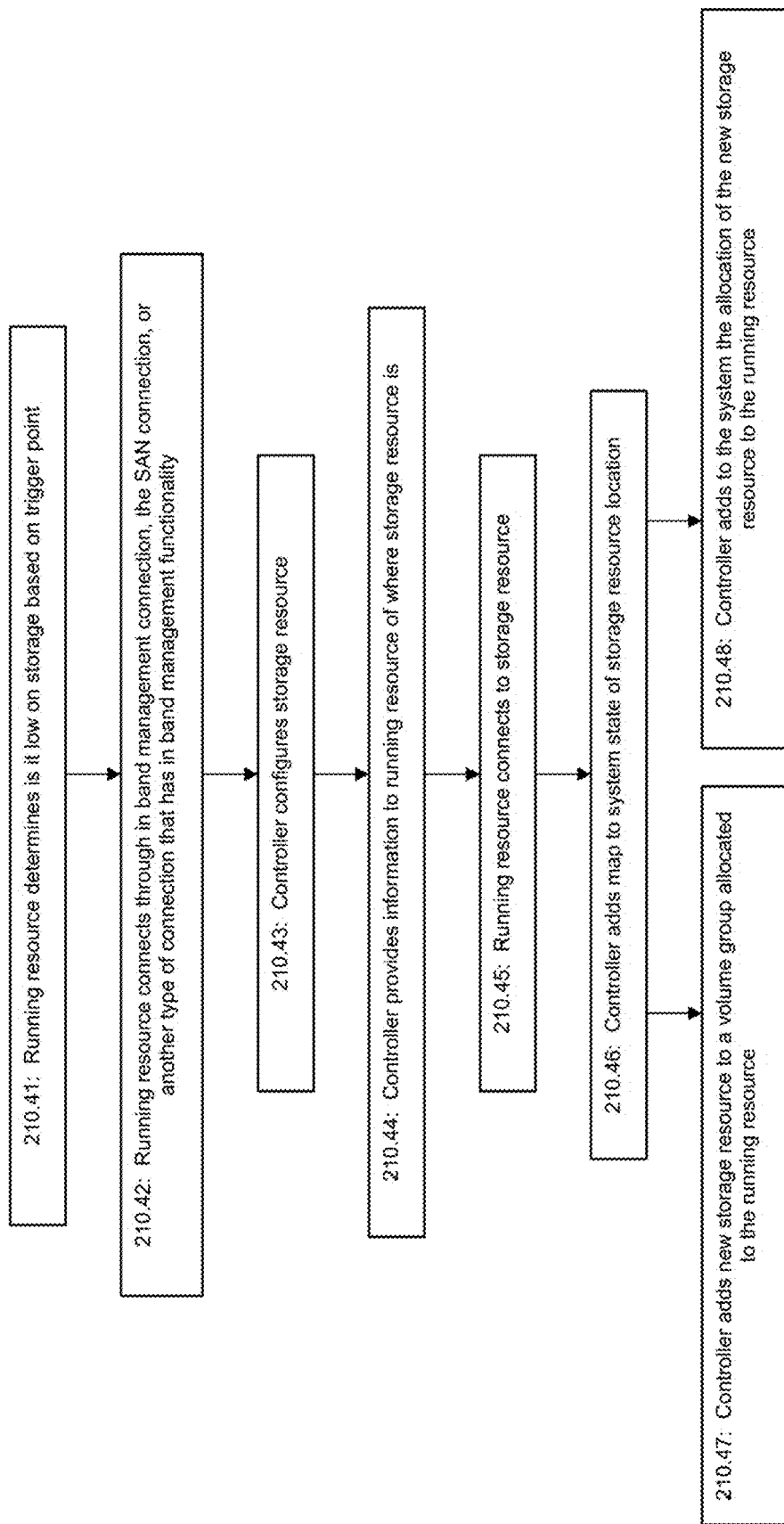
FIG. 2B illustrates an example flow of the operation of an example set of storage expansion rules.
Figure 2D:
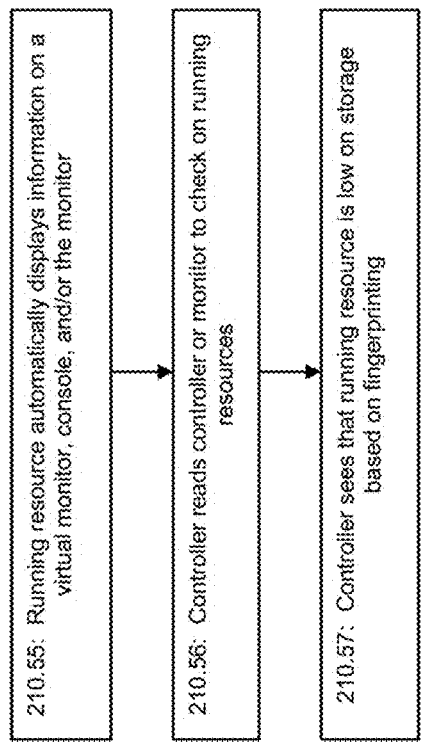
FIGS. 2C and 2D illustrate alternative examples for performing steps 210.1 and 210.2 in FIG. 2B.
Figure 2C:
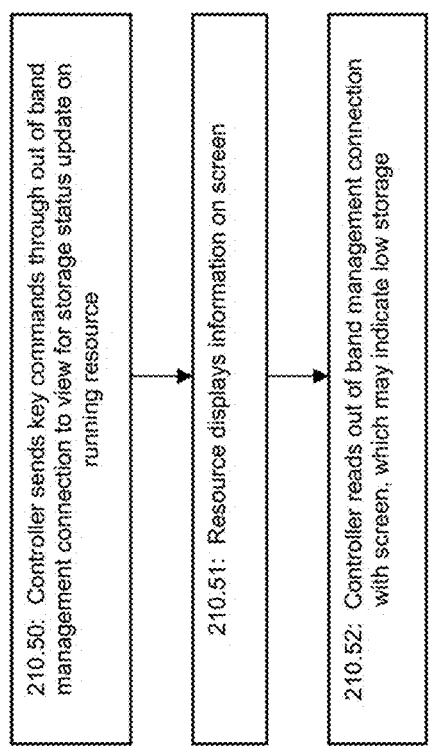
Figure 2E:
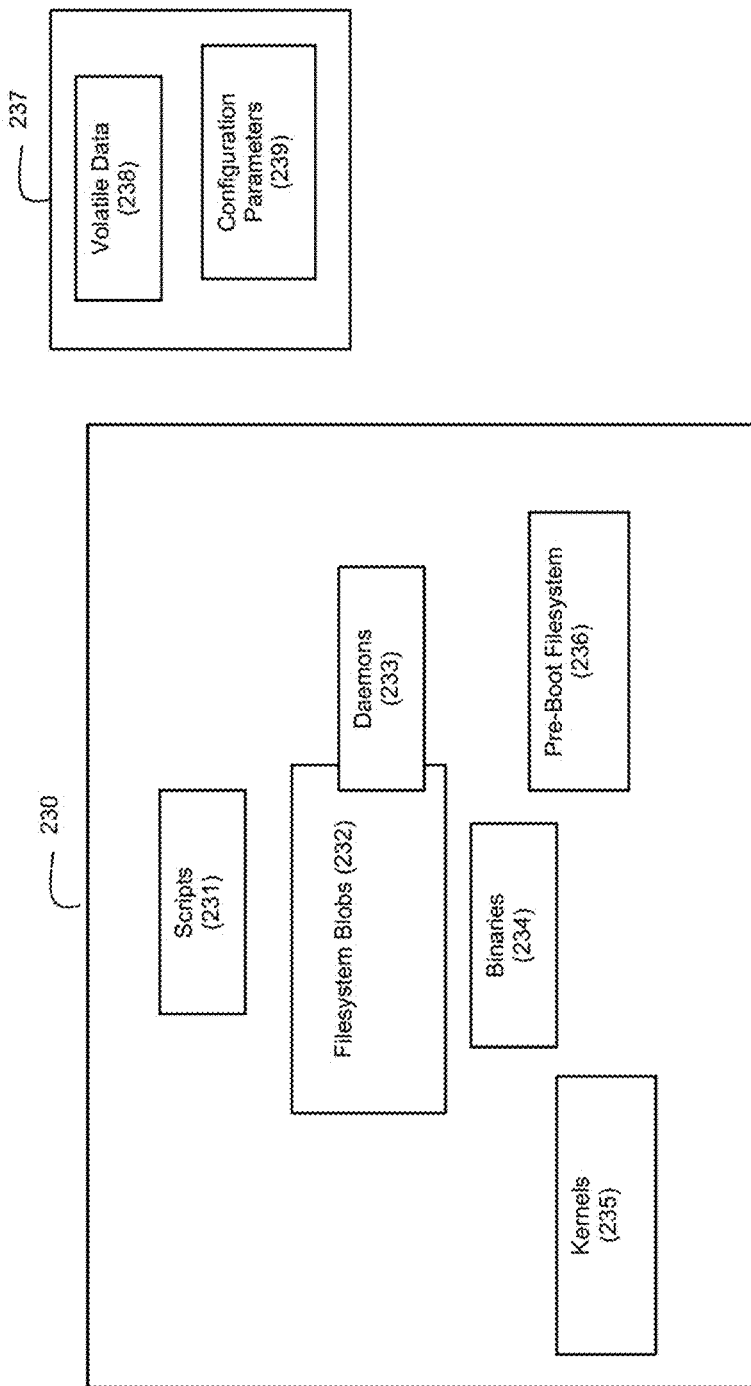
FIG. 2E shows an example template.
Figure 2F:
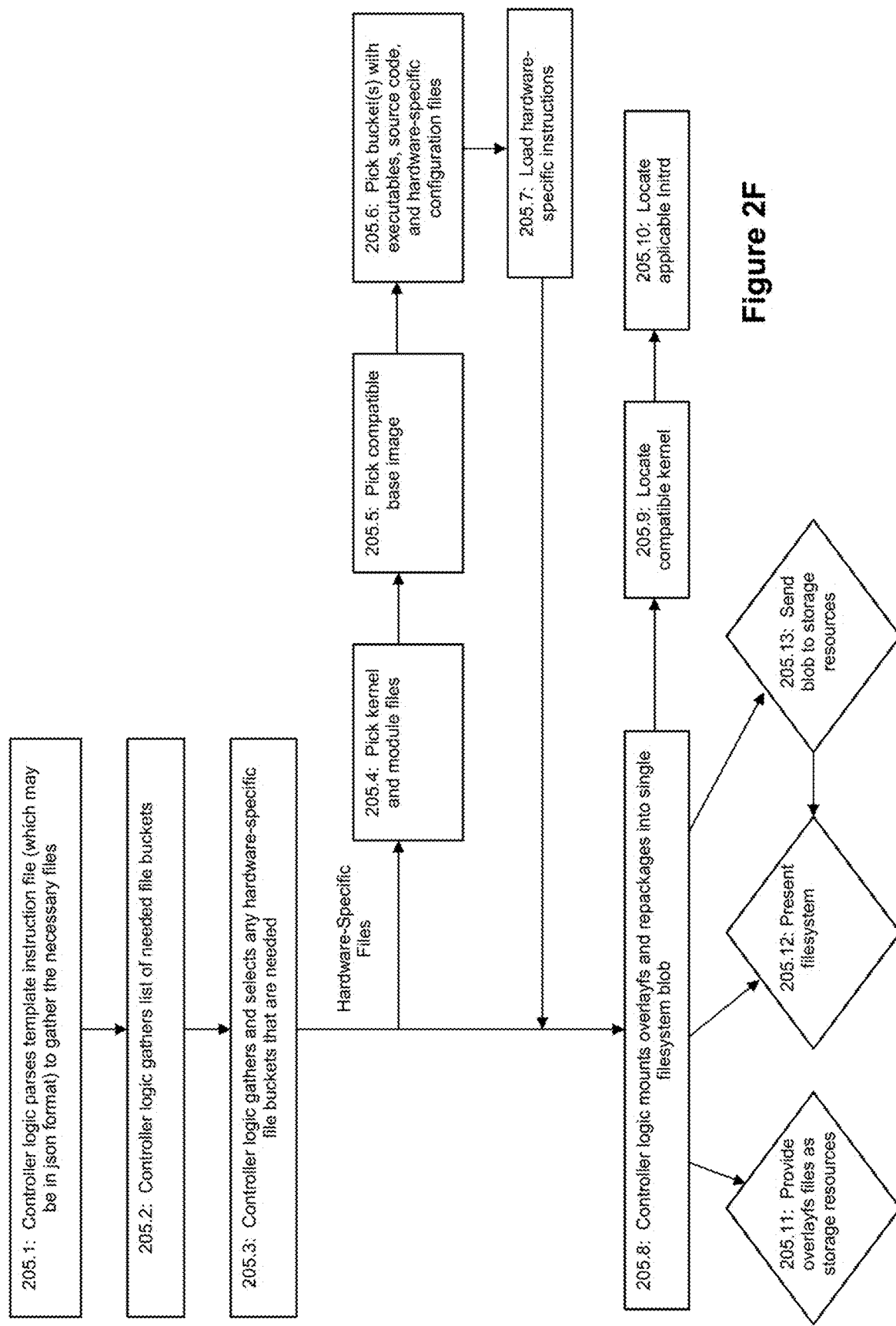
FIG. 2F shows an example process flow for controller logic with respect to processing a template.
Figure 2G:
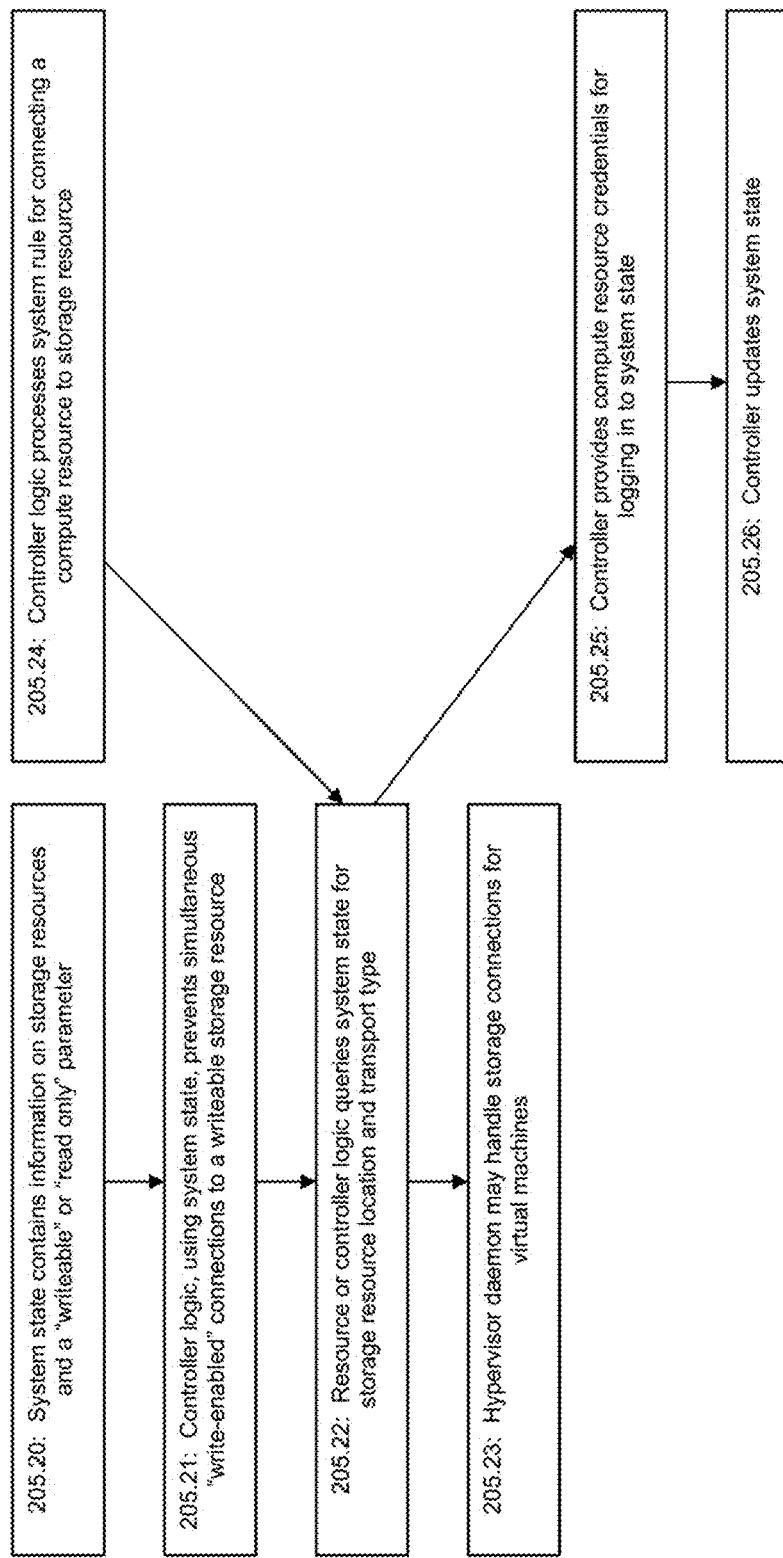
FIGS. 2G and 2H show example process flows for steps 205.11, 205.12, and 205.13 of FIG. 2F.
Figure 2H:
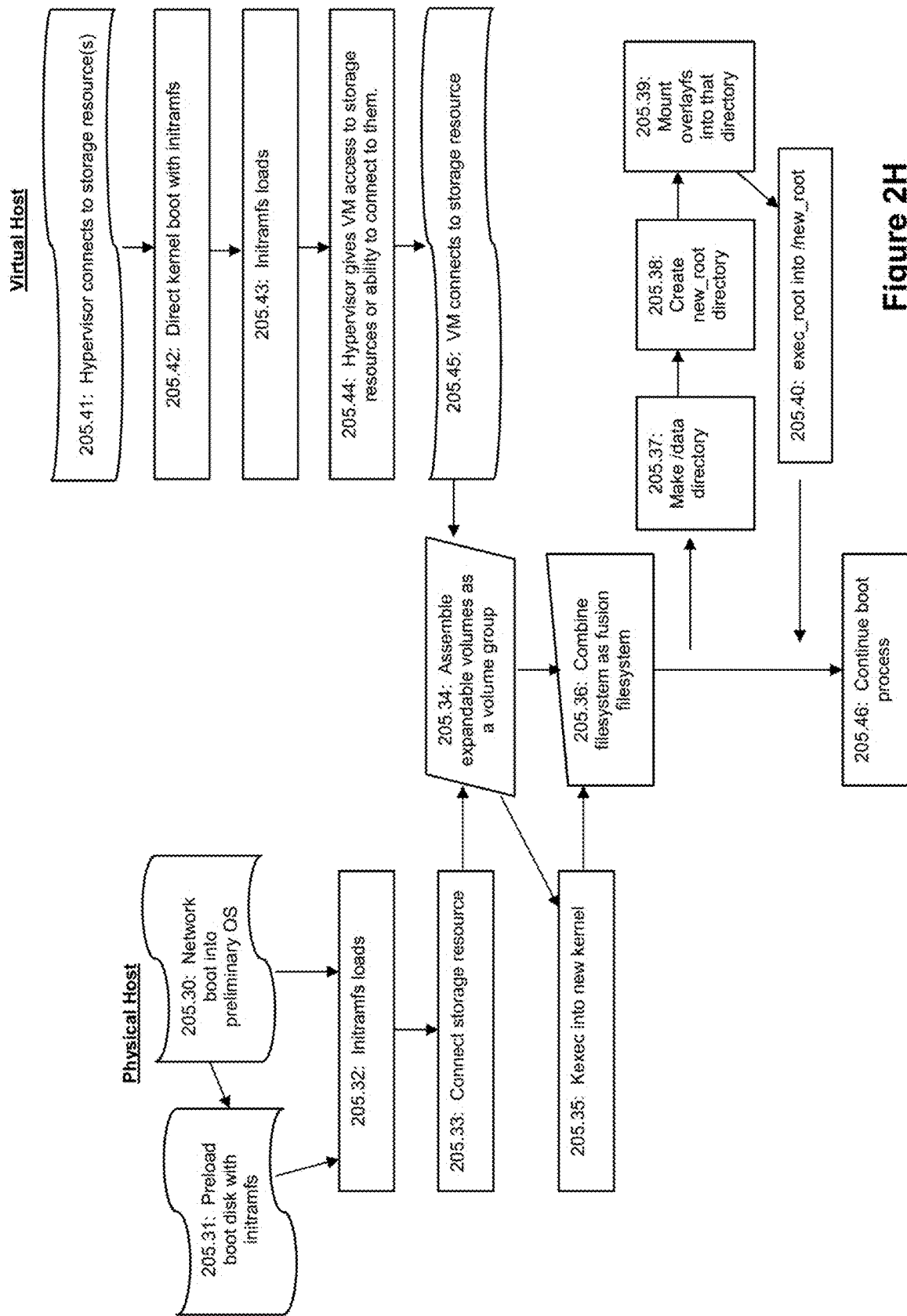
Figure 2I:
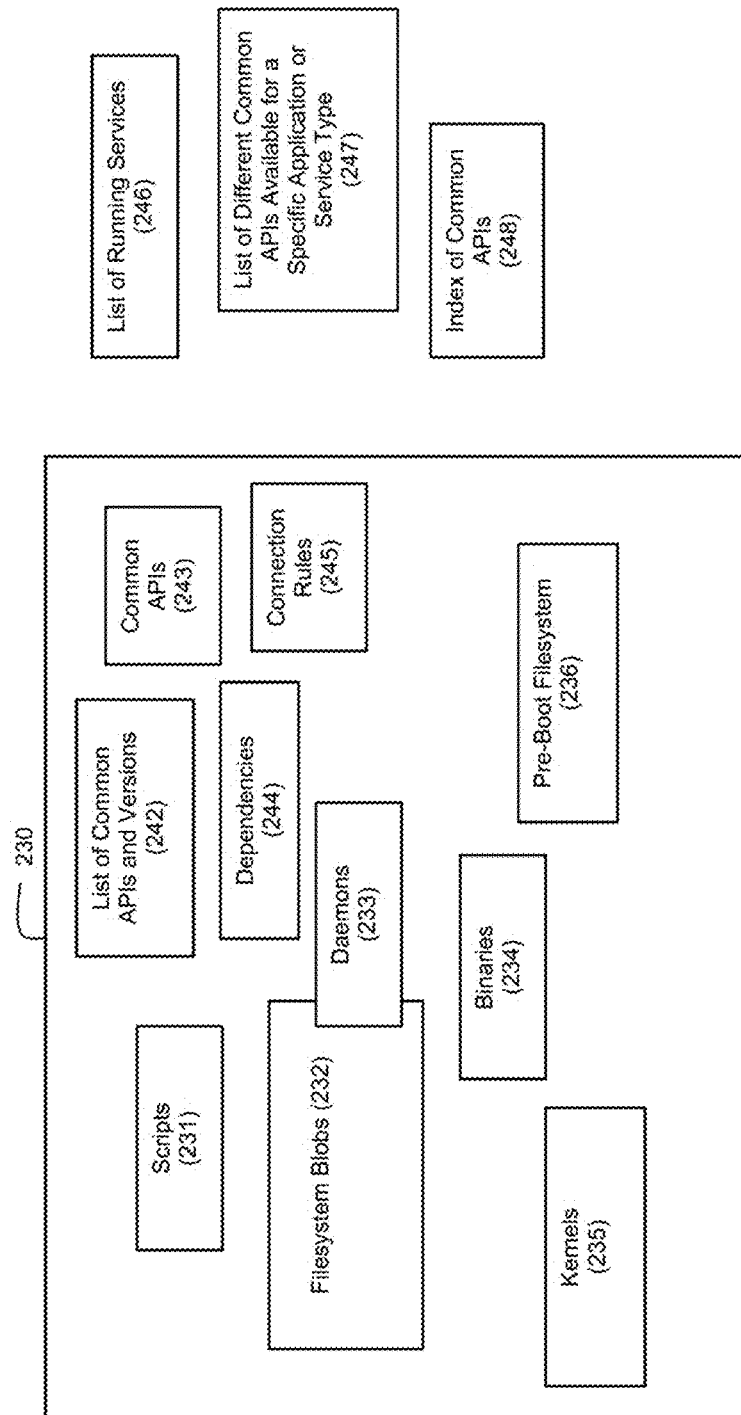
FIG. 2I shows another example template.
Figure 2J:
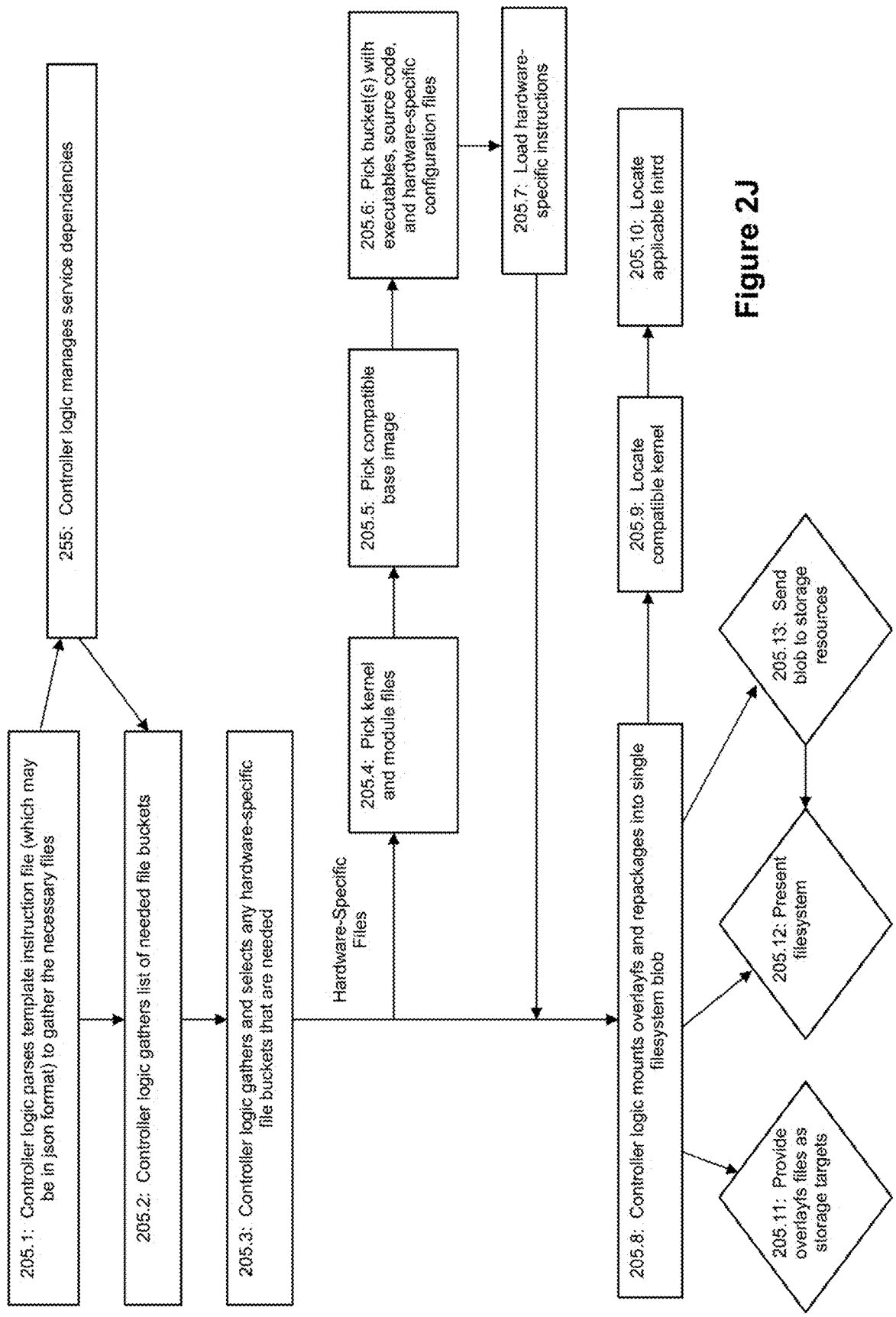
FIG. 2J illustrates another example process flow for controller logic with respect to processing a template.
Figure 2K:
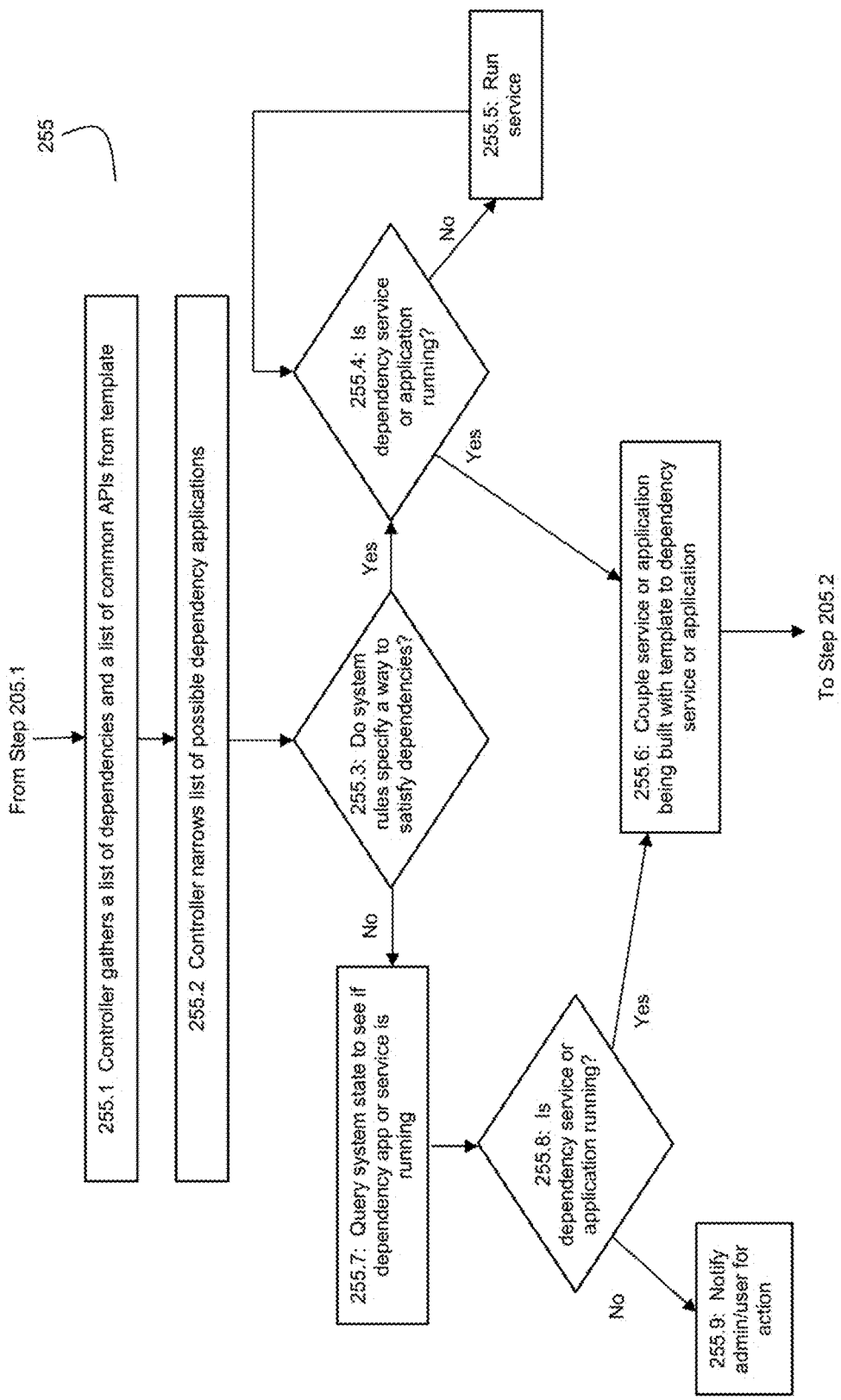
FIG. 2K shows an example process flow for managing service dependencies.
Figure 2L:
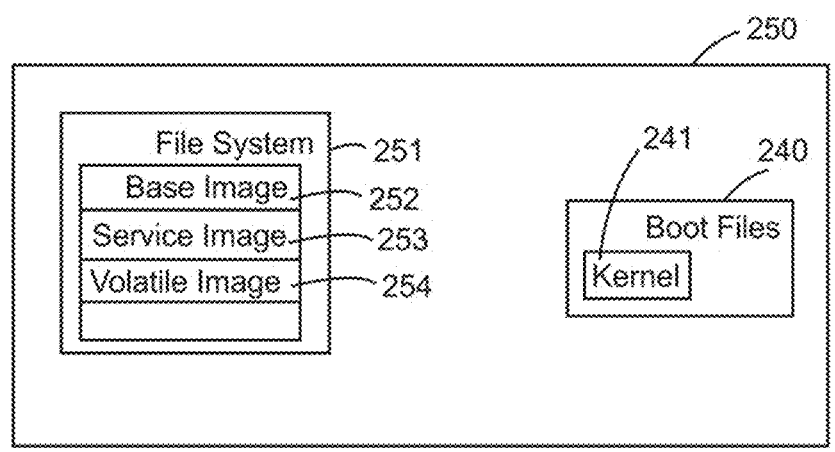
FIG. 2L is a schematic illustration of an example image derived from a template according to an example embodiment.
Figure 2M:
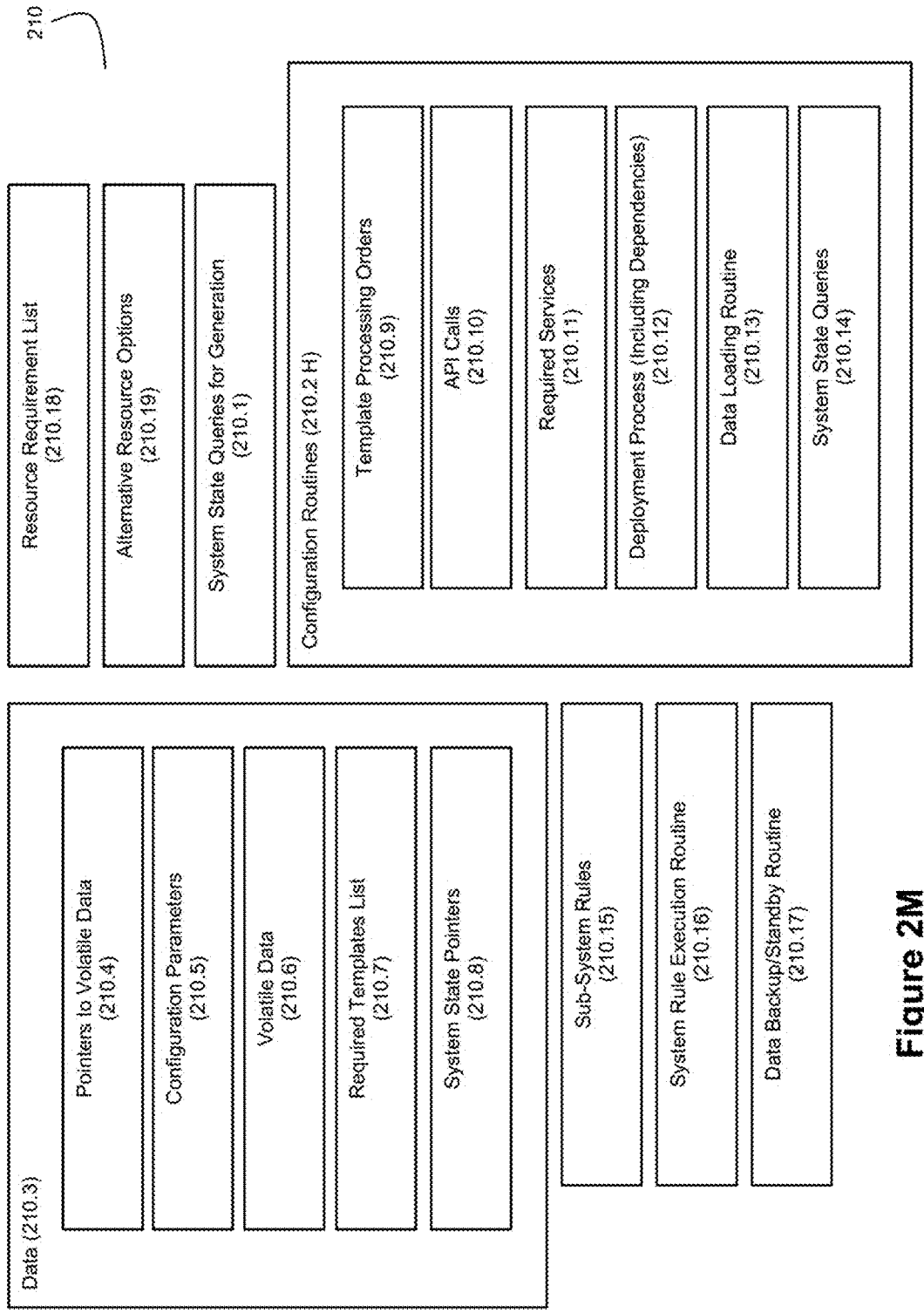
FIG. 2M Illustrates an example set of system rules.

FIG. 2M Illustrates an example set of system rules 210, which may take the form of global system rules. The example set of system rules 210 shown by FIG. 2M may be loaded into the controller 200 or derived by querying the system state (see 210.1). In the example of FIG. 2M, system rules 210 contain a set of instructions that can take the form of configuration routines 210.2 and also contain the data 210.3 to create and/or recreate an IT system or environment. Configuration rules within the system rules 210 may know how to locate templates 230 via a required templates list 210.7 (where the templates 230 may reside in a filesystem, disk, storage resource or may be located inside the system rules). The controller logic 205 may also locate the templates 230 before processing them and make sure they are present before enabling the system rules 210. System rules 210 may contain subsets of system rules 210.15, and these subsets 210.15 may be executed as part of configuration routines 210.2.

In addition, sub-system rules 210.15 can be used, for example, as a tool to build a system of integrated IT applications (then processed with a system rule execution routine 210.16, and then updating the system state and the current configuration rules reflecting the addition of 210.15). Sub-system rules 210.15 may also be located elsewhere and loaded into the system state 220 by user interaction. For example, you can also have sub-system rules 210.15 as playbooks, and they can be available and run (and then the global system rules 210 get updated so you can replay the playbook if you want to clone a system.

The configuration routines 210.2 can be a set of instructions used to build the system. The configuration routines 210.2 may also include sub-system rules 210.15 or system state pointers 210.8 if desired by a practitioner. When running the configuration routines 210.2, the controller logic 205 can process a series of templates in a particular order (210.9), optionally allowing for parallel deployments, but maintaining proper dependency handling (210.12). The configuration routines 210.2 may optionally call for API calls 210.10 that may set configuration parameters 210.5 on the applications that may be configured by processing templates according to 210.9. Also, required services 210.11 are the services that need to be up and running if the system is to make the API call(s) 210.10.

The routines 210.2 may also contain procedures, programs, or methods for data loading (210.13) with respect to volatile data 210.6 including but not limited to, copying data, transferring databases to compute resources, pairing compute resources with storage resources, and/or updating the system state 220 with locations of volatile data 210.6. Pointers to volatile data (see 210.4) can be maintained with data 210.3 to locate volatile data that may be stored elsewhere. The data loading routine 210.13 may also be used load configuration parameters 210.5 if they are located in non-standard datastores (e.g., contained in a database).

The system rules 210 can also contain a resource list 210.18 which may dictate which components get allocated to which resources and will allow the controller logic 205 to determine if the proper resources and/or hardware are available. The system rules 210 may also contain an alternative hardware and/or resource list 210.19 for alternative deployments (e.g., for a development environment where a software engineer may want to perform a live test but not want to allocate an entire datacenter). System rules may also include a data backup/standby routine 210.17 that provide instructions on how to backup systems and use standbys for redundancy.

After every action is taken, the system state 220 may be updated and the queries (which may include writes) may be saved as system state queries 210.14.

Figure 2N:
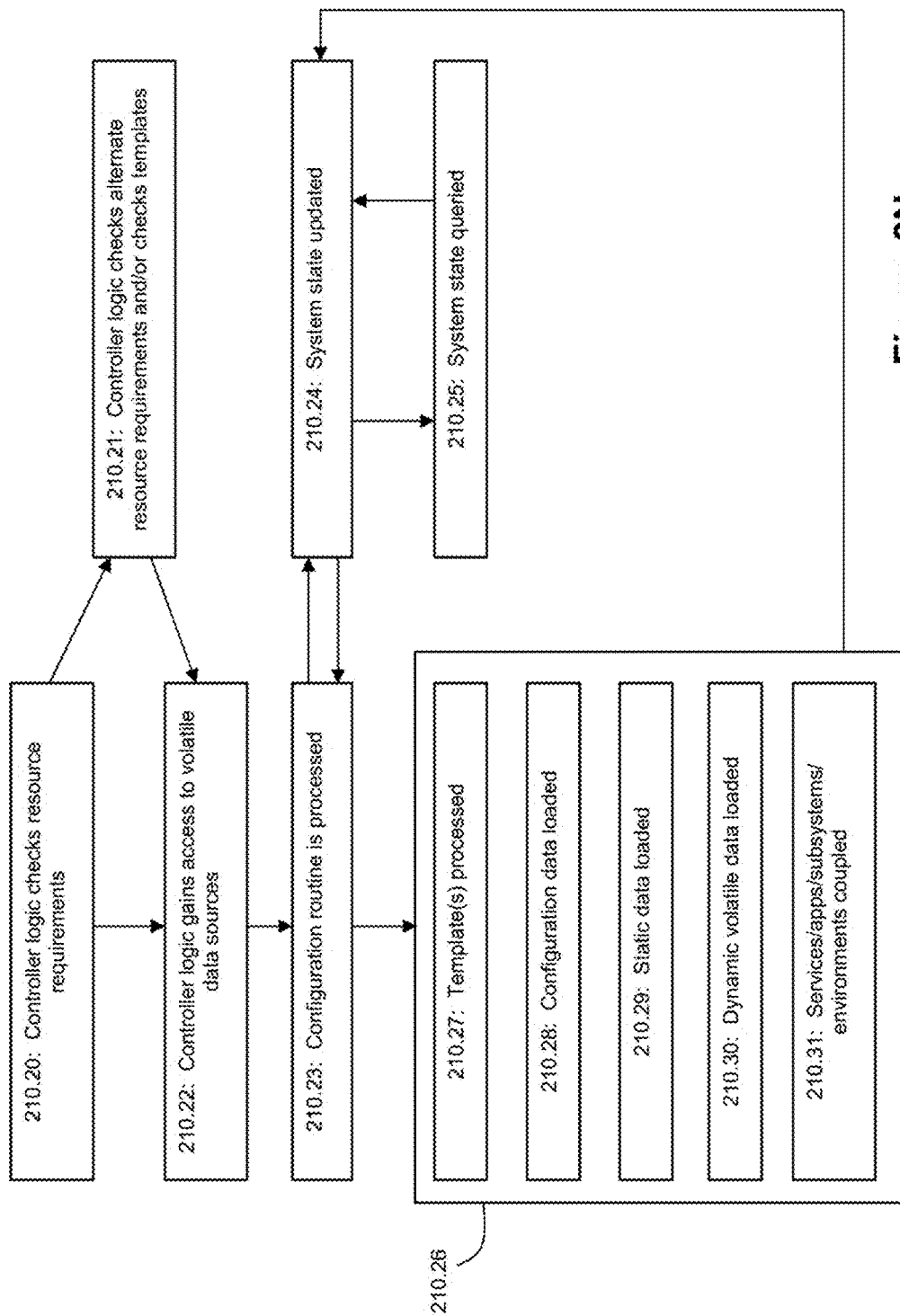
FIG. 2N illustrates an example process flow for the controller logic processing the system rules of FIG. 2M.

FIG. 2N illustrates an example process flow for the controller logic 205 processing system rules 210 of FIG. 2M (or subsystem rules 210.15). At step 210.20, the controller logic 205 checks to make sure the appropriate resources are available (see 210.18 in FIG. 2M). Otherwise, alternate configurations may be checked at step 210.21. A third option may include the user being prompted to choose an alternate configuration that may be supported by the templates 230 referenced in list 210.7 of FIG. 2M.

At step 210.22, the controller logic may then make sure the compute resources (or any of the appropriate resources) gain access to the volatile data. This may involve connecting to storage resources or adding the storage resources to the system state 220. At step 210.23, a configuration routine is then processed, and as each routine is processed the system state 220 is updated (step 210.24). The system state 220 may also be queried to check if certain steps are finished before proceeding (step 210.25).

A configuration routine processing step as shown by FIG. 210.23 may include any of the procedures of 210.26 (or combinations thereof). It may also include other procedures. For example, processing at 210.26 may include template processing (210.27), loading configuration data (210.28), loading static data (210.29), loading dynamic volatile data (210.30), and/or coupling of services, apps, subsystems, and/or environments (210.31). Such procedures within 210.26 may be repeated in loops or run in parallel as some system components may be independent and others may be interdependent. The controller logic, the service dependencies, and/or the system rules may dictate which services may depend on each other, and may couple the services to further build out the IT System from the system rules.

The global system rules 210 may also comprise storage expansion rules. The storage expansion rules provide a set of rules that automatically add storage resources, for example, to existing storage resources within the system. In addition the storage expansion rules may provide trigger points where the application running on the compute resource(s) will know when to request storage expansion (or the controller 200 may know when to expand the storage of a compute resource or application). The controller 200 may allocate and manage new storage resources and may merge or integrate the storage resource with an existing storage resource for a particular running resource. Such particular running resource may be but is not limited to: a compute resource within the system, an application that is running a computer resource within the system, a virtual machine, container, or physical or virtual compute host or combinations thereof. The running resource may signal to the controller 200 that it is running out of storage space, e.g. through storage space queries. In band management connection 270, SAN connection 280, or any networking or coupling to the controller 200 may be used in such query. Out of band management connection 260 may be used as well. These storage expansion rules (or a subset of these storage expansion rules) may also be used for resources that are not running.

The storage expansion rules dictate how to locate, connect, set up the new storage resource within the system. The controller registers the new storage resource in system state 220 and tells the running resource where the storage resource is and how to connect to it. The running resource connects to the storage resource using such registration information. The controller 200 may merge the new storage resource with the existing storage resource, or it may add the new storage resource to a volume group.

FIG. 2B illustrates an example flow of the operation of an example set of storage expansion rules. At step 210.41, a running resource determines that it is low on storage based on a triggerpoint or otherwise. At step 210.42, the running resource connects to the controller 200 by way of the in band management connection 270, the SAN connection 280, or another type of connection that is visible to the operating system. Through this connection, the running resource can notify the controller 200 that it is low on storage. At step 210.43, the controller configures a storage resource to expand the storage capacity for the running resource. At step 210.44, the controller provides information to the running resource regarding where the newly configured storage resource is located. At step 210.45, the running resource connects to the newly configured storage resource. At step 210.46, the controller adds a map to the system state 220 of the new storage resource location. Then, the controller can add the new storage resource to a volume group allocated to the running resource (step 210.47), or the controller can add the allocation of the new storage resource to the running resource to the system state 220 (step 210.48).

FIG. 2C illustrates an alternative example for performing steps 210.41 and 210.42 in FIG. 2B. At step 210,50, the controller sends key commands through an out of band management connection 260 to view a monitor or console for a storage status update on the running resource. For example, the monitor may be an ipmi console through which a screen can be reviewed via an out of band connection 260. As an example, the out of band connection 260 can plug into USB as a keyboard/mouse and into a VGA monitor port. At step 210.51, the running resource displays information on the screen. At step 210.52, the controller then reads the information presented on the monitor or console via the out of band management connection 260 and a screen scrape or similar operation; where this read information may indicate a low storage status based on a trigger point. The process flow could then continue with step 210.43 of FIG. 2B.

FIG. 2D illustrates another alternative example for performing steps 210.41 and 210.42 in FIG. 2B. At step 210.55, the running resource automatically displays information on a monitor or console for reading by controller. At step 210.56, the controller automatically, periodically or constantly reads the monitor or console to check on the running resource. In response to this read, the controller sees that a running resource is low on storage (step 210.57). The process flow could then continue with step 210.43 of FIG. 2B.

The controller 200 also comprises a library of templates 230 which may include bare metal and/or service templates. These templates may include, but not be limited to, e-mail, file storage, voice over IP, software accounting, software XMPP, wiki, version control, account authentication management and third party applications that may be configurable by the User Interface. A template 230 can have an association with a resource, application, or service; and it can serve as the recipe that defines how such a resource, application, or service is to be integrated into the system.

As such, a template may comprise an established set of information that is used to create, configure, and/or deploy, a resource, or an application or service loaded on a resource. Such information may include but is not limited to: Kernels, initrd files, filesystems or filesystem images, files, configuration files, configuration file templates, information used to determine appropriate setups for different hardware and/or compute backends, and/or other available options for configuring the resources to power the application and operating system images that allow and/or facilitate the creation, booting or running of an application.

A template may contain information that may be used to deploy applications on pluralities of supported hardware types/and or compute backends including but not limited to a plurality of physical server types or components, a plurality of hypervisors running on a plurality of hardware types, container hosts that may be hosted on a plurality of hardware types.

Templates may derive boot images for applications or services that run on computing resources. The templates and images derived from templates may be used to create an application, deploy an application or service, and/or arrange resources for various system functions, which allow and/or facilitate the creation of an application. A template may have variable parameters in files, file systems, and/or operating system images that may be overwritten with configuration options from either default settings or settings given from the controller. A template may have configuration scripts used to configure an application or other resources and it may make use of configuration variables, configuration rules, and/or default rules or variables; these scripts, variables, and/or rules may contain specific rules, scripts, or variables for specific hardware or other resource specific parameters, e.g. hypervisors (when virtual), available memory. A template may have files in the form of binary resources, compilable source code that results in binary resources or hardware or other resource specific parameters, specific sets of binary resources or source code with compile instructions for specific hardware or other resource specific parameters, e.g. hypervisors (when virtual), available memory. A template may comprise a set of information independent of what is being run on a resource.

A template may comprise a base image. The base image may comprise a base operating system file system. The base operating system may be read only. The base image may also comprise basic tools of the operating system independent of what is being run. The base image may include base directories and operating system tools. The template may comprise a kernel. The kernel or a plurality of kernels may include an initrd or a plurality of kernels configured for different hardware types and resource types. Images may be derived from the templates ad loaded to one or more resources or deployed. A loaded image may also comprise boot files such as the kernels or initrd's of a corresponding template.

An image may comprise template filesystem information that may be loaded to a resource based on a template. A template filesystem may configure applications or services. A template filesystem may comprise a shared filesystem that is common to all resources, or to like resources, for example to save storage space where filesystems are stored or to facilitate the use of read only files. A template file system or image may comprise a set of files common to the services being deployed. The template file systems may be preloaded on the controller or downloaded. The template filesystems may be updated. A template file system may allow for relatively quicker deployment, as it may not require rebuilding. Sharing filesystems with other resources or applications may allow for reduction in storage, as files are not duplicated unnecessarily. This may also allow for easier recovery from failure, as only files that are different from the template filesystem need to be recovered.

Template boot files may comprise a kernel and/or initrd or a similar filesystem used to aid the booting process. The boot files may boot the operating system and set up the template file system. The initrd may comprise a small temporary filesystem with instructions on how to setup the template so that it can boot.

A template may further comprise template BIOS settings. The template BIOS settings may be used to set optional settings to run applications on a physical host. If used, then out of band management 260, as described with respect to FIGS. 1-12 herein, may be used to boot the resource or application. A physical host may boot resources or applications using the out of band management network 260 or a CDROM. The controller 200 may set application specific bios settings defined in such template. The controller 200 may use the out of band management system to make direct bios changes through an API specific to a particular resource. The settings may be verified through the console and image recognition. Accordingly, the controller 200 may use the console features and make bios changes with a virtual keyboard and mouse. The controller may also use a UEFI shell and may type directly into the console and may use image recognition to verify successful results, type in commands correctly, and ensure successful settings changes. If there is a bootable operating system available for BIOS changes or updates to specific BIOS versions the controller 200 may remotely load a disk image or an ISO boot an operating system run applications that update BIOSs and allow for configuration changes in a reliable manner.

A template may further comprise a list of template specific supported resources or a list of resources required for running specific applications or services.

A template image or a portion of the image or template may be stored on the controller 200 or the controller 200 may move or copy it to a storage resource 410.

FIG. 2E shows an example template 230. A template contains all the information needed to create an application or service. The template 230 also may contain information, alternative data, files, binaries for different hardware types that provide similar or identical functionality. For example there may be a filesystem blob 232 for/usr/bin and/bin with the binaries 234 compiled for different architectures. The template 230 may also contain daemons 233 or scripts 231. The daemons 233 are binaries or scripts that may be run at boot time when the host is powered on and ready; and in some cases the daemons 233 may power APIs that may be accessible by the controller and may allow the controller to change settings of the host (and the controller may subsequently update the active system rules). The daemons may also be powered down and re-started through out of band management 260 or in band management 270, discussed above and below. These daemons may also power generic APIs to provide dependent services for new services (for example a generic web server api that communicates with an api that controls nginx or apache). The scripts 231 can be install scripts that may run while or after booting an image or after starting the daemon or enabling the service.

The template 230 also may contain a kernel 235 and a pre-boot filesystem 236. The template 230 may also contain a plurality of kernels 235 and one or more pre-boot filesystems (such as initrds or initramfs for Linux or a read-only ramdisk for bsd) for different hardware and different configurations. The initrd may also be used for mounting filesystem blobs 232 presented as overlays and mounting a root filesystem on remote storage by booting into an initramfs 236 that can connect to a storage resource optionally through the SAN connection 280 as discussed below.

The filesystem blobs 232 are filesystem images that may be divided into separate blobs. The blobs may be interchangeable based on configuration options, hardware types, and other differences in setups. Hosts booted from templates 230 may be booted from a union filesystem (such as overlayfs) containing a plurality of blobs or an image created from one or a plurality of filesystem blobs.

The template 230 may also include or be linked with additional information 237 such as volatile data 238 and/or configuration parameters 239. For example, volatile data 238 may be contained in the template 230 or it may be contained externally. It may be of in the form of filesystem blobs 232 or other datastores including but not limited to databases, flat files, files stored in directories, tarball of files, git or other version control repository. In addition configuration parameters 239 may be contained externally or internally to the template 230 and are optionally contained in the system rules and applied to the template 230.

The system 100 further comprises an IT system state 220 that tracks, maintains, changes and updates the status of the system 100 including, but not limited to, resources. The system state 220 may track available resources, which will tell the controller logic if and what resources are available for implementation of the rules, and templates. The system state may track used resources which allows the controller logic 205 to examine efficiency, utilize efficiencies, whether there is a need to switch for upgrading or other reason, such as to improve efficiencies or for priorities. The system state may track what applications are running. The controller logic 205 may compare expected applications running versus actual applications running according to the system state, and whether there is a need to revise. The system state 220 may also track where applications are running. The controller logic 205 may use this information for purposes of evaluating efficiency, change management, updating, trouble-shooting, or audit trails. The system state may track networking information, e.g., what networks are on or currently running or configuration values and history. The system state 220 may track a history of changes. The system state 220 may also track which templates are used in which deployment based on the global system rules that prescribe which templates are used. The history may be used for auditing, alerting, change management, building reports, tracking versions correlated with hardware and applications and configurations, or configuration variables. The system state 220 may maintain a history of configurations for purposes of auditing, compliance testing or trouble-shooting.

The controller has a logic 205 for managing all the information contained in the system state, templates, and global system rules. The controller logic 205, global system rules database 210, IT system state 220, and templates 230 are managed by the controller 200 and may or may not reside on the controller 200. The controller logic or application 205, global system rules database 210, IT system state 220, and templates 230 may be physical or virtual and may or may not be distributed services, distributed databases, and/or files. The API application 120 may be included with the controller logic/controller application 205.

The controller 200 may run a stand-alone machine and/or may comprise one or more controllers. The controller 200 may comprise a controller service or application and may run inside another machine. A controller machine may start up the controller service first to ensure orderly and/or consistent booting of the entire stack or group of stacks.

The controller 200 may control one or more stacks with compute, storage, and networking resources. Each stack may or may not be controlled by different subsets of rules within the global system rules 210. For example, there may be pre-production, production, development, testing stack, parallel, backup, and/or other stacks having different functions within a system.

The controller logic 205 may be configured to read and interpret global system rules to achieve the desired IT system state. The controller logic 205 may be configured to use templates according to the global rules to build system components such as applications or services, and to allocate, add, or remove resources to achieve a desired IT system state. The controller logic 205 may read the global system rules develop a list of tasks to get to the correct state and issue instructions to fulfill the rules based on available operations. The controller logic 205 may contain logic for executing operations, e.g. start up system, add, remove, reconfigure resources; identify what is available to do. The controller logic may check the system state at start up time and at regular intervals to see if hardware is available and if available, may execute task. If the necessary hardware is not available, the controller logic 205 uses global system rules 210, templates 220 and available hardware from the system state 230 to present alternative options and amend the global rules and/or system state 220 accordingly.

The controller logic 205 may know what variables are required, what a user needs to input to continue or a what user needs in the system to function. The controller logic may use the list of templates from the global system rules and compare to templates required in the system state to ensure required templates are available. The controller logic 205 may identify from system state database, if resources on a list of templates specific supported resources are available. The controller logic may allocate the resources, update the state and go to the next set of tasks to implement the global rules. The controller logic 205 may start/run applications on allocated resources as specified in the global rules. The rules may specify how to build an application from templates. The controller logic 205 may grab template(s) and configure applications from variables. The template may tell the controller logic 205 which kernel, boot files, filesystems and supported hardware resources are required. Then, the controller logic 205 may add the information concerning the application deployment to system state database. After each instruction, controller logic 205 may check the system state database versus expected state of the global rules to verify if the expected operation completed correctly.

Controller logic 205 may use versions according to version rules. The system state 220 may have a database correlating which rules version has been used in different deployments.

The controller logic 205 may include efficient logic to rule optimization and efficient order. The controller logic 205 may be configured to optimize resources. The information in the system state, rules and templates relating to applications that are running or are expected to be running, may be used by the controller logic to implement efficiencies or priorities with respect to resources. Controller logic 205 may use information in "used resources" in the system state 220 to determine efficiency or a need to switch resources for upgrading, repurposing or other reason.

The controller may check applications running according to the system state 220 and compare to the expected applications running of the global rules. If an application is not running it may start it. If an application should not be running it may stop it and reallocate resources if appropriate. The controller logic 205 may include a database of resource (compute, storage networking) specifications. The controller logic may include logic to recognize resource types available to the system that can be used. This may be performed using out of band management network 260. The controller logic 205 may be configured to recognize new hardware using out of band management 260. The controller logic 205 may also take the information from the system state 220 on the history of changes, rules used and versions, for purposes of auditing, building reports and change management.

FIG. 2F shows an example process flow for controller logic 205 with respect to processing a template 230 and deriving an image to boot, power on, and/or enable a resource, which for purposes of this example can be referred to as a host. This process may also include configuring the storage resource and coupling the storage and compute hosts and/or resources. The controller logic 205 knows the hardware resources that are available in the system 100, and the system rules 210 may indicate which hardware resources are able to be utilized. The controller logic 205, at step 205.1, parses a template 230 which may include an instruction file that may be executed to cause the controller logic to gather files that are external to the template 230 shown by FIG. 2E. The instruction file may be in a json format. At step 205.2, the controller logic gathers a list of file buckets that are needed. And, at step 205.3, the controller logic 205 gathers the needed hardware-specific files into buckets which are referenced by hardware and optionally by hypervisor (or container host system, multitenancy type). A hypervisor (or container host system or multitenancy type) reference may be needed if the hardware is to be run on a virtual machine.

If there are hardware-specific files, the controller logic will gather the hardware-specific files at step 205.4. In some cases, the file system image may contain the kernel and initramfs along with a directory that contains kernel modules (or kernel modules eventually placed into a directory). The controller logic 205 then picks the appropriate base image that is compatible at step 205.5. A base image contains operating system files that might not be specific to the application or image being derived from the template 230. Compatibility in this context means that the base image contains the files needed to turn the template into a working application. The base images may be managed outside the templates as a mechanism for saving space (and often times the base images may be the same for several applications or services). In addition, at step 205.6, the controller logic 205 picks bucket(s) with executables, source code, and hardware-specific configuration files. The template 230 may reference other files, including but not limited to configuration files, configuration file templates (which are configuration files that contain placeholders or variables that are filled with variables in the system rules 210 that may be made known in the template 230 so that the controller 200 can turn configuration templates into configuration files and may change configuration files optionally through API endpoints), binaries, and source code (that may be complied when the image is booted). At step 205.7, the hardware-specific instructions corresponding to the elements picked at steps 205.4, 205.5, and 205.6 may be loaded as part of the image that is booted. The controller logic 205 derives an image from the selected components. For example, there may be a different preinstall script for a physical host versus a virtual machine, or a difference for powerpc versus x86.

At step 205.8, the controller logic 205 mounts overlayfs and repackages the subject files into a single filesystem blob. When multiple filesystem blobs are used, an image may be created with multiple blobs, decompressing tarballs and/or fetching git. If step 205.8 is not performed, the filesystem blobs may remain separate, and the image is created as a set of filesystem blobs and mounted with a filesystem capable of mounting multiple smaller filesystems together (such as overlayfs). The controller logic 205 may then locate a compatible kernel at step 205.9 (or a kernel specified in the system rules 210) and locate an applicable initrd at step 205.10. A compatible kernel can be a kernel that satisfies the dependencies of the template and the resources used to implement the template. A compatible initrd can be an initrd that will load the template on the desired compute resource. Often times, an initrd may be used for physical resources so that it can mount the storage resources before fully booting (as the root filesystem may be remote). The kernel and initrd may be packaged into a filesystem blob, used for direct kernel boot, or used on a physical host using kexec to change kernels on a live system after booting a preliminary operating system.

The controller then configures the storage resource(s) to allow the compute resource(s) to power the application(s) and/or image(s) using any of the techniques shown by 205.11, 205.12, and/or 205.13. With 205.11, overlayfs files can be provided as storage resources. With 205.12, a filesystem is presented. For example, the storage resources may present a combined filesystem or multiple filesystem blobs that the compute resources may mount simultaneously using a filesystem similar to overlayfs. With 205.13, blobs are sent to storage resources before presenting the filesystem.

FIGS. 2G and 2H show an example process flows for steps 205.11 and 205.12 of FIG. 2F. Further still, the system can employ a process and rules for connecting a computer resource to a storage resource, which can be referred to as a storage connection process. An example of such a storage connection process in addition to that shown by FIGS. 2G and 2H is provided in Appendix A enclosed herewith. FIG. 2G shows an example process flor for connection of a storage resource. Some storage resources may be read-only and others may be writeable. The storage resource may manage its own write-locking so that there are no simultaneous writes causing race conditions or the system state 220 may track (see, e.g., step 205.20) which connections may write to a storage resource and/or prevent multiple read-write connections to the resource (step 205.21). The controller logic or the resource itself may query the controller's system state 220 for the location of the storage resources and the transport types (e.g., Internet Small Computer System Interface (ISCSI, iSCSI, or iscsi), ISCSI extensions for RDMA (ISER, iSER, or iser), non-volatile memory express over fabrics (NVMEOF or nvmeof), fibre channel (FC or fc), FC over Ethernet (FCOE, FCOE, or fcoe), Network File System (NFS or nfs), nfs over rdma, Andrew File System (AFS or afs), Common Internet File System (CIFS or cifs), windows share) (step 205.22). If the compute resource is virtual, the hypervisor (e.g., via a hypervisor daemon) may handle the connection to the storage resources (Step 205.23). This may have desirable security benefits as the virtual machines may have no knowledge of the SAN 280.

With reference to step 205.24, the process to connect a compute resource and storage resource may be dictated in system rules 210. The controller logic then queries the system state 220 to make sure the resource is available and writeable if necessary (step 205.22). The system state 220 can be queried via any of a number of techniques, such as SQL queries (or other types of database queries), JSON parsing, etc. The query will return the necessary information for the compute resource to connect to the storage resource. The controller 200, system state 220, or system rules 210, may provide authentication credentials for the compute resource to connect to the system state (step 205.25). The compute resource will then update the system state 220 either directly or via the controller (step 205.26).

FIG. 2H illustrates an example boot process of a physical, virtual, or other type of compute resource, application, service, or host powering on and connecting to a storage resource. The storage resources may optionally make use of fusion filesystems and/or expandable volumes. In the situation where the controller or other system enables a physical host, the physical host may be preloaded with an operating system for configuring the system. Accordingly, at step 205.31, the controller may preload a boot disk with initramfs. Also, the controller 200 may use out of band management connection 260 to network boot a preliminary operating system (step 205.30) and then optionally preload the host with a preliminary operating system (step 205.31). The initramfs then loads at step 205.32, and the storage resource is connected at step 205.33 using methods shown in FIG. 2G. Then, if there are expandable volumes, the sub volumes or devices that are coupled together are assembled optionally at step 205.34 as a volume group if logical volume management (LVM) is in use. Or, they may be coupled at step 205.34 using other methods of combining disks.

If a fusion filesystem is in use, the files may be combined at step 205.36, and then the boot process is continued (step 205.46). If overlayfs is in use in linux to fix some known issues, the following sub-process may be run. A/data directory may be made in each mounted filesystem blob that may be volatile (step 205.37). Then, a new_root directory may be created at step 205.38, and the overlayfs is mounted into the directory at step 205.39. Then, the initramfs runs exec_root on/new_root (step 205.40).

If the host is a virtual machine (VM), additional tools such as direct kernel boot may be available. In this situation, the hypervisor may connect to the storage resources before booting the VM (step 205.41), or it may do this while booting. The VM may then be direct kernel booted along with loading the initramfs (step 205.42). The initramfs then loads at step 205.43, and the hypervisor may at this point connect to the storage resources which may be remote (step 205.44). In order for this to be accomplished, the hypervisor host may need to pass in an interface (for instance, if inifiniband is needed to connect to an iSER target, it may pass in an SR-IOV based virtual function using pci-passthru or in some situations may use paravirtualized network interfaces). These connections are usable by the initramfs. The virtual machine may then connect to the storage resource at step 205.45 if it has not already. It may also receive its storage resources through the hypervisor (optionally through paravirtualized storage). The process can be similar for virtual machines that are optionally mounting fusion filesystems and LVM style disks.

Figure 2O:
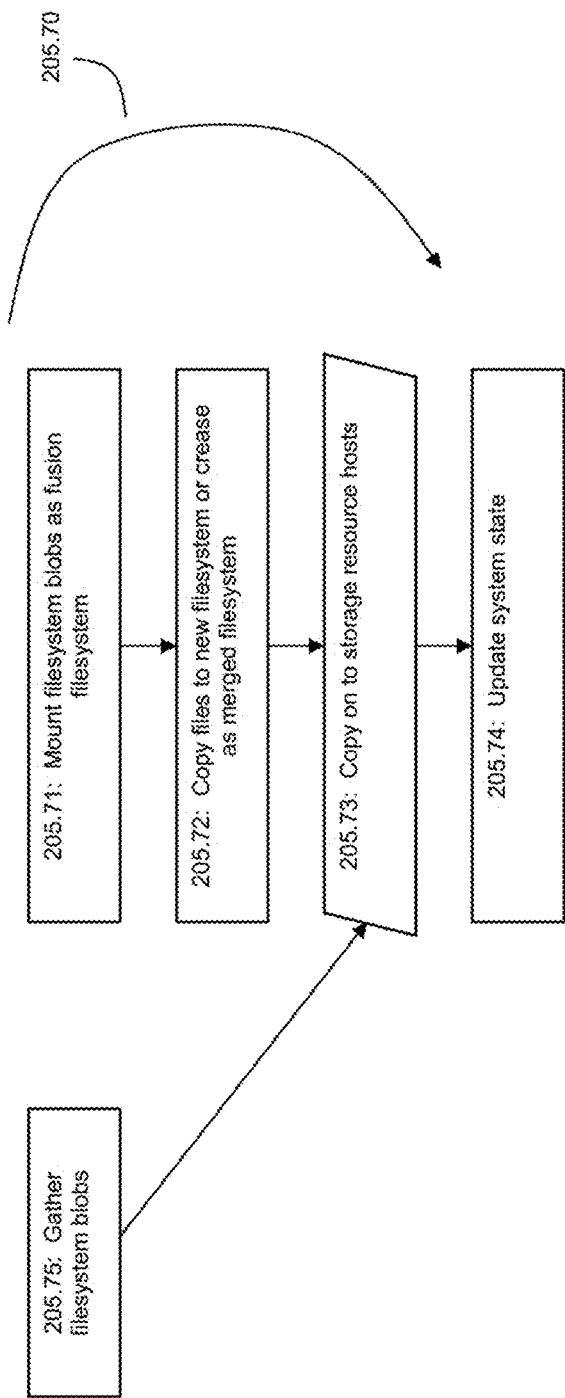
FIG. 2O illustrates an example process flow for configuring a storage resource from filesystem blobs or other groups of files.

FIG. 2O illustrates an example process flow for configuring a storage resource from filesystem blobs or other groups of files as at 205.13. The blobs are gathered at step 205.75; and they may be copied directly at 205.73 onto the storage resource hosts (if the storage resource host is different than the device that holds the filesystem blobs 232). Once the storage resources are in place the system state is then updated at 205.74 with the location of the storage resource and transports available (e.g. iSER, nvmeof, iSCSI, FcoE, Fibre Channel, nfs, nfs over rdma). Some of these blobs may be read only, and then in that case the system state remains the same and the new compute resource or host may connect to that read-only storage resource (for example when connecting to a base image). In some cases it may be desirable as shown by 205.70 to place the files in a single filesystem image to avoid any fusion filesystem overhead. This may be accomplished by mounting the blobs as a fusion filesystem (step 205.71) then copying them into a new filesystem or repackaging them as a single file system (step 205.72) and then optionally copying the new filesystem image to an appropriate place for the new filesystem image to be presented as a storage resource. Some fusion filesystems may allow merging to be accomplished without first mounting it at step 205.71 and to merge them in a single step.

FIG. 2I illustrates another example template 230 as shown in FIG. 2E. In this example, the controller may be configured to use templates 230 as shown by FIG. 2I with an intermediary configuration tool. According to an example embodiment, the intermediary configuration tool may comprise a common API used to couple the new applications or services with dependency applications or services. Accordingly, the template 230 may additionally comprise a list of dependencies 244 that may be required to set up the services of the template. The template 230 may also contain connection rules 245 that may contain calls to the common API of the dependency. The template 230 may also comprises one or a plurality of common APIs 243 and a list of the common APIs and versions 242. The common APIs 243 may have methods, functions, scripts, or instructions, which may be callable (or not) from the application or the controller, that allow the controller to configure the dependency application or service so that the dependency application or service may then be coupled to the new application being built by the template 230. The controller may communicate with the common API 243 and/or make API calls to configure the coupling of the new service or application and the dependency service or application. Alternatively, the instructions may allow the application or service to communicate with and/or send calls to the common API 243 on the dependency application or service directly. The template 230 connection rules 245 which are a set of rules and/or instructions that may contain API calls on connecting the new service or application with a dependency service or application.

The system state 220 may further comprise a list of running services 246. The list of running services 246 may be queried by the controller logic 205 to seek to satisfy dependencies 244 from the template 230. The controller may also comprise a list 247 of different common API's available for a specific service/application or type of service/application and also may include the templates that contain the common APIs. The list may reside in controller logic 205, system rules 210, system state 220 or in a template storage that the controller can access. The controller also maintains an index of common APIs 248 compiled from all existing or loaded templates.

FIG. 2J illustrates an example process flow for controller logic 205 with respect to processing a template 230 as shown by FIG. 2F but with an step 255 for the controller managing the service dependencies. FIG. 2K shows an example process flow for step 255 of FIG. 2J. At step 255.1, the controller gathers a list of dependencies 244 from the template. The controller also gathers the list of common APIs 243 from the template. (A). At step 255.2, the controller narrows the list of possible dependency applications or services by comparing the list of common APIs 243 from the templates with the index of common APIs 248, as well as based on the type of application or service sought to satisfy the dependency. At step 255.3, the controller determines if the system rules 210 specify ways to satisfy dependencies.

If yes at step 255.3, then then the controller determines if the dependency service or application is running by querying the list of running templates (step 255.4) If no at step 255.4, the service application is run (and/or configured and then run) which may include the controller logic processing the template of the dependency service/application (step 255.5). If the dependency service or application is found at step 255.4 to be running, then process flow proceeds to step 255.6. At step 255.6, the controller, using the template, couples the new service or application being built to the dependency service or application. In coupling the new service or application and the dependency application/service, the controller will go through the template that it is processing and will run the connection rules 245. The controller sends commands to the common API 243 based on the connection rules 245 on how to satisfy the dependencies 244 and/or couple the applications/services. The common API 243 translates the instructions from the controller to connect the new service or application and the dependency application or service which may include but are not limited to calling the service's API functions, changing configurations, running scripts, calling other programs. Following step 255.6, the process flow proceeds to step 205.2 of FIG. 2J.

If step 255.3 results in a determination that the system rules 210 do not specify the way to satisfy a dependency, then the controller will query the system state 220 at step 255.7 to see if an appropriate dependency application or service is running. At step 255.8, the controller makes its determination based on the query as to whether an appropriate dependency application or service is running. If no at step 255.8, then the controller may notify an administrator or user for action (step 255.9). If yes at step 255.8, the process flow then proceeds to step 255.6 which can operate as discussed above. The user may be optionally queried as to whether the new application should connect to the running dependency application, in which case the controller may couple the new application or service to the dependency application or service as follows at step 255.6: the controller will go through the template 230 that it is processing and will run the connection rules 245. The controller then sends commands to the common API 243 based on the connection rules 245 on how to satisfy the dependencies 244. The common API 243 translates the instructions from the controller to connect the new service or application and the dependency application or service.

A user by way of an external user interface or Web UI, or an application, communicates with the controller 200 through an API application 120 which may also be incorporated into the controller application or logic 205.

The controller 200 communicates with the stack or resources by way of one or more of multiple networks, interconnects, or other connections through which the controller can instruct the compute storage and networking resources to operate. Such connections may include: an out of band management connection 260; an in band management connection 270; a SAN connection 280, and an optional on network in band management connection 290.

The out of band management may be used by the controller 200 to detect, configure, and manage components of the system 100 through the controller 200. The out of band management connection 260 may enable the controller 200 to detect a resource which is plugged in and available, but not turned on. The resource when plugged in, may be added to the IT system state 220. Out of band management may be configured to load boot images, configure, and monitor resources belonging to the system 100. The out of band management may also boot temporary images for diagnostics of an operating system. The out of band management may be used to change BIOS settings, and may also use the console tools to run commands on a running operating system. The settings may also be changed by the controller using ta console, keyboard, and image recognition of video signals from a physical or virtual monitor port on a hardware resource such as a VGA, DVI or HDMI port and/or using the API provided by the out of band management, e.g. Redfish.

Out of band management as used herein may include but is not limited a management system able to connect to a resource or a node independent of the operating system and the main motherboard. The out of band management connection 260 may comprise a network or plurality of types direct or indirect connections or interconnects. Examples of out of band management connection types include but are not limited to IPMI, Redfish, SSH, telnet, other management tools, keyboard video and mouse (KVM) or KVM over IP, serial consoles, or USBs. Out of band management is a tool that may be used over a network, that may power on and off the node or resource, monitor temperatures and other system data; make BIOS and other low level changes that may be outside of the operating system's control; connect to a console and send commands; control inputs including but not limited to keyboard, mouse, monitor. Out of band management may be coupled to an out of band management circuit in a physical resource. Out of band management may connect a disk image as a disk that may be used for booting install media.

The management network or in band management connection 270 may allow the controller to gather information on the compute, storage, networking or other resource, communicating directly to the operating system that the resource is running. Storage resources, compute resources or networking resources may comprise a management interface that interface with connections 260 and or 270 whereby they may communicate with the controller 200 and tell the controller what is running and what is available for resources and receive commands from the controller. An in band management network as used herein comprises a management network able to communicate with a resource, directly to the operating system of the resource. Examples of in band management connections may include but are not limited to SSH, telnet, other management tools, serial consoles, or USBs.

While the out-of-band management is described herein as a physically or virtually separated network from the in band management network, they may be combined or may work in conjunction with each other for purpose of efficiencies as described in more detail herein. And accordingly out of band and in band management or aspects thereof may communicate through the same port of a controller or be coupled with a combined interconnect. Optionally one or more of connections 260, 270, 280, 290, may be separate or combined with other of such networks and may or may not comprise the same fabric.

In addition the compute resources, storage resources, and controller may or may not be coupled to a storage network (SAN) 280 in a manner that the controller 200 can use the storage network to boot each resource. The controller 200 may send the boot images or other templates to a separate storage or other resource or other resource so that other resources can boot off of the storage or other resource. The controller may instruct where to boot from in such situation. The controller may power on a resource, instruct the resource from where to boot and how to configure itself. The controller 200 instructs the resource how to boot, what image to use, and where the image is located if that image is on another resource. The BIOS's resources may be pre-configured. The controller may also or alternatively configure the BIOS through out of band management so that they will boot off the storage area network. The controller 200 may also be configured to boot an operating system from an ISO and enable the resource to copy data to local disks. The local disks may then subsequently be used for booting. The controller may configure other resources including other controllers, in such a way that the resources can boot. Some resources may comprise an application that provides compute, storage, or networking function. In addition it is possible for the controller to boot up a storage resource and then make the storage resource responsible for supplying the boot image of the subsequent resources or services. The storage may also be managed over a different network that is being used for another purpose.

Optionally, one or more of the resources may be coupled to an on network in band management connection 290. The connection 290 may comprise one or more types of in band management as described with respect to in band management connection 270. The connection 290 may connect the controller to application network to make use of the networks or to manage them through in band management networks.

FIG. 2L illustrates an image 250 that may be loaded directly or indirectly (through another resource or database) from a template 230 to a resource to boot the resource or applications or services loaded on the resource. The image 250 may comprise boot files 240 for the resource type and hardware. The boot files 240 may comprise a kernel 241 corresponding to a resource, application or service to be deployed. Boot files 240 may also comprise an initrd or similar filesystem used to aid the booting process. The boot system 240 may comprise a plurality of kernels or initrds configured for different hardware types and resource types. In addition the image 250 may comprise a filesystem 251. The filesystem 251 may comprise a base image 252 and corresponding file system as well as a service image 253 and corresponding files system and a volatile image 254 and corresponding filesystem. The file systems and data loaded may vary depending on the resource type and applications or services to be running. The base image 252 may comprise a base operating system file system. The base operating system may be read only. The base image 252 may also comprise basic tools of the operating system independent of what is being run. The base image 252 may include base directories and operating system tools. The service filesystem 253 may include configuration files and specifications for the resource, application or service. The volatile filesystem 254 may contain information or data specific to that deployment such as binary applications, specific addresses and other information, which may or may not be configured as variables including but not limited to passwords, session keys and private keys. The filesystems may be mounted as one single filesystem using technologies such as overlayFS to allow for some read only and some read-write filesystems reducing the amount of duplicate data used for applications.

Figure 11A:
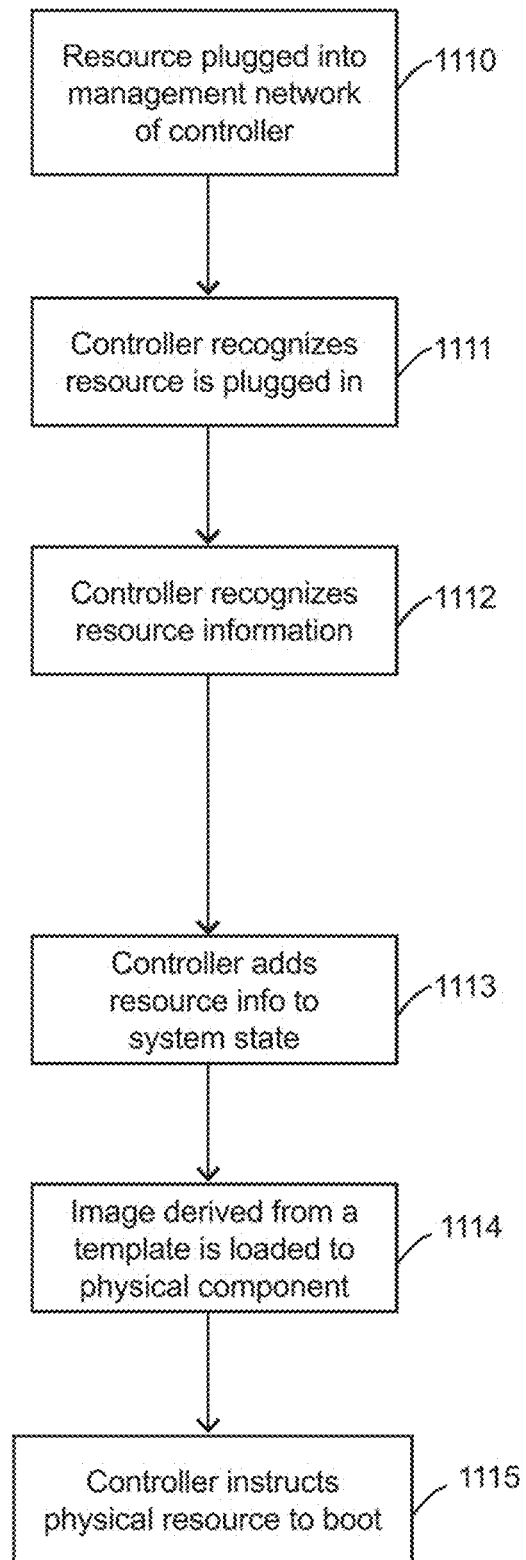
FIG. 11A illustrates a system and method of an example embodiment.

As noted above, the controller 200 can be used to add resources such as compute, storage, and/or networking resources to the system. FIG. 11A illustrates an example method for adding a physical resource such as a baremetal node to a system 100. A resource, i.e., compute, storage or networking resource, is plugged into the controller by way of network connections 1110. The network connections may include an out of band management connection. The controller recognizes that the resource is plugged in through out of band management connection 1111. The controller recognizes information relating to the resource, which may include but is not limited to the resource's type, capabilities and/or attributes 1112. The controller adds the resource and/or information relating to the resource to its system state 1113. An image derived from a template is loaded to physical component of a system, which may include but is not limited to a resource, on another resource such as storage resources, or on the controller 1114. The image comprises one or more filesystems that may include configuration files. Such configurations may include BIOS and booting parameters. The controller instructs the physical resource to boot using the filesystem of the image 1115. Additional resources or a plurality of bare-metal or physical resources of different types may be added in this manner using the image of the template or at least a portion thereof.

Figure 11B:
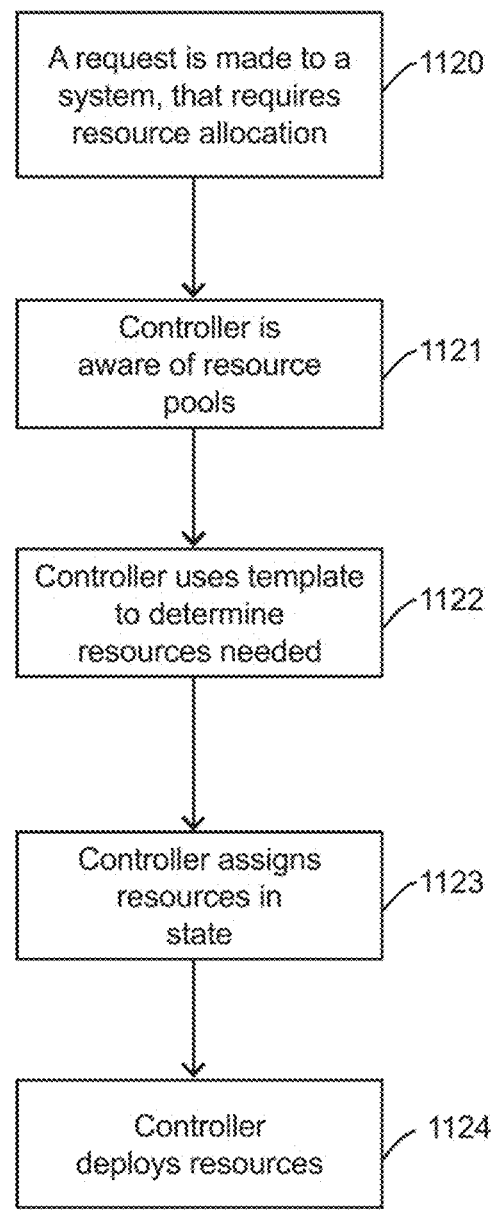
FIG. 11B illustrates a system and method of an example embodiment.

FIG. 11B illustrates an example method of automatically allocating resources using the global system rules and templates of an example embodiment. A request is made to the system that requires resource allocation to satisfy the request 1120. The controller is aware of its resource pools based on its system state database 1121. The controller uses a template to determine the resources needed 1122. The controller assigns the resources and stores the information in the system state 1123. The controller deploys the resources using the template 1124.

Figure 12:
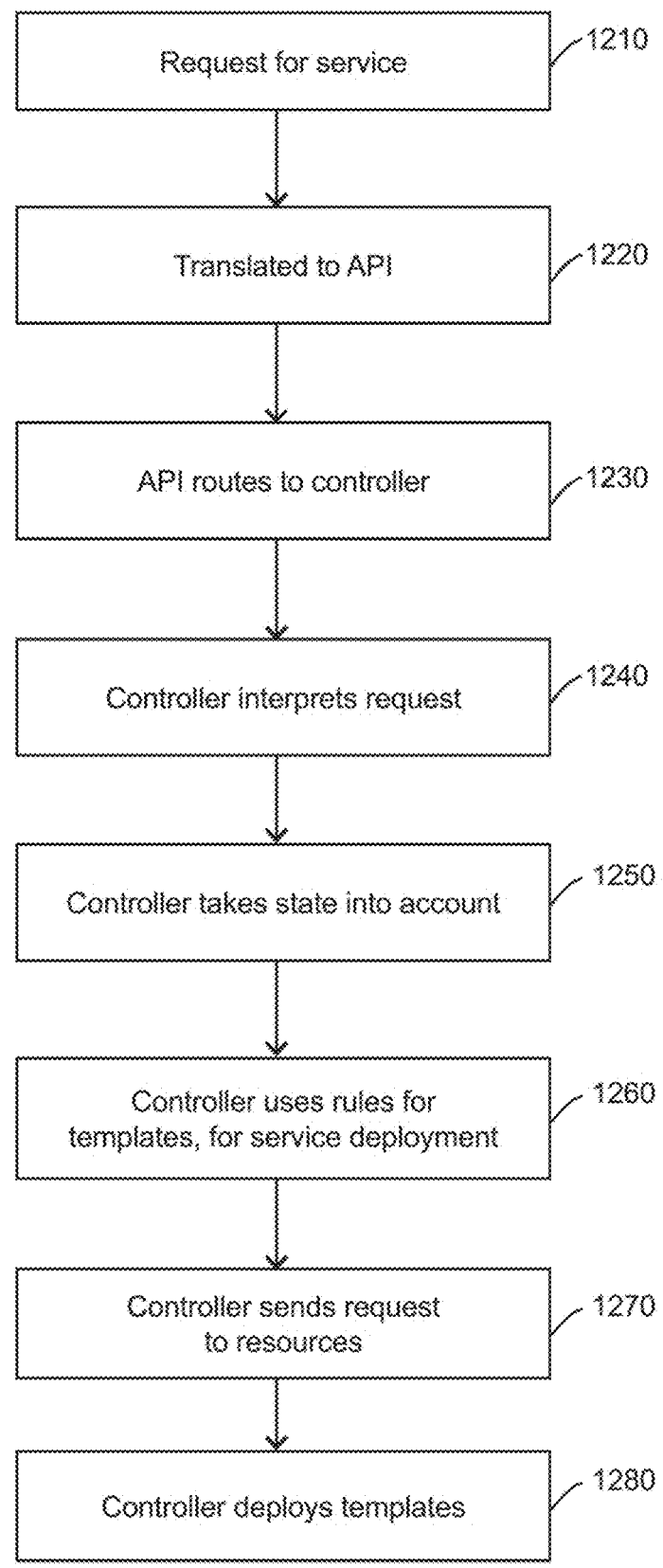
FIG. 12 illustrates a system and method of an example embodiment.

Referring to FIG. 12, an example method for automatically deploying an application or service is illustrated using a system 100 described herein. A user or an application makes a request for a service 1210. The request is translated to the API application 1220. The API application routes the request to the controller 1230. The controller interprets the request 1240. The controller takes the state of the system and its resources into account 1250. The controller uses its rules and templates for service deployment 1260. The controller 1270 sends a request to resources 1270 and deploys an image derived from the template 1280 and updates the IT system state.

Figure 3A:
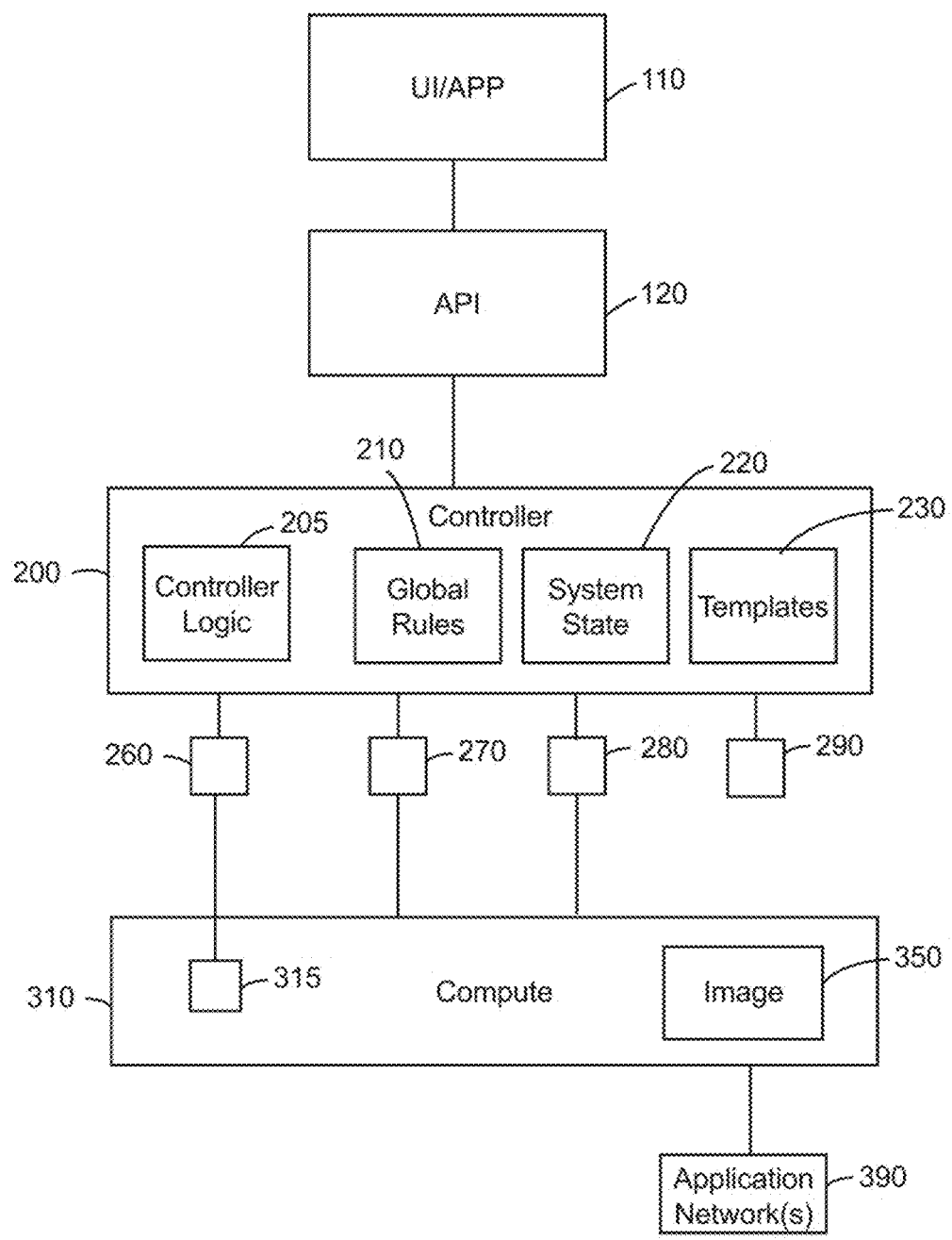
FIG. 3A is a schematic of the controller of FIG. 2A to which a compute resource is added.

Additional and more detailed examples of operations such as adding resources, allocating resources, and deploying applications or services are discussed in greater detail below. Adding a Compute Resource to the System:

Referring to FIG. 3A, an addition of a compute resource 310 to the system 100 is illustrated. When the compute resource 310 is added, it is coupled to the controller 200 and may be powered off. Note that if the compute resource 310 is pre-loaded with the image, alternative steps may be followed where any of the network connections may be used to communicate with the resource, boot the resource and add the information to the system state. If the compute resource and the controller are on the same node, the services that run the compute resource are off.

As shown in FIG. 3A, the compute resource 310 is coupled to the controller by way of the networks: the out of band management connection 260, the in band management connection 270, and optionally the SAN 280. The compute resource 310 is also coupled to one or more application networks 390 where services, applications users and/or clients can communicate with each other. The out of band management connection 260 may be coupled to an independent out of band management device 315 or circuit of the compute resource 310 which is turned on when the compute resource 310 is plugged in. The device 315 may allow features including but not limited to power on/off the device, attaching to the console and typing commands, monitoring temperatures and other computer health related elements, and setting BIOS settings and other features out of scope from the operating system. The controller 200 may see the compute resource 310 through the out of band management network 260. It may also identify the type of compute resource and identify its configuration using in band management or out of band management. The controller logic 205 is configured to look through out of band management 260 or in band management 270 for added hardware. If a compute resource 310 is detected, then the controller logic 205 may use the global system rules 220 to determine whether the resource is to be configured automatically or by interacting with the user. If it is added automatically, the set up will follow global system rules 210 within the controller 200. If it is added by the user, the global system rules 210 within the controller 200 may ask the user to confirm addition of the resource and what the user wants to do with the compute resource. The controller 200 may query the API application or otherwise request the user or any program controlling the stack, for confirmation that the new resource is authorized. The authorization process may also be completed automatically and securely using cryptography to confirm the legitimacy of a new resource. The controller logic 205 the adds the compute resource 310 to the IT system state 220 including the switches or networks into which the compute resource 310 is plugged.

If the compute resource is physical, the controller 200 may power on the compute resource through the out of band management network 260 and the compute resource 310 may boot off an image 350 loaded from the templates 230, for example, by way of the SAN 280, using global system rules 210 and controller logic 205. The image may be loaded through other network connections or indirectly by way of another resource. Once booted, the information received through the in band management connection 270 relating to the compute resource 310 may also be gathered and added to the IT system state 220. The compute resource 310 may then be added to the storage resource pool and it becomes a resource that is managed by the controller 200 and tracked in the IT system state 220.

If the compute resource is virtual, the controller 200 may either power on the compute resource through the in band management network 270 or through out of band management 260. The compute resource 310 may boot off an image 350 loaded from the templates 230, for example, by way of the SAN 280, using global system rules 210 and controller logic 205. The image may be loaded through other network connections or indirectly by way of another resource. Once booted, the information received through the in band management connection 270 relating to the compute resource 310 may also be gathered and added to the IT system state 220. The compute resource 310 may them be added to the storage resource pool and it becomes a resource that is managed by the controller 200 and tracked in the IT system state 220.

The controller 200 may be able to turn resources on and off automatically according to global system rules and update the IT system state for reasons determined by the IT system user such as turning resources off to save power or turning on resources to improve application performance or any other reason the IT system user may have.

Figure 3B:
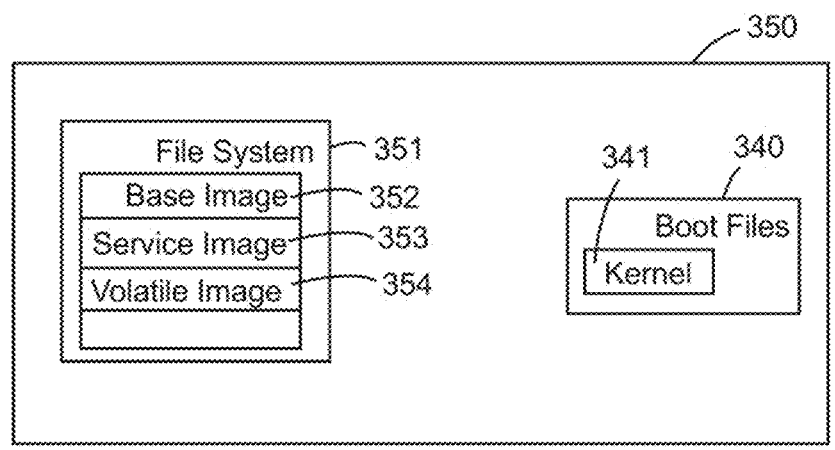
FIG. 3B is a schematic of an example image derived from a template according to an example embodiment.

FIG. 3B an image 350 is loaded directly or indirectly (through another resource or database) from templates 230 to the compute resource 310 for booting the compute resource and/or loading applications. The image 350 may comprise boot files 340 for the resource type and hardware. The boot files 340 may comprise a kernel 341 corresponding to a resource, application or service to be deployed. Boot files 340 may also comprise an initrd or similar filesystem used to aid the booting process. The boot system 340 may comprise a plurality of kernels or initrds configured for different hardware types and resource types. In addition the image 350 may comprise a filesystem 351. The filesystem 351 may comprise a base image 352 and corresponding file system as well as a service image 353 and corresponding files system and a volatile image 354 and corresponding filesystem. The file systems and data loaded may vary depending on the resource type and applications or services to be running. The base image 352 may comprise a base operating system file system. The base operating system may be read only. The base image 352 may also comprise basic tools of the operating system independent of what is being run. The base image 352 may include base directories and operating system tools. The service filesystem 353 may include configuration files and specifications for the resource, application or service. The volatile filesystem 354 may contain information or data specific to that deployment such as binary applications, specific addresses and other information, which may or may not be configured as variables including but not limited to passwords, session keys and private keys. The filesystems may be mounted as one single filesystem using technologies such as overlayFS to allow for some read only and some read-write filesystems reducing the amount of duplicate data used for applications.

Figure 3C:
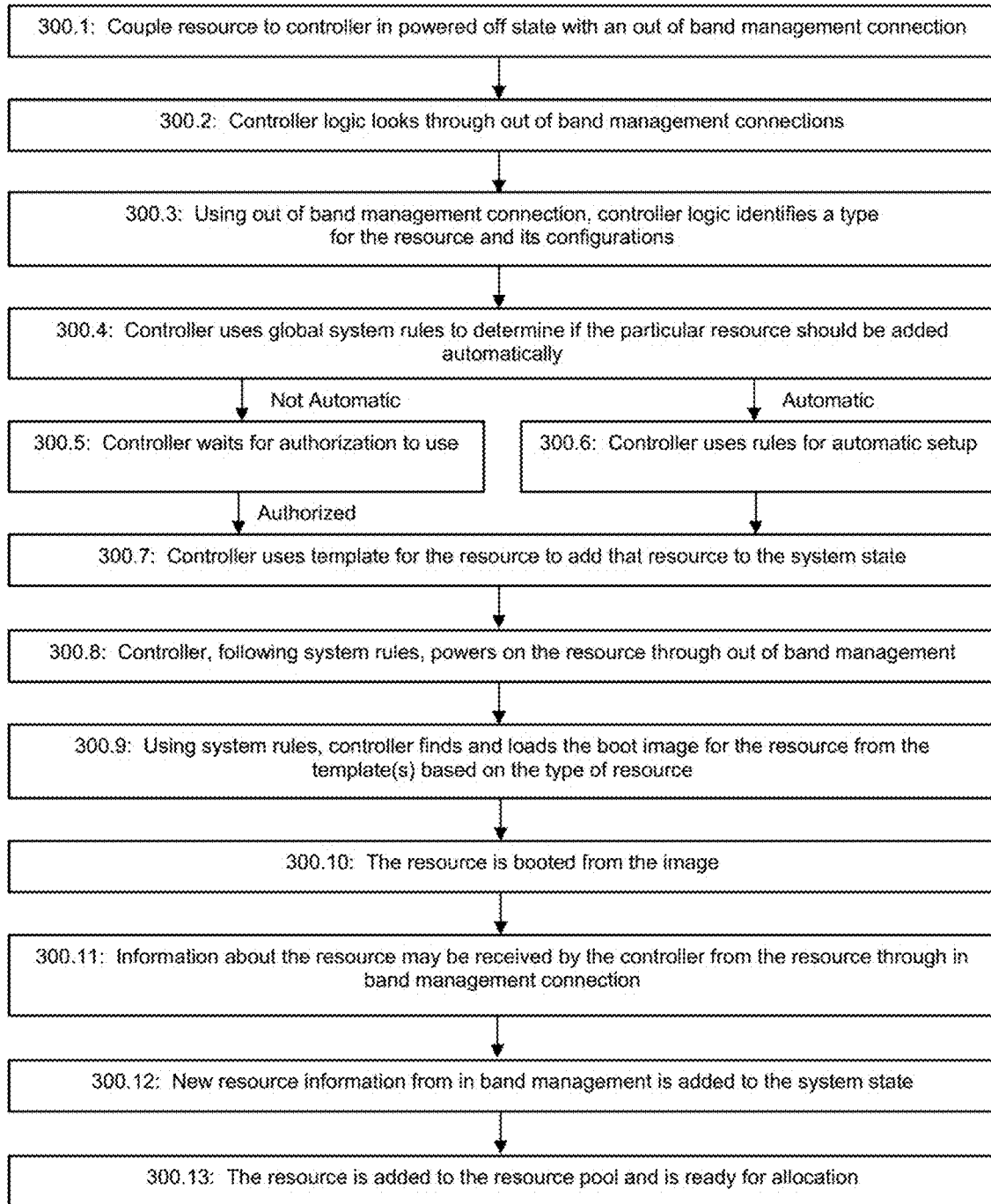
FIG. 3C illustrates an example process flow for adding a resource such as a compute resource, storage resource, and/or networking resource to a system.

FIG. 3C illustrates an example process flow for adding a resource such as a compute resource 310 to a system 100. While in this example, the subject resource will be described as a compute resource 310, it should be understood that the subject resource for the FIG. 3C process flow could also be a storage resource 410 and/or a networking resource 510. In the example of FIG. 3C, the added resource 310 is not on the same node as the controller 200. At step 300.1, the resource 310 is coupled to the controller 200 in a powered off state. In the example of FIG. 3C, an out of band management connection 260 is used to connect the resource 310. However, it should be understood that other network connections could be used if desired by a practitioner. At steps 300.2 and 300.3, the controller logic 205 looks through the system's out of band management connections and uses the out of band management connection 260 to recognize and identify the type of resource 310 that is being added and its configurations. For example, the controller logic can see the BIOS or other information (such as serial number information) for the resource as a reference for getting the type and configuration information.

At step 300.4, the controller uses global system rules to determine if the particular resource 310 should be added automatically. If not, the controller will wait until its use is authorized (step 300.5). For example, a user may respond to a query that it does not want to use the particular resource 310 or it may automatically be put on hold until it is to be used at step 300.4. If step 300.4 determines that the resource 310 should be added automatically, then the controller will use its rules for automatic set up (step 300.6) and proceed to step 300.7.

At step 300.7, the controller selects and uses the template 230 associated with the resource to add the resource to the system state 220. In some cases, the template 230 may be specific to a specific resource. However, some templates 230 may cover multiple resource types. For example, some templates 230 may be hardware agnostic. At step 300.8, the controller, following the global system rules 210, powers on the resource 310 through its out of band management connection 260. At step 300.9, using the global system rules 210, the controller finds and loads the boot image for the resource from the selected template(s). The resource 310 is then booted from the image derived from the subject template 230 (step 300.10). Additional information concerning the resource 310 may then be received from the resource 310 through in-band management connection 270 after the resource 310 is booted (step 300.11). Such information may include, for example, firmware versions, network card, any other devices to which the resource may be connected. The new information may be added to the system state 220 at step 300.12. The resource 310 may then be considered added to the resource pool and is ready for allocation (step 300.13).

With respect to FIG. 3C, if a resource and the controller are on the same node, it should be understood that the services that run the resource may be off that node. In such a case, the controller may use inter process communication techniques with the resource such as for example, unix socket, loop back adaptor or other inter process communication techniques to communicate with resource. From the system rules, the controller may install a virtual host, or hypervisor or container host to run the application using known templates from the controller. The resource application information can then be added to the system state 220, and the resource will be ready for allocation . . .

Figure 4A:
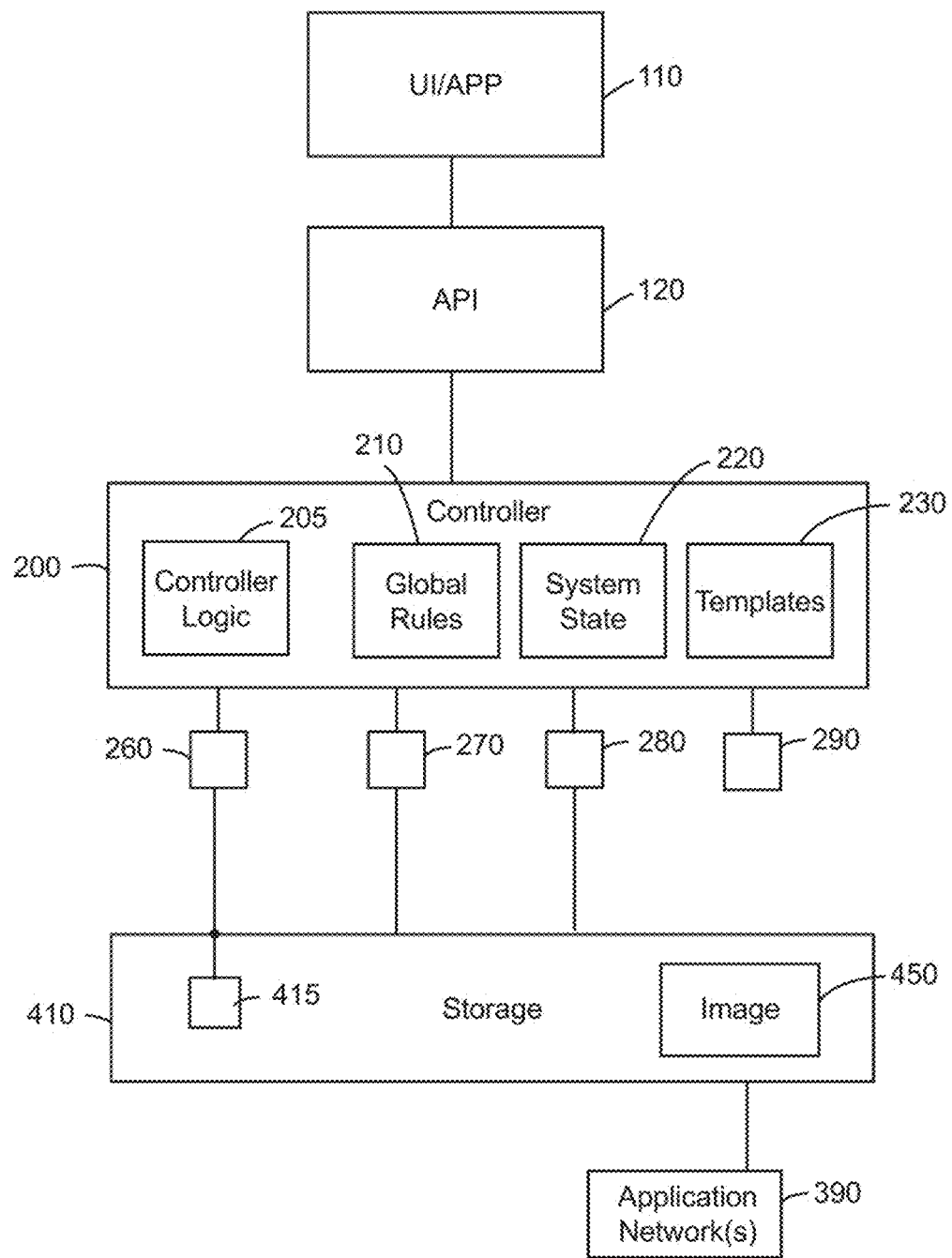
FIG. 4A is a schematic of the controller of FIG. 2A to which a storage resource is added.

Adding a Storage Resource to the System:

FIG. 4A illustrates an addition of a storage resource 410 to the system 100. In an example embodiment, the example process flow of FIG. 3C can be followed to add a storage resource 410 to the system 100, where the added storage resource 410 is not on the same node as the controller 200. Also, it should be noted that if the storage resource 410 is pre-loaded with the image, alternative steps may be followed where any of the network connections may be used to communicate with the storage resource 410, boot the storage resource 410, and add information to the system state 220.

When the storage resource 410 is added, it is coupled to the controller 200 and may be powered off. The storage resource 410 is couple to the controller by way of the networks: the out of band management network 260, the in band management connection 270, the SAN 280 and optionally the connection 290. The storage resource 410 may or may not also be coupled to one or more application networks 390 where services, applications users and/or clients can communicate with each other. An application or client may have direct or indirect access via an application, to the storage of a resource whereby it is not accessed through the SAN. An application network may have storage built into it or may be accessed and identified in the IT system state as a storage resource. The out of band management connection 260 may be coupled to an independent out of band management device 415 or circuit of the storage resource 410 which is turned on when the storage resource 410 is plugged in. The device 415 may allow features including but not limited to power on/off the device, attaching to the console and typing commands, monitoring temperatures and other computer health related elements, and setting BIOS settings and other features out of scope from the operating system. The controller 200 may see the storage resource 410 through the out of band management network 260. It may also identify the type of storage resource and identify its configuration using in band or out of band management. The controller logic 205 is configured to look through out of band management 260 or in band management 270 for added hardware. If a storage resource 410 is detected, then the controller logic 205 may use the global system rules 220 to determine whether the resource 410 is to be configured automatically or by interacting with the user. If it is added automatically, the set up will follow global system rules 210 within the controller 200. If it is added by the user, the global system rules 210 within the controller 200 may ask the user to confirm addition of the resource and what the user wants to do with the storage resource. The controller 200 may query the API application(s) or otherwise request the user or any program controlling the stack, for confirmation that the new resource is authorized. The authorization process may also be completed automatically and securely using cryptography to confirm the legitimacy of the new resource. The controller logic 205 adds storage resource 410 to the IT system state 220 including the switches or networks into which the storage resource 410 is plugged.

The controller 200 may power on the storage resource 410 through the out of band management network 260 and the storage resource 410 will boot off an image 450 loaded from the templates 230, for example, by way of the SAN 280, using global system rules 210 and controller logic 205. The image may also be loaded through other network connections or indirectly by way of another resource. Once booted, the information received through the in band management connection 270 relating to the storage resource 410 may also be gathered and added to the IT System state 220. The storage resource 410 is now added to the storage resource pool and it becomes a resource that is managed by the controller 200 and tracked in the IT system state 220.

The storage resource may comprise a storage resource pool or a plurality of storage resource pools that the IT system may independently or simultaneously use or access. When the storage resource is added it may provide to the IT system state a storage pool, a plurality of storage pools, part of a storage pool, and/or a plurality of parts of storage pools. The controller and/or storage resource may manage the various storage resources of the pools or groupings of such resources within the pools. Storage pools may contain a plurality of storage pools run on a plurality of storage resources. For example, flash storage disks or arrays caching platter disks or arrays or a storage pool on a dedicated compute node coupled with a pool on a dedicated storage node to simultaneously optimize bandwidth and latency.

Figure 4B:
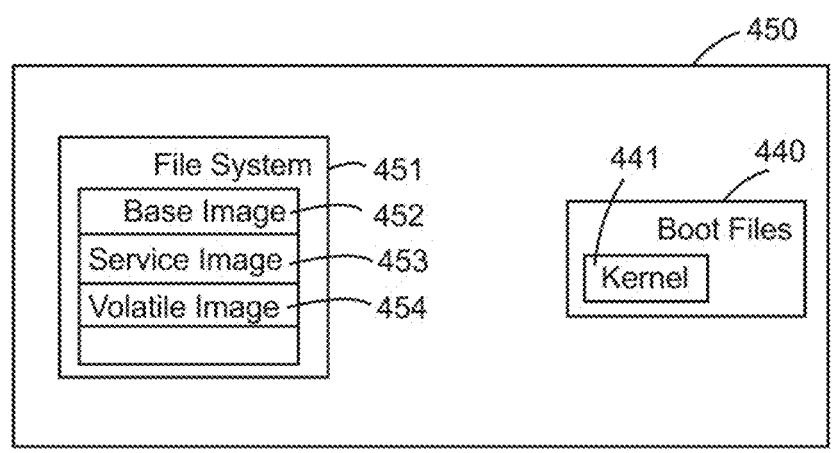
FIG. 4B is a schematic of an example image derived from a template according to an example embodiment.

FIG. 4B illustrates an image 450 loaded directly or indirectly (from another resource or database) from templates 230 to the storage resource 410 for booting the storage resource and/or loading applications. The image 450 may comprise boot files 440 for the resource type and hardware. The boot files 440 may comprise a kernel 441 corresponding to a resource, application or service to be deployed. Boot files 440 may also comprise an initrd or similar filesystem used to aid the booting process. The boot system 440 may comprise a plurality of kernels or initrds configured for different hardware types and resource types. In addition the image 450 may comprise a filesystem 451. The filesystem 451 may comprise a base image 452 and corresponding file system as well as a service image 453 and corresponding files system and a volatile image 454 and corresponding filesystem. The file systems and data loaded may vary depending on the resource type and applications or services to be running. The base image 452 may comprise a base operating system file system. The base operating system may be read only. The base image 452 may also comprise basic tools of the operating system independent of what is being run. The base image 452 may include base directories and operating system tools. The service filesystem 453 may include configuration files and specifications for the resource, application or service. The volatile filesystem 454 may contain information or data specific to that deployment such as binary applications, specific addresses and other information, which may or may not be configured as variables including but not limited to passwords, session keys and private keys. The filesystems may be mounted as one single filesystem using technologies such as overlayFS to allow for some read only and some read-write filesystems reducing the amount of duplicate data used for applications.

Figure 5A:
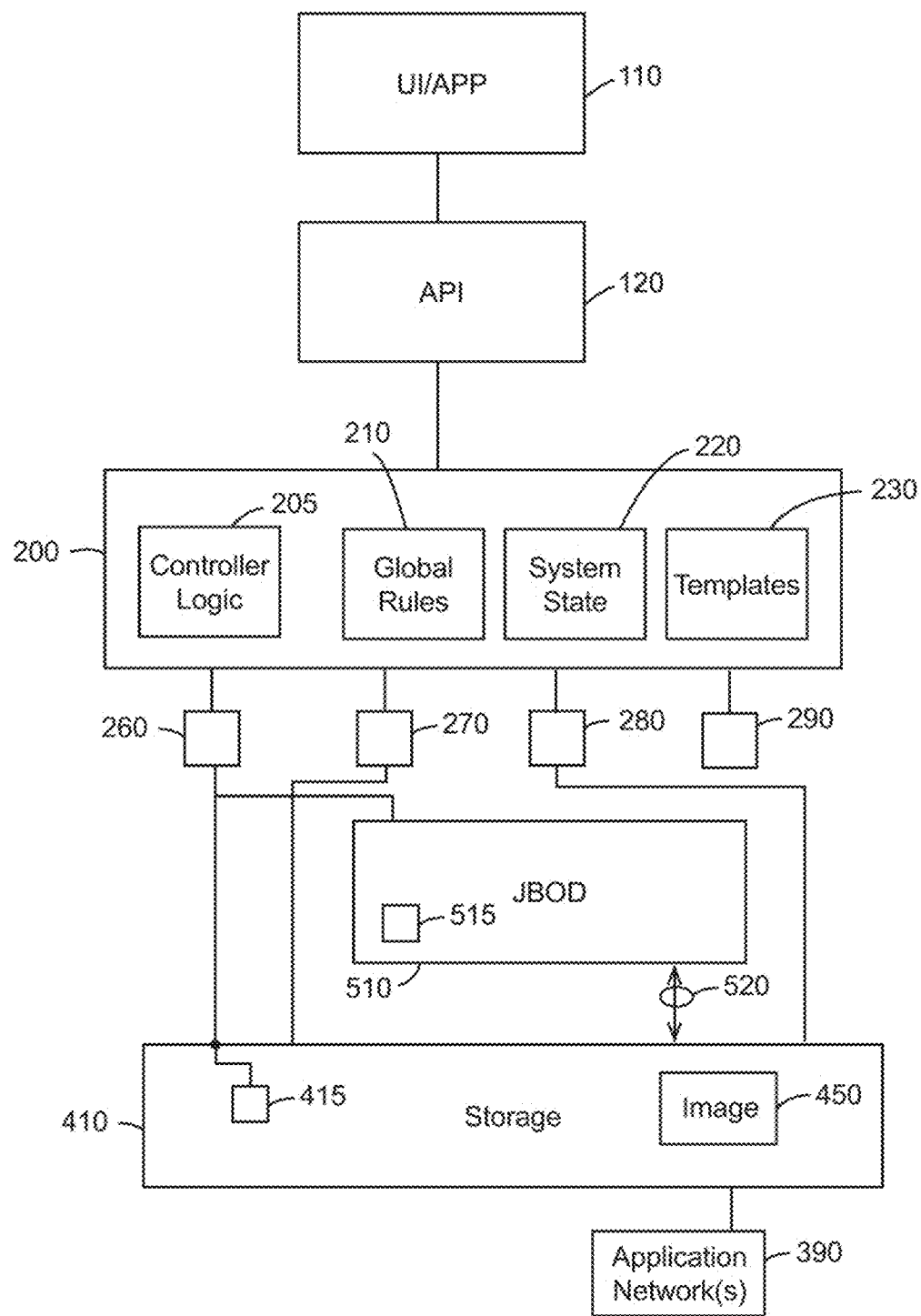
FIG. 5A is a schematic of the controller of FIG. 2A to which a JBOD and storage resource is added.

FIG. 5A illustrates an example where another storage resource, namely direct attached storage 510, which may take the form of a node with a JBOD or other type of direct attached storage, is coupled to the storage resource 410 as an additional storage resource for the system. A JBOD is an external disc array typically connected to a node that provides storage resources, and a JBOD will be used as the example form of direct attached storage 510 in FIG. 5A, although it should be understood that other type of direct attached storage could be employed as 510.

The controller 200 may add a storage resource 410 and JBOD 510 to its system for example as described with respect to FIG. 5A. A JBOD 510 is coupled to the controller 200 by way of the out of band management connection 260. The storage resource 410 is coupled to the networks: the out of band management connection 260, the in band management connection 270, the SAN 280 and optionally the connection 290. The storage node 410 communicates with the storage of the JBOD 510 through SAS or other disk drive fabric 520. The JBOD 510 may also comprise an out of band management device 515 that communicates with the controller through the out of band management connection 260. Through the out of band management 260 the controller 200 may detect the JBOD 510 and the storage resource 410. The controller 200 may also detect other parameters not controlled by the operating system, e.g., as described herein with respect to various out of band management circuits. The controller 200 global system rules 210 provide configuration start up rules for booting or starting up a JBOD and storage node that have not yet been added. The order of turning on storage resources may be controlled by controller logic 205 using the global rules 220. According to one set of global system rules, 220 the controller may first power on JBOD 510 and the controller 200 may then power on the storage resource 410 using loaded image 450 in a manner similar to that described with respect to FIG. 4. In another set of global system rules the controller 200 may first turn on the storage resource 410 and then the JBOD 510. In other global system rules the timing or delays between powering on various devices may be specified. Through controller logic 205, global system rules 210 and/or templates 230, detection of readiness or operational state of various resources may be determined and or used in device allocation management by the controller 200. The IT system state 220 may be updated by communication with the storage resource 410. The storage node 410 is aware of the storage parameters and configuration of the JBOD 510 by accessing the JBOD through the disc fabric 520. The storage resource 410 provides information to the controller 200 which then updates the IT system state 220 with information concerning the amount of storage available and other attributes. The controller updates the IT system state 220 when the storage resource 410 is booted and the storage resource 410 is recognized as part of the pool of storage resources 400 of the system 100. The storage node handles logic for controlling the JBOD storage resources using configuration set by the controller 200. For example, the controller may instruct the storage node to configure the JBOD to create a pool from a RAID 10 or other configuration.

Figure 5B:
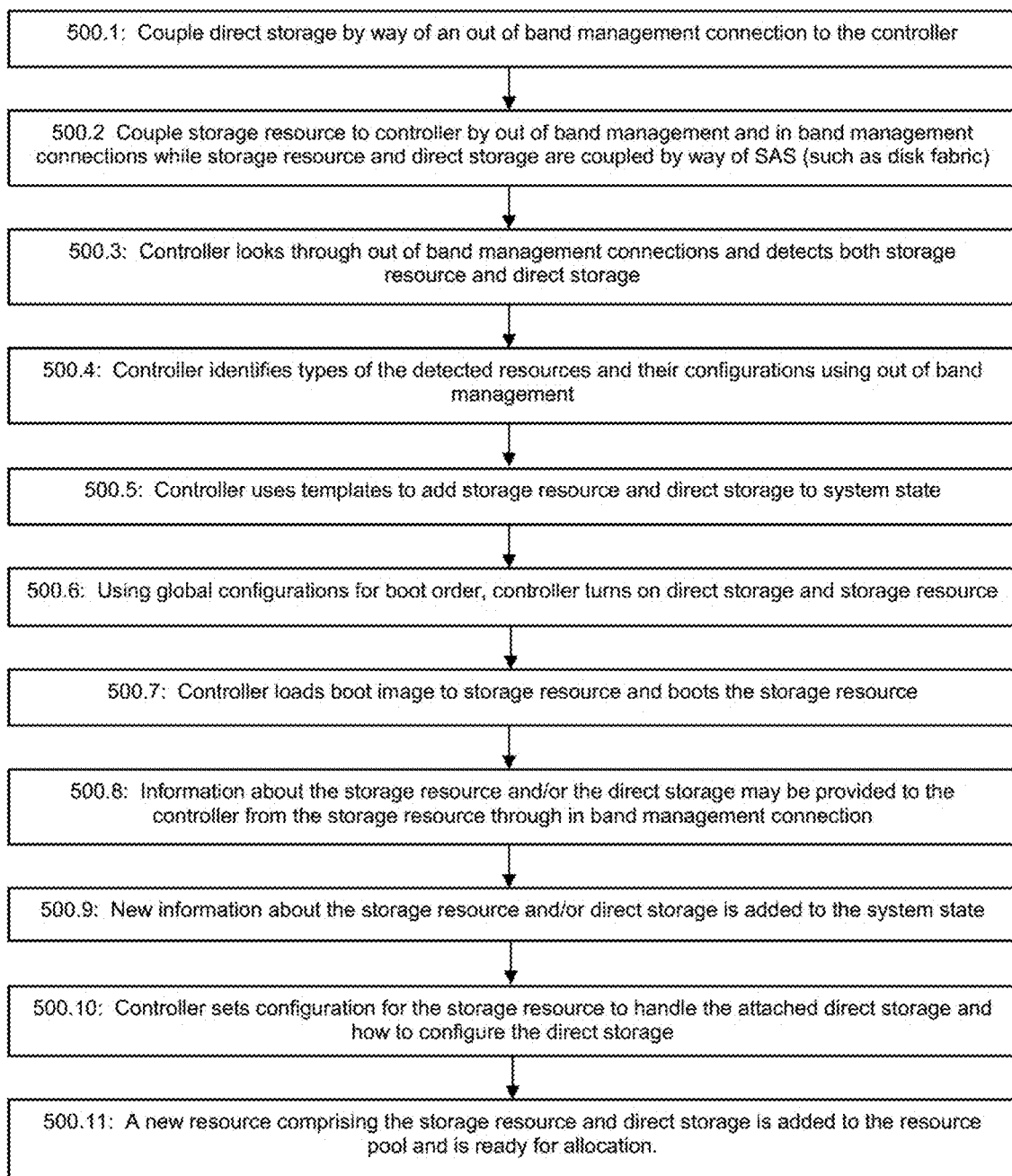
FIG. 5B illustrates an example process flow for adding a storage resource and direct attached storage for the storage resource to a system.

FIG. 5B illustrates an example process flow for adding a storage resource 410 and direct attached storage 510 for the storage resource 410 to a system 100. At step 500.1, the direct attached storage 510 is coupled to the controller 200 in a powered off state by way of an out of band management connection 260. At step 500.2, the storage resource 410 is coupled to the controller 200 in a powered off state by way of an out of band management connection 260 and an in-band management connection 270, while the storage resource 410 is coupled to the direct attached storage 510, for example, by way of an SAS 520, such as a disk drive fabric.

The controller logic 205 may then look through out of band management connections 260 to detect the storage resource 410 and direct attached storage 510 (step 500.3). While any network connection may be used, in this example, out of band management may be used for the controller logic to recognize and identify the type of resources (in this case the storage resource 410 and direct attached storage 510) that are being added and their configurations (step 500.4).

At step 500.5, the controller 200 selects and uses the template 230 for the particular type of storage for each type of storage device to add the resources 410 and 510 to the system state 220. At step 500.6, the controller, following the global system rules 210 (which can specify boot order, the order to power on, in such order, through out of band management connection 260, the direct storage and the storage node (500.6). Using the global system rules 210, the controller finds and loads the boot image for the storage resource 410 from the selected template 230 for that storage resource 410, and the storage resource is then booted from the image (step 500.7). The storage resource 410 is aware of the storage parameters and configuration of the direct attached storage 510 by accessing the direct attached storage 510 through the disk fabric 520. Additional information concerning the storage resource 410 and/or the direct attached storage 510 may then be provided to the controller through the in-band management connection 270 to the storage resource (step 500.8). At step 500.9, the controller updates the system state 220 with the information obtained at step 500.8. At step 500.10, the controller sets configurations for the storage resource 410 to handle the directed attached storage 510 and how to configure the direct attached storage. At step 500.11, a new resource comprising storage resource 410 in combination with the direct attached storage 510 may then be added to the resource pool and is ready for allocation within the system.

According to another aspect of an example embodiment, the controller may use the out of band management to recognize other devices in the stack that may not be involved in computing or services. For example, such devices may include, but are not limited to a cooling tower/air conditioner, lights temperatures, sounds, alarms, power systems, or any other device associated with the system.

Figure 6A:
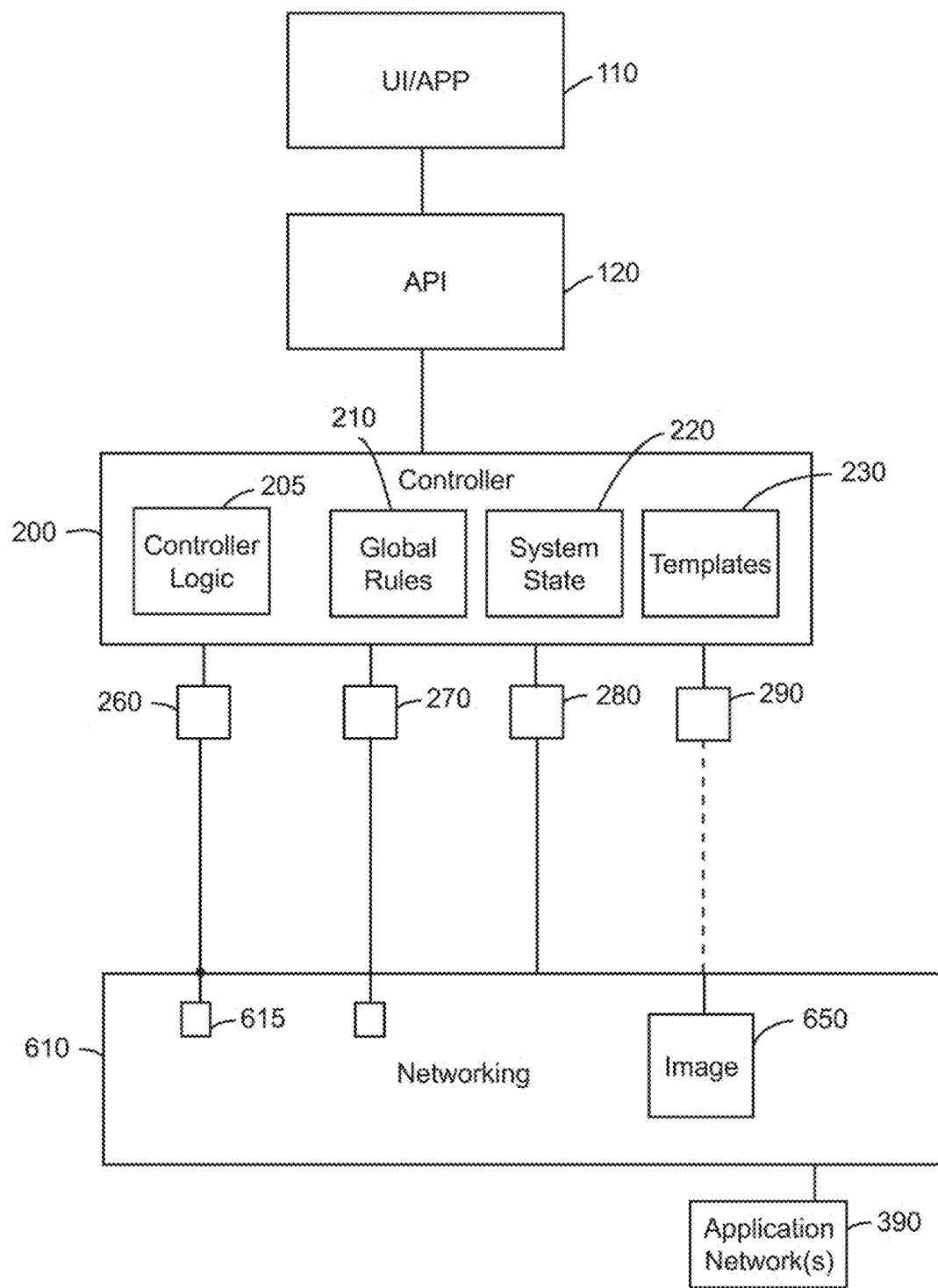
FIG. 6A is a schematic of the controller of FIG. 2A to which a networking resource is added.

Adding a Networking Resource to the System:

FIG. 6A illustrates an addition of a networking resource 610 to the system 100. In an example embodiment, the example process flow of FIG. 3C can be followed to add a networking resource 610 to the system 100, where the added networking resource 610 is not on the same node as the controller 200. Also, it should be noted that if the networking resource 610 is pre-loaded with the image, alternative steps may be followed where any of the network connections may be used to communicate with the network resource 610, boot the network resource 610, and add information to the system state 220.

When the networking resource 610 is added, it is coupled to the controller 200 and may be powered off. The networking resource 610 may be coupled to the controller 200 by way of connections: the out of band management connection 260 and/or the in band management connection 270. It is optionally plugged into the SAN 280 and/or the connection 290. The networking resource 610 may or may not also be coupled to one or more application networks 390 where services, applications users and/or clients can communicate with each other. The out of band management connection 260 may be coupled to an independent out of band management device 615 or circuit of the networking resource 610 which is turned on when the networking resource 610 is plugged in. The device 615 may allow features including but not limited to power on/off the device, attaching to the console and typing commands, monitoring temperatures and other computer health related elements, and setting BIOS settings and other features out of scope from the operating system. The controller 200 may see the networking resource 610 through the out of band management connection 260. It may also identify the type of networking resource and/or the network fabrics and identify configuration using in band or out of band management. The controller logic 205 is configured to look through out of band management 260 or in band management 270 for added hardware. If a networking resource 610 is detected, then the controller logic 205 may use the global system rules 220 to determine whether the networking resource 610 is to be configured automatically or by interacting with the user. If it is added automatically, the set up will follow global system rules 210 within the controller 200. If added by the user, the global system rules 210 within the controller 200 may ask the user to confirm addition of the resource and what the user wants to do with the resource. The controller 200 may query the API application(s) or otherwise request the user or any program controlling the stack, for confirmation that the new resource is authorized. The authorization process may also be completed automatically and securely using cryptography to confirm the legitimacy of the new resource. The controller logic 205 may then add the networking resource 610 to the IT system state 220. For switches that are unable to identify themselves to the controller, a user may manually add to them the system state.

If the networking resource is physical, the controller 200 may power on the networking resource 610 through the out of band management connection 260 and the networking resource 610 may boot off an image 605 loaded from the templates 230, for example, by way of the SAN 280, using global system rules 210 and controller logic 205. The image may also load through other network connections or indirectly by way of other resources. Once booted, the information received through the in band management connection 270 relating to the networking resource 610 may also be gathered and added to the IT system state 220. The networking resource 610 may then be added to the storage resource pool and it becomes a resource that is managed by the controller 200 and tracked in the IT system state 220. Optionally, some networking resource switches may be controlled through a console port connected to out of band management 260 and may be configured when powered on or may have a switch operating system installed through a boot loader, e.g. through ONIE.

If the networking resource is virtual, the controller 200 may either power on the networking resource through the in band management network 270 or through out of band management 260. The networking resource 610 may boot off an image 650 loaded from the templates 230 by way of the SAN 280 using global system rules 210 and controller logic 205. Once booted, the information received through the in band management connection 270 relating to the networking resource 610 may also be gathered and added to the IT system state 220. The networking resource 610 may then be added to the storage resource pool and it becomes a resource that is managed by the controller 200 and tracked in the IT system state 220.

The controller 200 may instruct a networking resource whether physical or virtual, to assign, reassign or move ports to connect to different physical or virtual resources i.e., connections, storage, or compute as defined herein. This may be done using technology including but not limited to SDN, infiniband partitioning, VLANs, vXLANs. The controller 200 may instruct a virtual switch to move or assign virtual interfaces to networks or interconnects communication with a virtual switch or a resource hosting a virtual switch. Some Physical or virtual switches may be controlled by an API coupled to the controller.

The controller 200 may also instruct a compute, storage, or networking resource to change the fabric type when such a change is possible. A port may be configured to switch to different fabrics, for example, toggling the fabric of hybrid infiniband/ethernet interfaces.

The controller 200 may give instructions to the networking resources that may comprise switches or other networking resources that switch a plurality of the application networks. The switches or network devices may comprise different fabrics, or for example they may be plugged into an Infiniband switch, ROCE switches, and/or other switches, preferably with SDN capabilities and a plurality of fabrics.

Figure 6B:
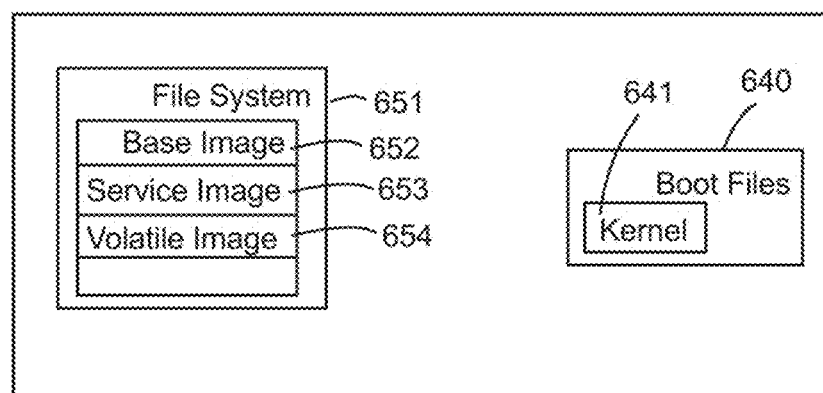
FIG. 6B is a schematic of an example image derived from a template according an example embodiment.

FIG. 6B illustrates and image 650 loaded directly or indirectly (e.g. by way of another resource or database) from templates 230 to the networking resource 610 for booting the networking resource and/or loading applications. The image 650 may comprise boot files 640 for the resource type and hardware. The boot files 640 may comprise a kernel 641 corresponding to a resource, application or service to be deployed. Boot files 640 may also comprise an initrd or similar filesystem used to aid the booting process. The boot system 640 may comprise a plurality of kernels or initrds configured for different hardware types and resource types. In addition the image 650 may comprise a filesystem 651. The filesystem 651 may comprise a base image 652 and corresponding file system as well as a service image 653 and corresponding files system and a volatile image 654 and corresponding filesystem. The file systems and data loaded may vary depending on the resource type and applications or services to be running. The base image 652 may comprise a base operating system file system. The base operating system may be read only. The base image 652 may also comprise basic tools of the operating system independent of what is being run. The base image 652 may include base directories and operating system tools. The service filesystem 653 may include configuration files and specifications for the resource, application or service. The volatile filesystem 654 may contain information or data specific to that deployment such as binary applications, specific addresses and other information, which may or may not be configured as variables including but not limited to passwords, session keys and private keys. The filesystems may be mounted as one single filesystem using technologies such as overlayFS to allow for some read only and some read-write filesystems reducing the amount of duplicate data used for applications.

Figure 7A:
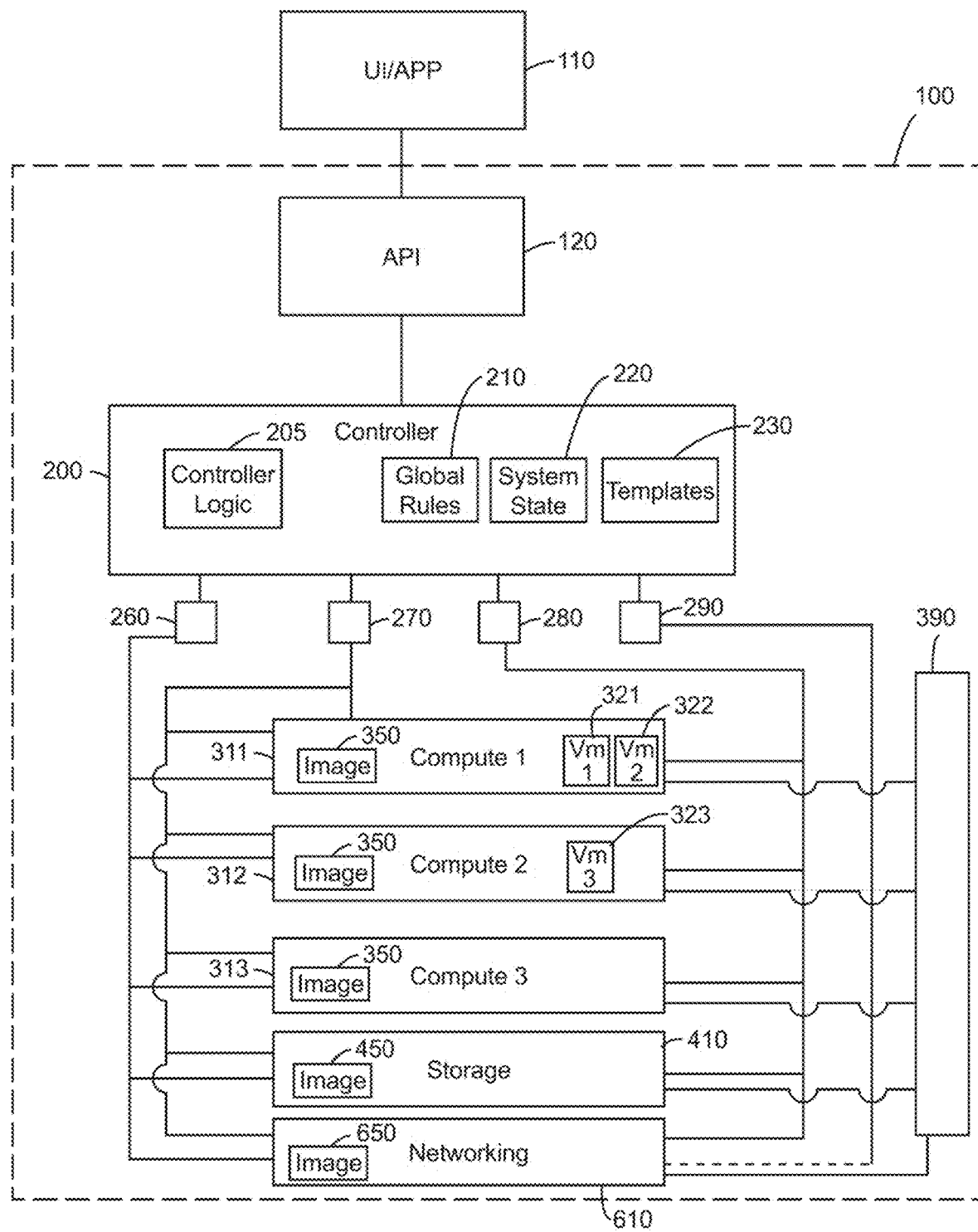
FIG. 7A is a schematic of the system according an example embodiment in an example physical deployment.

Deploying an Application or Service on a Resource:

FIG. 7A illustrates a system 100 comprising: a controller 200, physical and virtual compute resources comprising a first compute node 311, a second compute node 312, and a third compute node 313; storage resources 410; and network resources 610. The resources are illustrated as set up and added to the IT system state 220 in a manner as described herein with respect to FIGS. 1 to 6B.

While multiple compute nodes are illustrated in this figure, a single compute node may be used, in accordance with an example embodiment. The compute nodes may host physical or virtual compute resources and may run applications on physical or virtual compute nodes. Similarly while a single network provider node and storage node are illustrated, it is contemplated that multiple resource nodes of these types may or may not be used in a system of an example embodiment.

Services or applications may be deployed in any of the systems in accordance with an example embodiment. An example of deploying a service on a compute node may be described with respect to FIG. 7A but may be used similarly with different arrangements of the system 100. For example, the controller 200 in FIG. 7A may automatically configure compute resource 310 in the form of compute nodes 311, 312, 313, according to the global system rules 210. They also may then be added to the IT system state 220. The controller 200 may thus recognize the compute resources 311, 312, 313 (that may or may not be powered off) and possibly any physical or virtual applications running on the compute resources or nodes. The controller 200 also may automatically configure the storage resource(s) 410 and networking resource(s) 610 according to the global system rules 210 and templates 230 and add them to the IT system state 220. The controller 200 may recognize the storage resources 410 and networking resources 610 that may or may not begin in a powered off state.

Figure 7B:
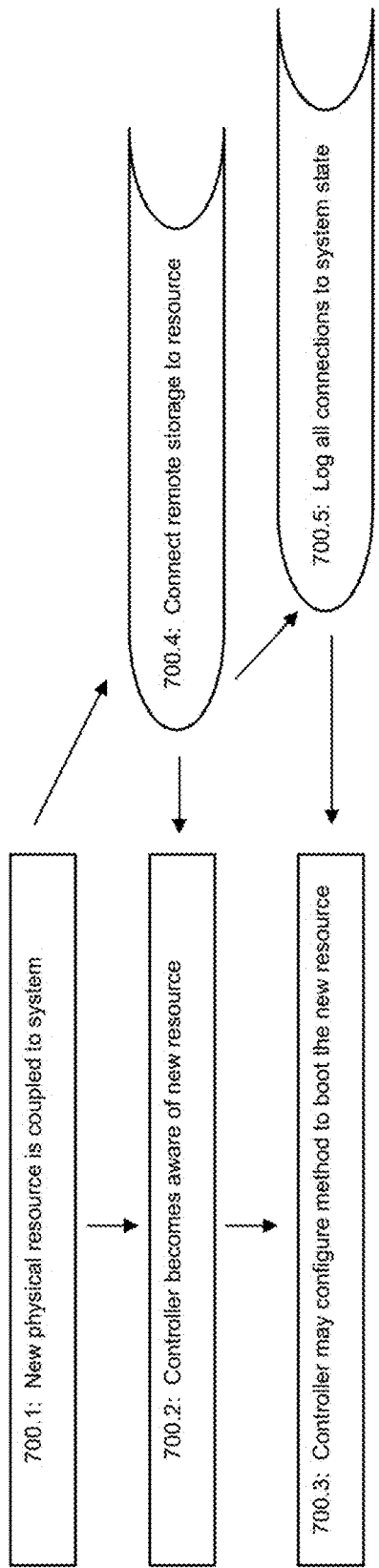
FIG. 7B illustrates an example process for the addition of a resource to an IT system.

FIG. 7B illustrates an example process for the addition of a resource to an IT system 100. At step 700.1, a new physical resource is coupled to the system. At step 700.2, the controller becomes aware of the new resource. The resource may be connected to remote storage (step 700.4). At step 700.3, the controller configures a method to boot the new resource. All connections made to the resource can be logged to the system state 220 (step 700.5). FIG. 3C discussed above provides additional details for an example embodiment of a process flow such as that shown by FIG. 7B.

Figure 7C:
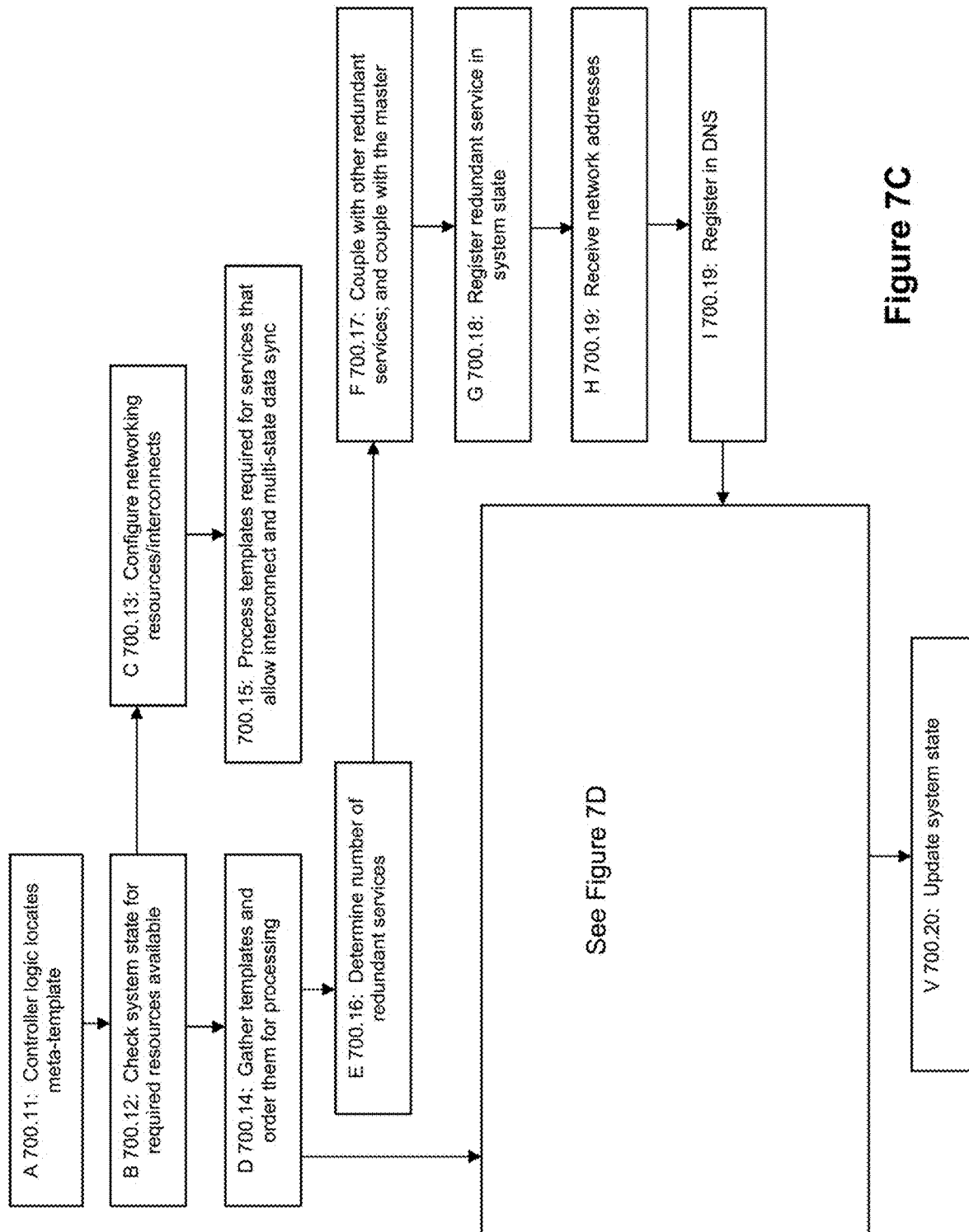
FIGS. 7C and 7D show an example process flow for a deployment of an application on multiple compute resources, multiple servers, multiple virtual machines, and/or in multiple sites.
Figure 7D:
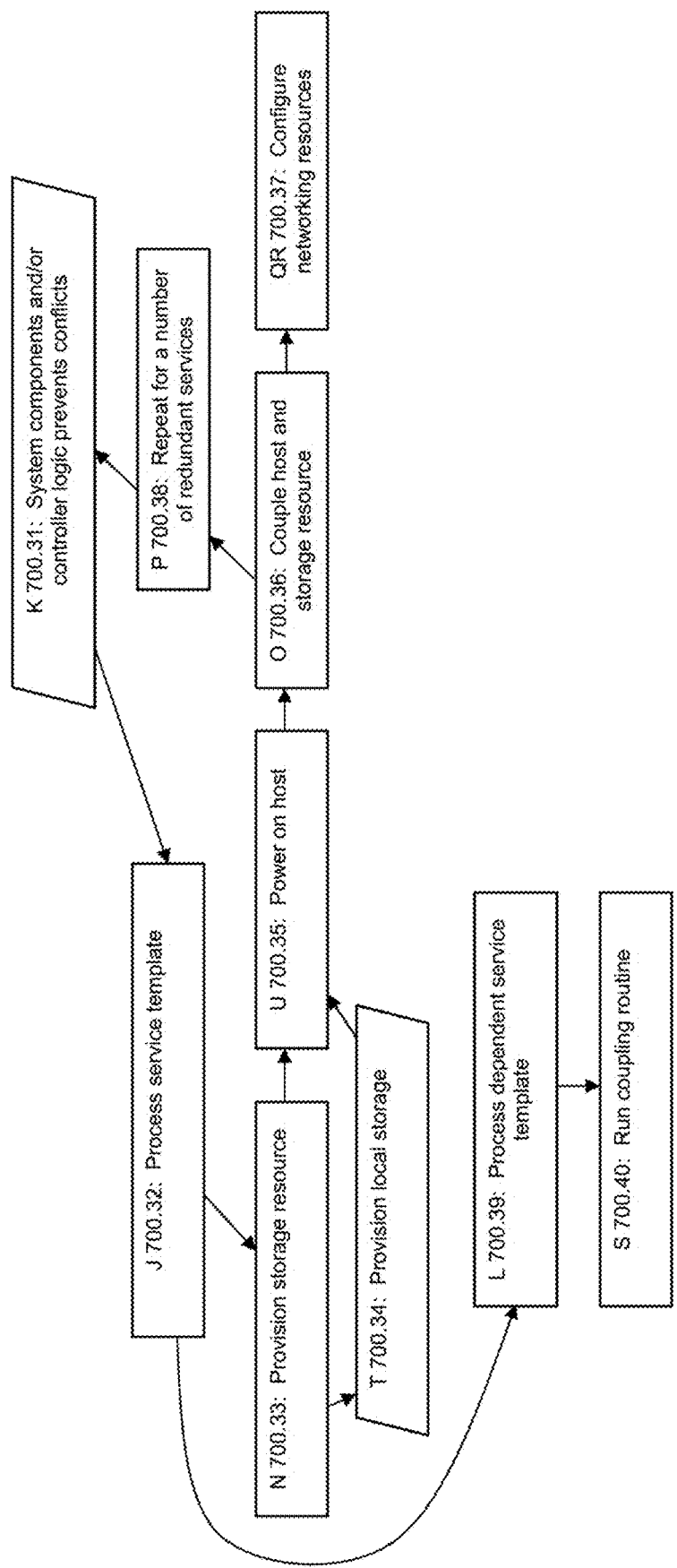

FIGS. 7C and 7D show an example process flow for a deployment of an application on multiple compute resources, multiple servers, multiple virtual machines, and/or in multiple sites. The process for this example differs from a standard template deployment in the fact that the IT system 100 will require components to couple redundant and inter-related applications and/or services. The controller logic may process a meta-template at step 700.11, where the meta-template may contain plurality of templates 230, filesystem blobs 232, and other components (which may be in the form of other templates 230) that are needed to configure a multi-homed service.

At step 700.12, the controller logic 205 checks the system state 220 for available resources; however if there are not enough resources, the controller logic may cut down on the number of redundant services that may be deployed (see 700.16, where the number of redundant services are identified). At step 700.13, the controller logic 205 configures the networking resources and the interconnects required to connect the services together. If the service or application is deployed across multiple sites, the meta-template may include (or the controller logic 205 may configure) the services optionally configured from templates that allow for data sync and interoperability across sites (See 700.15).

At step 700.16, the controller logic 205 may determine from system rules, meta template data, and resource availability the number of redundant services (if there will be redundant services on multiple hosts). At 700.17, there is a coupling with other redundant services and a coupling with a master. If there are multiple redundant hosts, the controller logic 205 or logic within the templates (binaries 234, daemons 232, or filesystem blobs that may contain configuration files directing settings in the operating system) may prevent network address and hostname conflicts. Optionally the controller logic will provide network addresses (see 700.18) and register each redundant service in DNS (700.19) and the system state 220 (700.18). The system state 220 will track redundant services, and the controller logic 205 will not allow duplicate registrations if it notices a redundant service with conflicting parameters such as host names, dns names, network addresses is already in the system state 220.

A configuration routine shown by FIG. 7D will process the template(s) in the meta-template. The configuration routine will process all redundant services, deploying multi-host or clustered services to multiple hosts, deploying services to couple the hosts. Any process that can deploy an IT system from system rules can run a configuration routine. In the case of a multi-host service an example routine might be processing a service template as at 700.32, provisioning a storage resource as at 700.33, powering on a host as at 700.35, coupling a host/compute resource with storage resource (and register in system state 220) as at 700.36 (and then repeating for the number of redundant services (700.38); each time registering in the system state 220 (see 700.20) and using controller logic to log information that tracks individual services and prevents conflicts (see 700.31).

Some of the service templates may contain services and tools that may couple multi-host services. Some of these services may be treated as dependencies (700.39), and then coupling routines at 700.40 may be used to couple the services and register the couplings in the system state 220. In addition one of the service templates may be a master template, and then the dependent service template at 700.39 will be the slave or secondary services; and the coupling routine at 700.40 will connect them. The routine can be defined in the meta-template; for instance, for a redundant dns configuration, the coupling routine at 700.40 may include the connection of a slave dns to a master dns and configuration of zone transfers along with dnssec. Some services may use physical storage (see 700.34) to improve performance, and that may be loaded with a preliminary OS disclosed in FIG. 5B. The tools for coupling services may be contained in the templates themselves, and the configuration between services may be done with an api accessible by the controller and/or other hosts in the multinode application/service.

The controller 200 may allow the user or controller to determine the appropriate compute backends to use for an application. The controller 200 may allow the user or controller to optimally place applications on the appropriate physical or virtual compute resource by determining resource usage. When hypervisors or other compute back-ends are deployed to compute nodes they may, through in band management connection 270, report back to the controller resource utilization statistics. When the controller decides, either from its own logic and global system rules, or from user input, to create an application on a virtual compute resource, it may automatically choose a hypervisor on the most optimal host and power on the virtual compute resource on that host.

For example, the controller 200 deploys an application or service to one or a plurality of the computing resources using template(s) 230. Such an application or service, for example may be a virtual machine that runs applications or services.

In an example, FIG. 7A illustrates deployment of a plurality of virtual machines (VMs) on multiple compute nodes, the controller 200 as shown may recognize that there are a plurality of compute resources 310 in its compute resource pool in the form of compute nodes 311, 312, 313. The compute nodes may be deployed for example with hypervisors or alternatively on baremetal where use of virtual machines may be undesirable due to speed. In this example compute resource 310 is loaded with a hypervisor application and has VM (1) 321 and VM (2) 322 configured and deployed on compute node 311. If, for example, the compute node 311 does not have the resources for an additional VM or if other resources are preferred, for a particular service, the controller 200 may recognize, based on the stack state 220, that there are no available resources on compute node 311, or that there is a preference to set the new VM up in a different resource. It may also recognized that a hypervisor is loaded on compute resource 312, for example and not on resource 313 which may be a baremetal compute node used for other purposes. Thus, according to the requirements of a service or application template being installed, and the status of the system state 220, the controller in this example may select compute node 313 for deployment of the next needed resource VM (3) 323.

Compute resources of a system may be configured to share storage on a storage resource for a storage node.

A user through user interface 110 or an application may request a service be set up for the system 100. The service may include but is not limited to an e-mail service; a web service; a user management service; network provider, LDAP, Dev tools, VOIP, authentication tools, accounting.

The API application 120 translates the user or application request and sends a message to the controller 200. The service templates or images 230 of the controller 200 are used to identify which resources are needed for the service. The resources to be used are then identified based on availability according to the IT system state 220. The controller 200 makes a request to one or more of the compute node 311, 312 or 313 for the compute services required, to the storage resource 410 for the storage resources required, and to the network resource 610 for the networking resources required. The IT system state 220 is then updated identifying the resources to be allocated. The service is then installed to the allocated resources using global system rules 210 according to the template 230 for the service or application.

According to an example embodiment, multiple compute nodes may be used whether for the same service or different services while, for example, the storage services and/or network provider pools may be shared between the compute nodes.

Figure 8A:
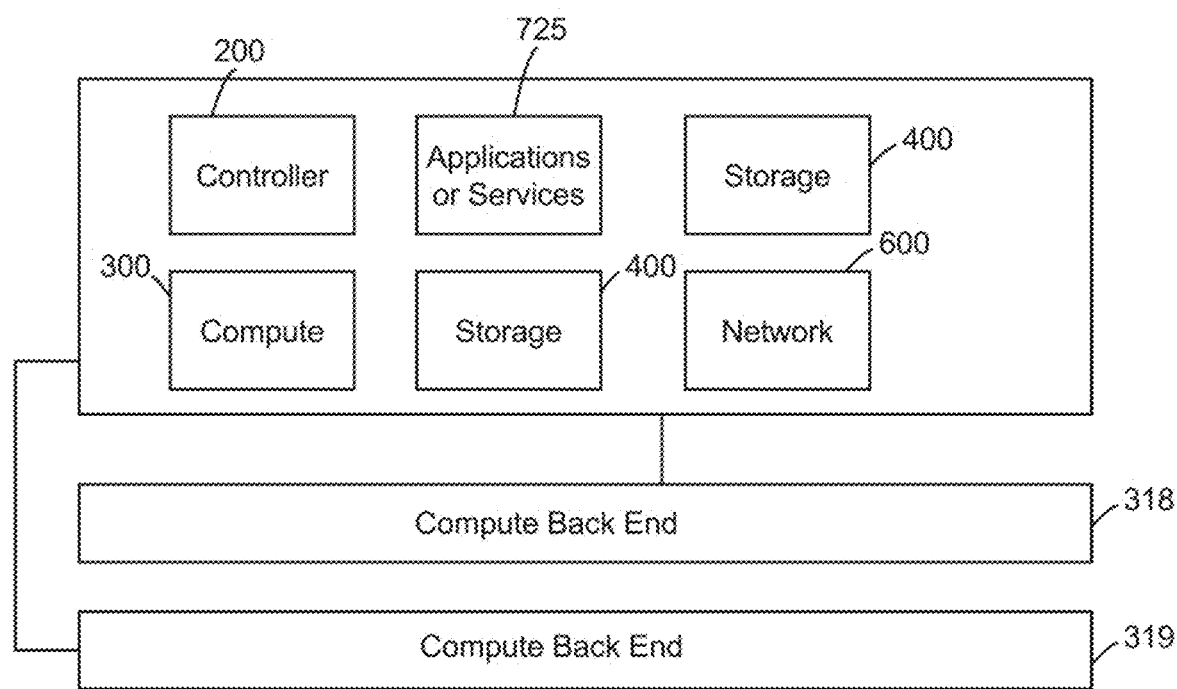
FIG. 8A is a schematic of the system according to an example embodiment in an example deployment.

Referring to FIG. 8A, the system 100 is illustrated wherein the controller 200, and the compute, storage and networking resources 300, 400, 600 are on the same or shared physical hardware, such as a single node. Various features described shown in FIGS. 1-10 may be incorporated into a single node. When the node is powered on, a controller image is loaded on the node. The compute, storage and networking resources 300, 400, 600, are configured with the templates 230 and using global system rules 210. The controller 200 may be configured to load compute back-ends 318, 319 as compute resources, which may or may not be added on to the node or on different node(s). Such back-ends 318, 319 may include, but are not limited to, virtualization, containers, and multi-tenant processes to create virtual compute, networking, and storage resources.

Applications or services 725, for example, web, email, core network services (DHCP, DNS, etc.), collaboration tools, may be installed on virtual resources on the node/device shared with the controller 200. These applications or services may be moved to physical resources or virtual resources independent of the controller 200. Applications may be run on virtual machines on the single node.

Figure 8B:
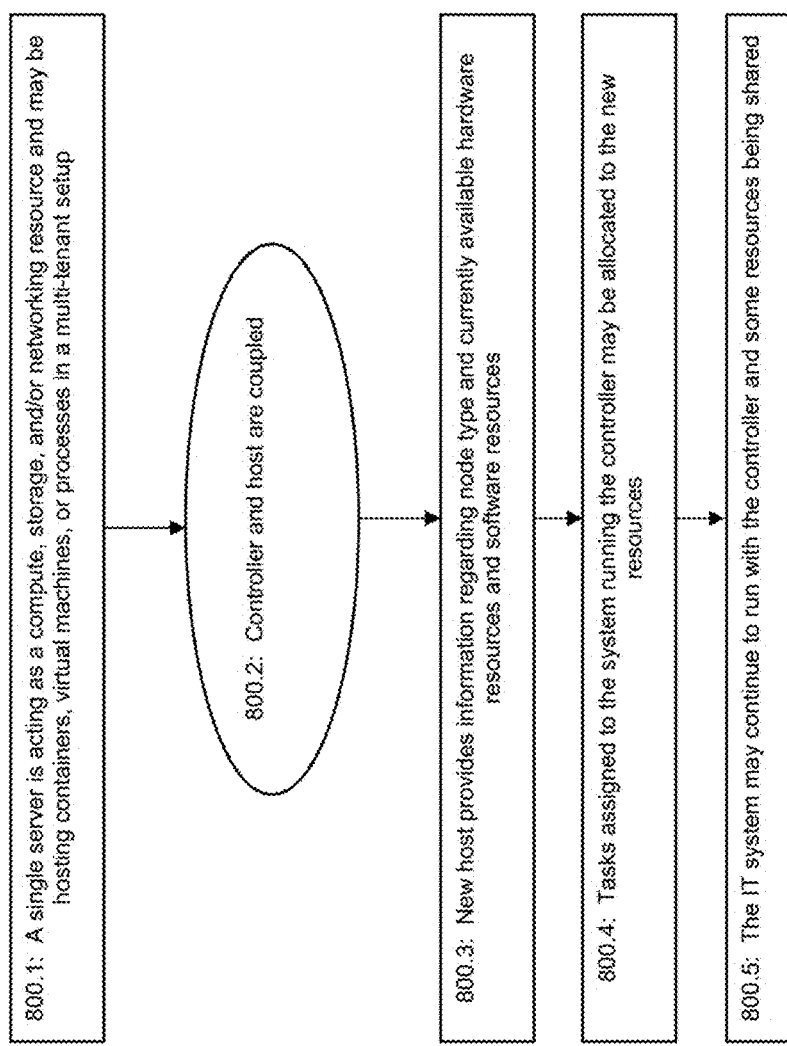
FIG. 8B shows an example process flow for expanding from a single node system to a multiple node system.

FIG. 8B shows an example process flow for expanding from a single node system to a multiple node system (such as with nodes 318 and/or 319 as shown by FIG. 8A). So, with reference to FIGS. 8A and 8B, we can consider an IT system with a controller 200 that is running on a single server; where it is desired to scale the IT system out as a multi-node IT system. Thus, prior to expansion, the IT system is in a single node state. As shown by FIG. 8A, a controller 200 runs on a multi-tenant single node system to power various IT system management applications and/or resources which may include but are not limited to storage resources, compute resources, hypervisors, and/or container hosts.

At step 800.2, a new physical resource is coupled to the single node system by connecting the new physical resource through the out of band management connection 260, the in band management connection 270, the SAN 280 and/or network 290. For the purposes of this example, this new physical resource can also be referred to as hardware or a host. The controller 200 may detect the new resource on the management network and then query the device. Alternatively, the new device may broadcast a message announcing itself to the controller 200. For example, the new device can be identified by MAC address, out of band management, and/or booting into a preliminary OS and using in-band management and identifying hardware type thereby. In either event, at step 800.3, the new device provides information to the controller regarding its node type and its currently available hardware resources and software resources. The controller 200 is then aware of the new device and its capabilities.

At step 800.4, tasks that are assigned to the system running the controller 200 may be allocated to the new host. For example, if the host is preloaded with an operating system (such as a storage host operating system or a hypervisor), the controller 200 then allocates the new hardware resources and/or capabilities. The controller may then provide an image and provision the new hardware, or the new hardware may request an image from the controller and configure itself using methods disclosed above and below. If the new host is able to host storage resources or virtual compute resources, the new resource can be made available to the controller 200. The controller 200 may then move and/or assign existing applications to the new resources or use the new resources for newly created applications or applications created afterward.

At step 800.5, the IT system may keep its current applications running on the controller or migrate them to the new hardware. If migrating a virtual compute resource, VM migration techniques may be used (such as qemu+kvm's migration tool) and updating the system state along with new system rules. Change management techniques discussed below can be used to reliably and safely make these changes. As more applications may be added to the system, the controller may use any of a variety of techniques for determining how to allocate the systems' resources, including but not limited to round robin techniques, weighted round robin techniques, least utilized techniques, weighted least utilized techniques, predictive techniques with assisted training based on utilization, scheduled techniques, desired capacity techniques, and maximum size techniques.

Figure 8C:
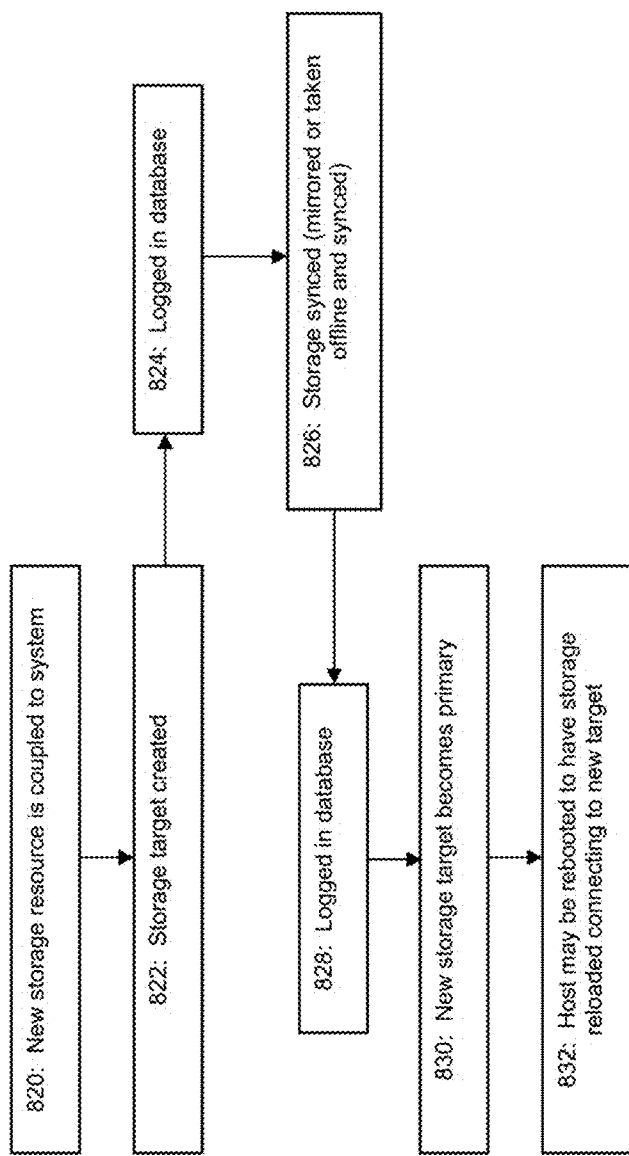
FIG. 8C illustrates an example process flow for a migration of storage resources to a new physical storage resource.

FIG. 8C illustrates an example process flow for a migration of storage resources to a new physical storage resource. The storage resource may then become mirrored, be migrated, or combinations thereof (for example, the storage may be mirrored and then the original storage resource becomes disconnected). At step 820, a storage resource is coupled to the system either by the new storage resource contacting the controller or having the controller discover it. This can be done with out of band management connection 260, in band management connection 270, a SAN network 280, or in a flat network the applications network may be using or combinations thereof. With in band management, an operating system may be'pre-booted and the new resource may connect to the controller.

At step 822, a new storage target is created on the new storage resource; and this can be logged in a database at step 824. In an example, the storage target may be created by copying files. In another example, the storage target may be created by creating a block device and copying the data (which may be in the form of filesystem blob(s)). In another example, the storage target may be created by mirroring 2 or more storage resources (e.g., creating a raid) between the block devices and optionally connecting through a remote storage transport(s) including but not limited to iscsi, iser, nvmeof, nfs, nfs over rdma, fc, fcoe, srp, etc. The database entry at step 824 may contain information for a compute resource (or other type of resource and/or host) to connect to the new storage resource either remotely or locally if the storage resource is on the same device as the other resource or host.

At step 826, the storage resource is synced. For example, the storage can be mirrored. As another example, the storage can be taken offline and synced. Techniques such as raid 1 (or other type of raid—but usually raid 1 or raid 0, but it may be raid 110 if desired (mirrored raid 10) (mdadm, zfs, btrfs, hardware raid) may be employed at ste 826.

The data from the old storage resource is then optionally connected after database logging at step 828 (if it happens afterwards, the database may contain information related to the status of copying the data if such data must be recorded). If the storage target is being migrated away from a previous host (for example as shown earlier moving from a single-node system to a multi-node and/or distributed IT system as per FIGS. 8A and 8B), the new storage resource may then be designated as the primary storage resource by the controller, system state, compute resource, or combinations thereof at step 830. This may be done as a step to remove the old storage resource. In some cases, physical or virtual hosts connected to the resources will then need to be updated and in some cases may be powered off during the transition (and will then be powered back on) at step 832 (which can techniques disclosed herein for powering on physical or virtual hosts).

Figure 8D:
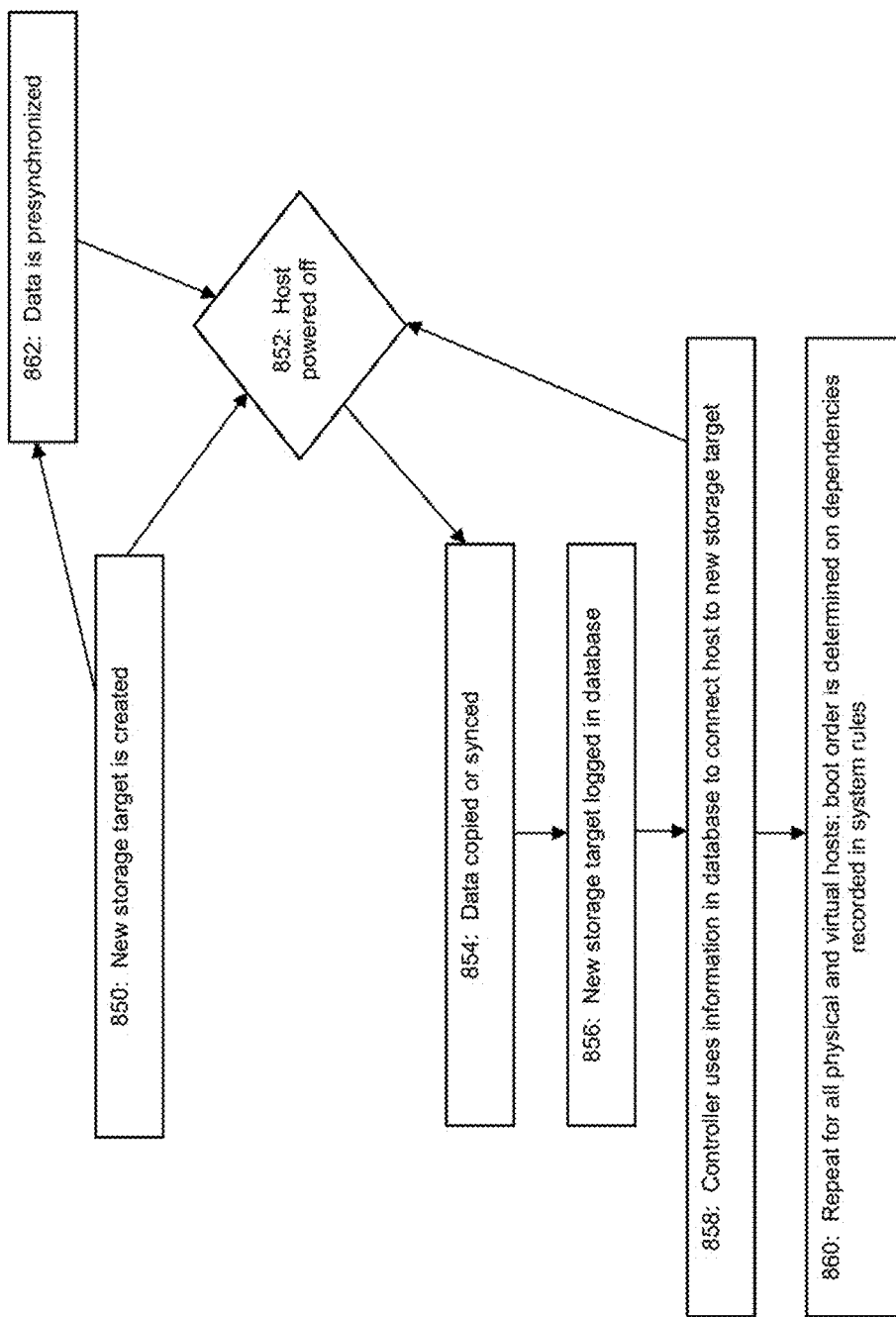
FIG. 8D shows an example process flow for migrating a virtual machine, container, and/or process on a single node of a multi-tenant system to a multi-node system that may have separate hardware for compute and storage.

FIG. 8D shows an example process flow for migrating a virtual machine, container, and/or process on a single node of a multi-tenant system to a multi-node system that may have separate hardware for compute and storage. At step 850, the controller 200 creates a new storage resource that may be on a new node (e.g., see nodes 318 and 319 in FIG. 8A). At step 852, the old application host may then be powered off. Then, at step 854, data is copied or synced. By powering down at step 852 before copying/syncing at step 854, the migration will be safer if it involves migrating a VM off single node. Powering off would also be beneficial for going from a VM to physical. Step 854 may also be accomplished before powering down via a data presynchronization step 862, which can help minimize the associated downtime. In addition, the host may not be powered down as at step 852, in which case the old host remains online until the new host is ready (or the new storage resource is ready). Techniques for avoiding the power off step 852 are discussed in greater detail below. At step 854, data can be optionally synchronized unless the storage resources are mirrored or synced using hot standbys.

The new storage resource is now operational and may be logged in a database at step 856 so that the controller 200 can connect the new host to the new storage resource at step 858. When migrating from a single node with multiple virtual hosts, this process may need to be repeated for a plurality of the hosts (step 860). The order for booting may be determined by the controller logic using dependencies of applications if they are tracked.

Figure 8E:
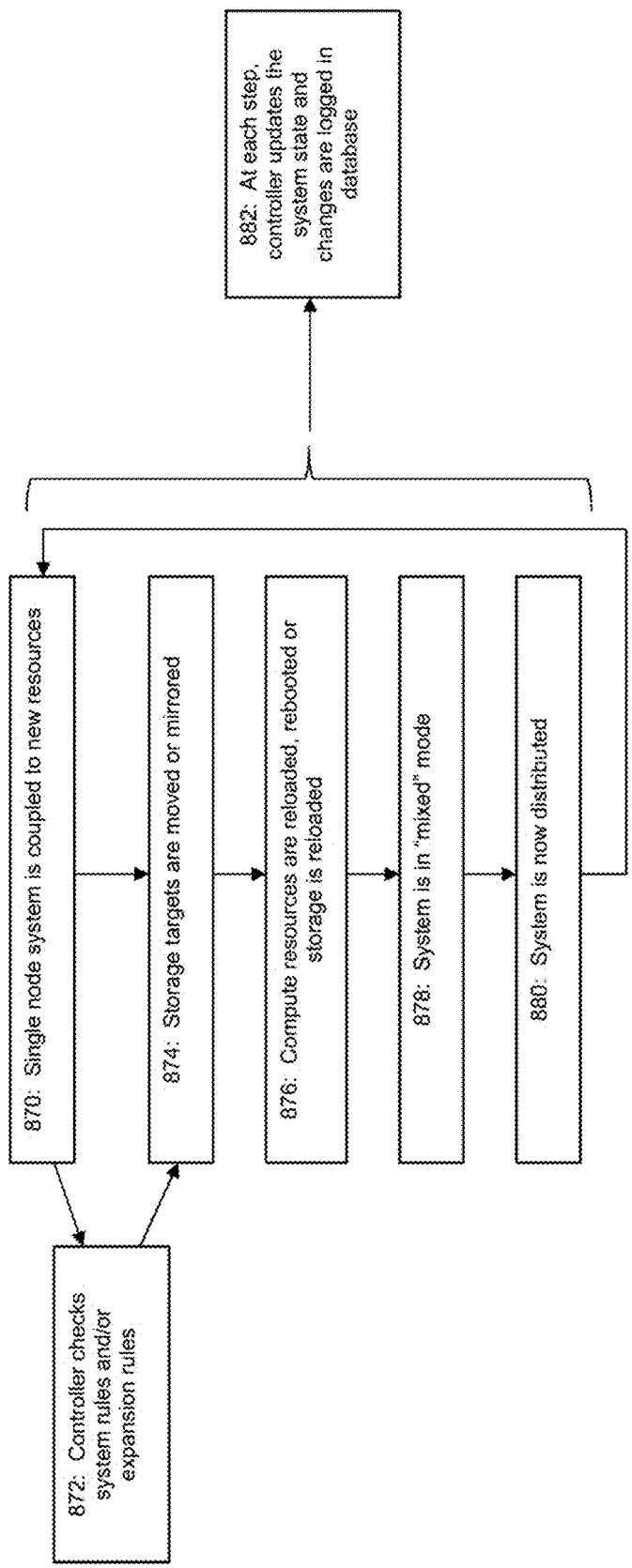
FIG. 8E shows another example process flow for expanding from a single node to multiple nodes in a system.

FIG. 8E shows another example process flow for expanding from a single node to multiple nodes in a system. At step 870, new resources are coupled to the single node system. The controller may have a set of system rules and/or expansion rules for the system (or it may derive expansion rules based on the services running, their templates, and the services' dependencies on each other. At step 872, the controller checks for such rules for use to facilitate the expansion.

If the new physical resources contain storage resources, storage resources may then be moved off the single node or other form of simpler IT system at step 874 (or the storage resources may be mirrored). If storage resources are moved, compute resources or running resources may be reloaded or rebooted at step 876 after the storage resources are moved. In another example, the compute resources may be connected at step 876 to mirrored storage resources and remain running while the old storage resources on the single node system or the hardware resources of the previous system may be disconnected or disabled. For example, the running services may be coupled to 2 mirrored block devices-one on the single node server (e.g., using mdadm raid 1) and the other on a storage resource; and once the data is synchronized the drive on the single node server may then be disconnected. The previous hardware may still contain parts of the IT system and may run it on the same node as the controller in a mixed mode (step 878). The system may continue to iterate through this migration process until the original node is only powering the controller, whereupon the system is distributed (step 880). Furthermore, at each of the steps of the FIG. 8E process flow, the controller can update the system state 220 and log any changes to the system in a database (step 882).

Figure 9A:
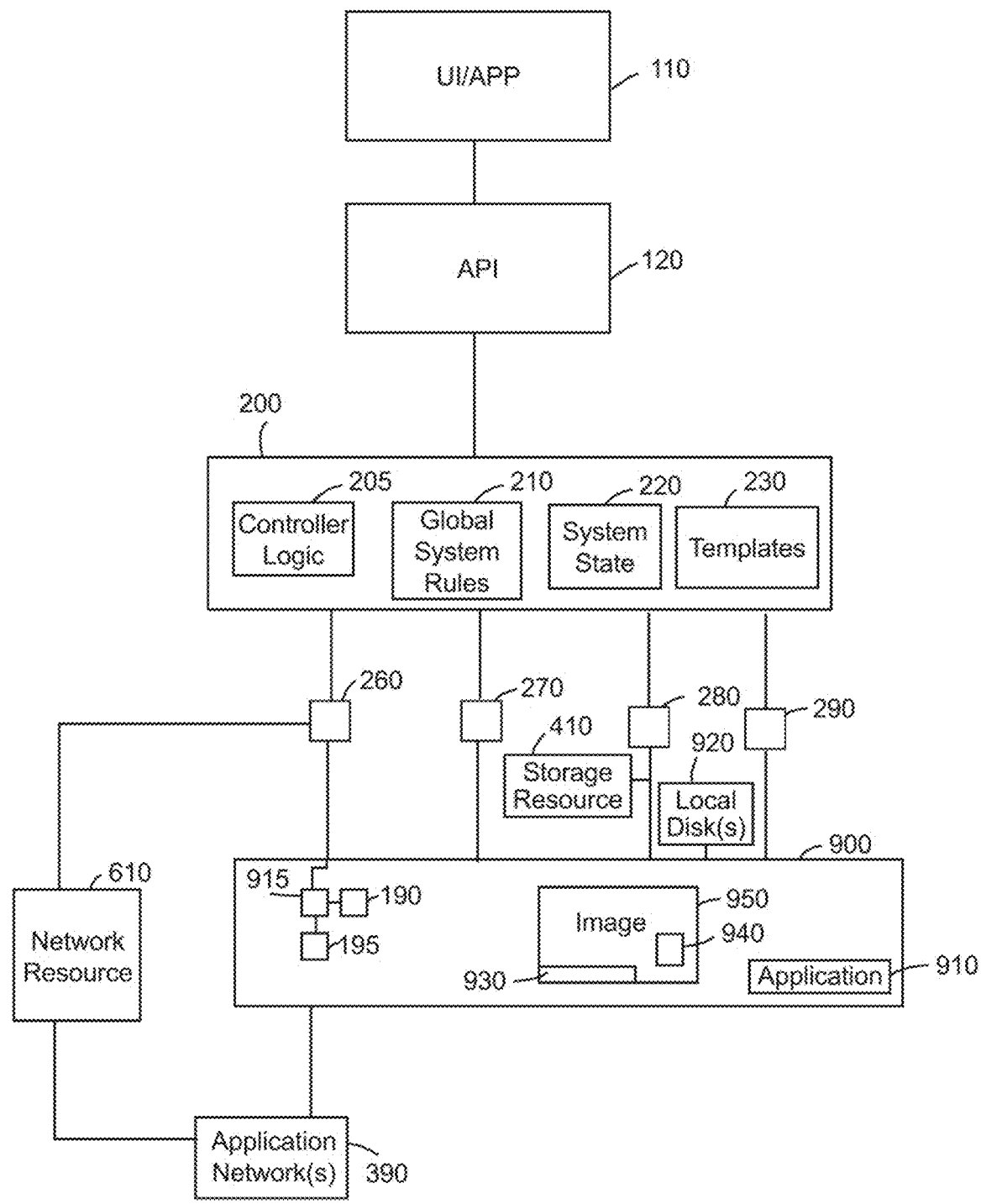
FIG. 9A is a schematic of the system according to an example embodiment in an example physical deployment.

Referring to FIG. 9A an application 910 is installed on a resource 900. The resource 900 may be a compute, storage or networking resource 310, 410, 610 with respect to FIGS. 1-10 as described herein. The resource 900 may be a physical resource. A physical resource may comprise, a physical machine or physical IT system component. The resource 900 may, for example be a physical compute, storage or networking resource. The resource 900 may be coupled to the controller 200 in a system 100 with other of the compute, networking, or storage resources as described with respect to FIGS. 2A to 10 herein.

The resource 900 may be powered down at the start. The resource 900 may be coupled to the controller by way of the networks: the out of band management connection 260, the in band management connection 270, the SAN 280 and/or network 290. The resource 900 may also be coupled to one or more application networks 390 where services, applications users and/or clients can communicate with each other. The out of band management connection 260 may be coupled to an independent out of band management device 915 or circuit of the resource 900 which is turned on when the resource 900 is plugged in. The device may allow features including but not limited to power on/off the device, attaching to the console and typing commands, monitoring temperatures and other computer health related elements, and setting BIOS settings 195 and other features out of scope from the operating system.

The controller 200 may detect the resource 900 through the out of band management network 260. It may also identify the type of resource and identify its configuration using in band management or out of band management. The controller logic 205 may be configured to look through out of band management 260 or in band management 270 for additional hardware. If a resource 900 is detected, then the controller logic 205 may use the global system rules 220 to determine whether the resource 900 is to be configured automatically or by interacting with the user. If it is added automatically, the set up will follow global system rules 210 within the controller 200. If it is added by the user, the global system rules 210 within the controller 200 may ask the user to confirm addition of the resource and what the user wants to do with the compute resource. The controller 200 may query the API application or otherwise request the user or any program controlling the stack, for confirmation that the new resource is authorized. The authorization process may also be completed automatically and securely using cryptography to confirm the legitimacy of the new resource. Resource 900 is then added to the IT system state 220 including the switches or networks into which the resource 900 is plugged.

The controller 200 may power on the resource through the out of band management network 260. The controller 200 may use the out of band management connection 260 to power on a physical resource and configure the BIOS 195. The controller 200 may automatically use a console 190 and select the desired BIOS options, which may be accomplished by the controller 200 reading the console images with image recognition and controlling console 190 through out of band management. A boot up state may be determined by image recognition through a console of the resource 900, or out of band management with virtual keyboard, querying a service that is listening on the resource, or querying a service of the application 910. Some applications may have a process that allows the controller 200 to monitor or, in some cases, change settings in the application 910 using in band management 270.

The application 910 on the physical resource 900 (or of resources 300, 310, 311,312, 313 400, 410, 411, 412, 600, 610 as described with respect to FIGS. 1-10 herein) may boot by way of the SAN 280 or another network using a BIOS boot option or other method to configure remote booting such as enabling PXE boot or Flex Boot. Additionally or alternatively the controller 200 may use the out of band management 260 and/or in band management connection 270 to instruct a physical resource 900 to boot an application image in the image 950. The controller may configure booting options on the resource or may use existing enabled remote booting methods such as PXE boot or Flex Boot. The controller 200 may optionally or alternatively use out of band management 260 to boot off an ISO image, to configure a local disc and then instruct the resource to boot from the local disc(s) 920. The local disc(s) may have boot files loaded. This may be accomplished by using out of band management 260, image recognition and a virtual keyboard. The resource may also have boot files and/or boot loaders installed. The resource 900 and application may boot off an image 950 loaded from the templates 230, for example, by way of the SAN 280, using global system rules 210 and controller logic 205. The global system rules 220 may specify the order of booting. For example, the global system rules 220 may require the resource 900 first be booted and then the application 910. Once the resource 900 is booted using the image 950, the information received through the in band management connection 270 relating to the resource 900 may also be gathered and added to the IT system state 220. The resource 900 may be added to the storage resource pool and it becomes a resource that is managed by the controller 200 and tracked in the IT system state 220. An application 910 may also be booted in the order specified by the global system rules 220 using image 950 or an application image 956 loaded on the resource 900.

The controller 200 may, with the out of band management connection 260, or another connection, configure networking resource 610 to connect the application 910 to application network 390. Physical resource 900 may be connected to remote storage such as a block storage resource such as including but not limited to, ISER (ISCSI over RDMA), NVMEOF FCOE, FC, or ISCSI or another storage backend such as SWIFT, GLUSTER, or CEPHFS. The IT system state 220 may be updated using the out of band management connection 260 and/or the in band management connection 270 when a service or application is up and running. The controller 200 may use the out of band management connection 260 or in band management connection 270 to determine power states of the physical resource 900, i.e., whether on or off, The controller 200 may use the out of band management connection 260 or in band management connection 270 to determine whether a service or application is running or the boot-up state. The controller may take other actions based on the information it receives and the global system rules 210.

Figure 9B:
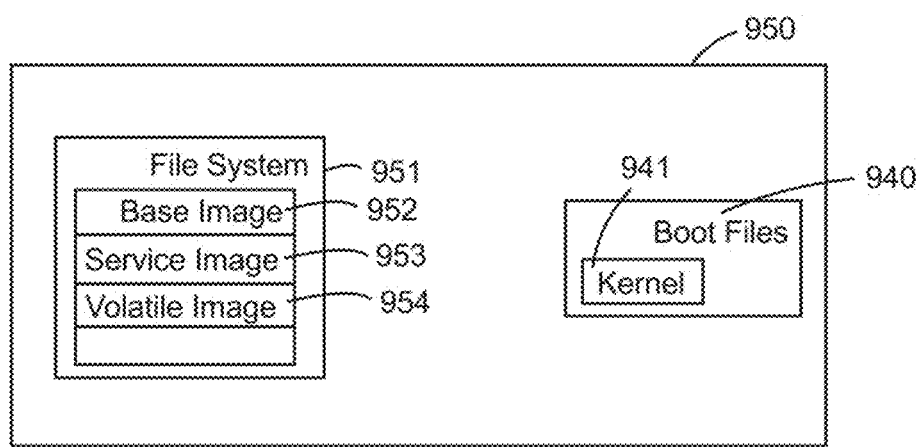
FIG. 9B is a schematic of an example image derived from a template according to an example embodiment.

FIG. 9B illustrates and image 950 loaded directly or indirectly (e.g. by way of another resource or database) from templates 230 to the compute node for booting the application 910. The image 950 may comprise custom kernel 941 for the application 910.

The image 950 may comprise boot files 940 for the resource type and hardware. The boot files 940 may comprise a kernel 941 corresponding to a resource, application or service to be deployed. Boot files 940 may also comprise an initrd or similar filesystem used to aid the booting process. The boot system 940 may comprise a plurality of kernels or initrds configured for different hardware types and resource types. In addition the image 450 may comprises a filesystem 951. The filesystem 951 may comprise a base image 952 and corresponding file system as well as a service image 953 and corresponding files system and a volatile image 954 and corresponding filesystem. The file systems and data loaded may vary depending on the resource type and applications or services to be running. The base image 952 may comprise a base operating system file system. The base operating system may be read only. The base image 952 may also comprise basic tools of the operating system independent of what is being run. The base image 952 may include base directories and operating system tools. The service filesystem 953 may include configuration files and specifications for the resource, application or service. The volatile filesystem 594 may contain information or data specific to that deployment such as binary applications, specific addresses and other information, which may or may not be configured as variables including but not limited to passwords, session keys and private keys. The filesystems may be mounted as one single filesystem using technologies such as overlayFS to allow for some read only and some read-write filesystems reducing the amount of duplicate data used for applications.

Figure 9C:
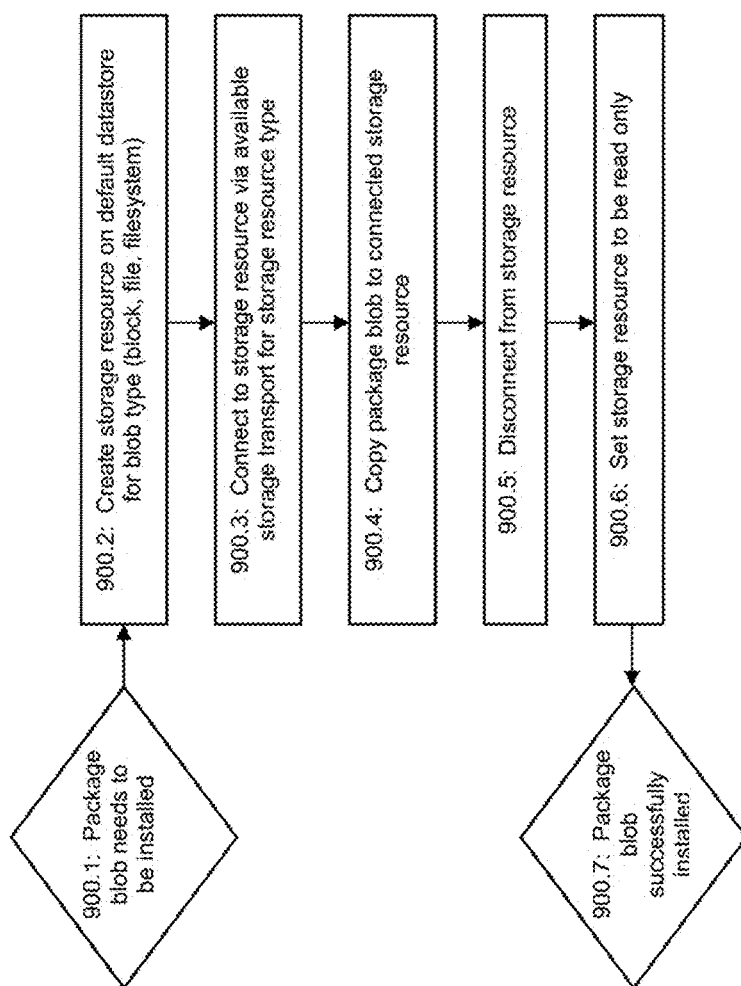
FIG. 9C shows an example of installing an application from an NT package.

FIG. 9C shows an example of installing an application from an NT package, which can be a type of template 230. At step 900.1, the controller determines that a package blob needs to be installed. At step 900.2, the controller creates a storage resource on a default datastore for a blob type (block, file, filesystem). At step 900.3, the controller connects to a storage resource via an available storage transport for the storage resource type. At step 900.4, the controller copies the package blob to the connected storage resource. The controller then disconnects from the storage resource (step 900.5) and sets the storage resource to be read only (step 900.6). The package blob is then successfully installed (step 900.7).

In another example, Appendix B enclosed herewith describes example details regarding how the system connects compute resources to overlayfs. Such techniques can be used to facilitate installing an application on a resource as per FIG. 9A or botting a compute resource from storage resources as per step 205.11 from FIG. 2F.

Figure 9D:
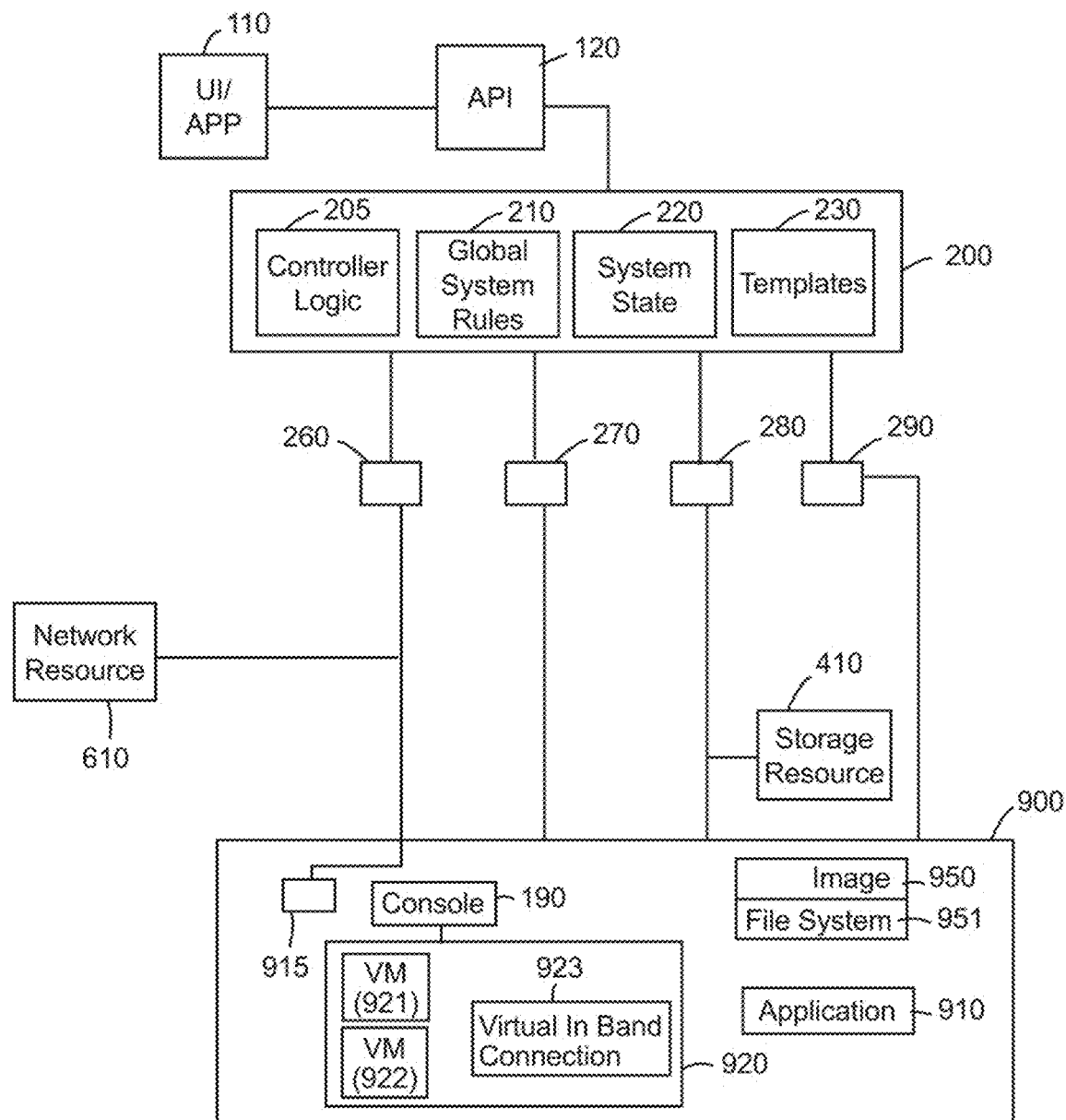
FIG. 9D is a schematic of the system according to an example embodiment in an example deployment.

FIG. 9D illustrates an application 910 deployed on a resource 900. The resource 900 may comprise a compute node that may comprise a virtual compute resource, for example that may comprise a hypervisor 920, one or more virtual machines 921, 922 and/or containers. The resource 900 may be configured in a manner similar as described herein with respect to FIG. 1 to FIG. 10 using an image 950 loaded on the resource 900. In this example, the resource 920 is shown as a hypervisor managing virtual machines 921, 922. The controller 200 may use the in band management 270 to communicate with the resource 900 hosting the hypervisor 920 to create the resource and to configure the resource and allocate proper hardware resources including but not limited to CPU RAM, GPU, remote GPU (that may use RDMA to connect remotely to another host), network connections, network fabric connections, and/or virtual and physical connections to partitioned and/or segmented networks. The controller 200 may use a virtual console 190 (for example including but not limited to SPICE or VNC) and image recognition to control the resource 900 and hypervisor 920. Additionally or alternatively or the controller 200 may use the out of band management 260 or in band management connection 270 to instruct a hypervisor 920 to boot an application image 950 from the templates 230 using the global system rules 210. The image 950 may be stored on the controller 200 or the controller 200 may move or copy them to a storage resource 410. The boot images for the VMs 921, 922 may be stored locally as files for example on image 950, or block devices or on a remote host and shared through file sharing such as, for example, NFS over RDMA/NFS using image types such as qcow2 or raw or it may use remote block devices using ISCSI, ISER, NVMEOF, FC, FCOE. Portions of image 950 may be stored on the storage resource 410 or compute node 310. The controller 200, using global rules and/or templates, may, with the out of band management connection 260, or another connection, configure networking resources 610 properly to support the application. The application 910 on the resource 900 may boot by way using image 950 loaded by the SAN 280 or another network using a BIOS boot option or allowing a hypervisor 920 on the resource 900 to connect to a block storage resource such as including but not limited to, ISER (ISCSI over RDMA), NVMEOF FCOE, FC, or ISCSI or another storage backend such as SWIFT, GLUSTER, or CEPHFS. The storage resources may be copied from a template target on a storage resource. The IT system state 220 may be updated by querying the hypervisor 920 for information. The in band management connection 270 may communicate with the hypervisor 920 and may be used to determine power states of the resource, i.e., whether on or off or to determine bootup states. The hypervisor 920 may also use a virtual in band connection 923 to the virtualized application 910 and use the hypervisor 920 for similar functionality to out of band management. This information may indicate whether a service or application is up and running due to whether it is powered or booted.

A boot up state may be determined by image recognition through a console 190 of the resource 900, or out of band management 260 with virtual keyboard, querying a service that is listening on the resource, or querying a service of the application 910 itself. Some applications may have a process that allows the controller 200 to monitor or, in some cases, change settings in the application 910 using in band management 270. Some applications may be on virtual resources and the controller 200 may monitor by communicating with the hypervisor 920 using in band management 270 (or out of band management 260). An application 910 may not have such a process for monitoring (or such a process may be toggled off to save resources) and/or adding input; in such a case the controller 200 may use the out of band management connection 260 and use image processing and/or a virtual keyboard to logon to the system to make changes and/or toggle on a management process. Similarly with a virtual compute resource the virtual machine console 190 may be used.

Figure 9E:
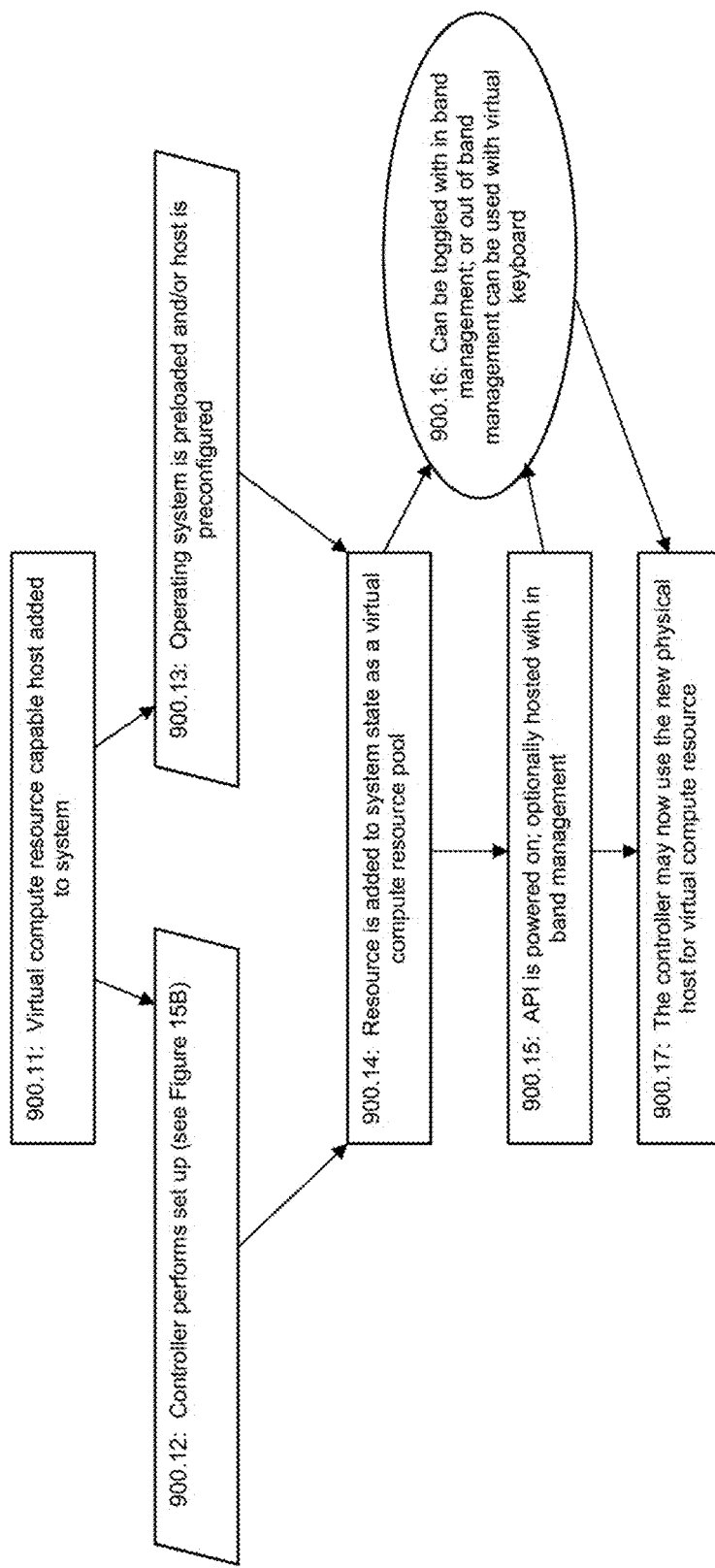
FIG. 9E shows an example process flow for adding a virtual compute resource host to an IT System.

FIG. 9E shows an example process flow for adding a virtual compute resource host to the IT System 100. At step 900.11, a host that is capable as a virtual compute resource is added to the system. The controller may configure the baremetal server as per the FIG. 15B process flow (step 900.12); or the operating system may be preloaded and/or the host may be preconfigured (step 900.13). The resource is then added to the system state 220 as a virtual compute resource pool (step 900.14), and the resource becomes accessible by API from the controller 200 (step 900.15). The API is usually accessed through in band management connection 270; however the in band management connection 270 may be selectively enabled and/or disabled with the virtual keyboard; and the controller may use the out of band management connection 260 and the virtual keyboard and monitor to communicate through the out of band connection 260 (step 900.16). At step 900.17, the controller can now make use of the new resource as a virtual compute resource.

Figure 10:
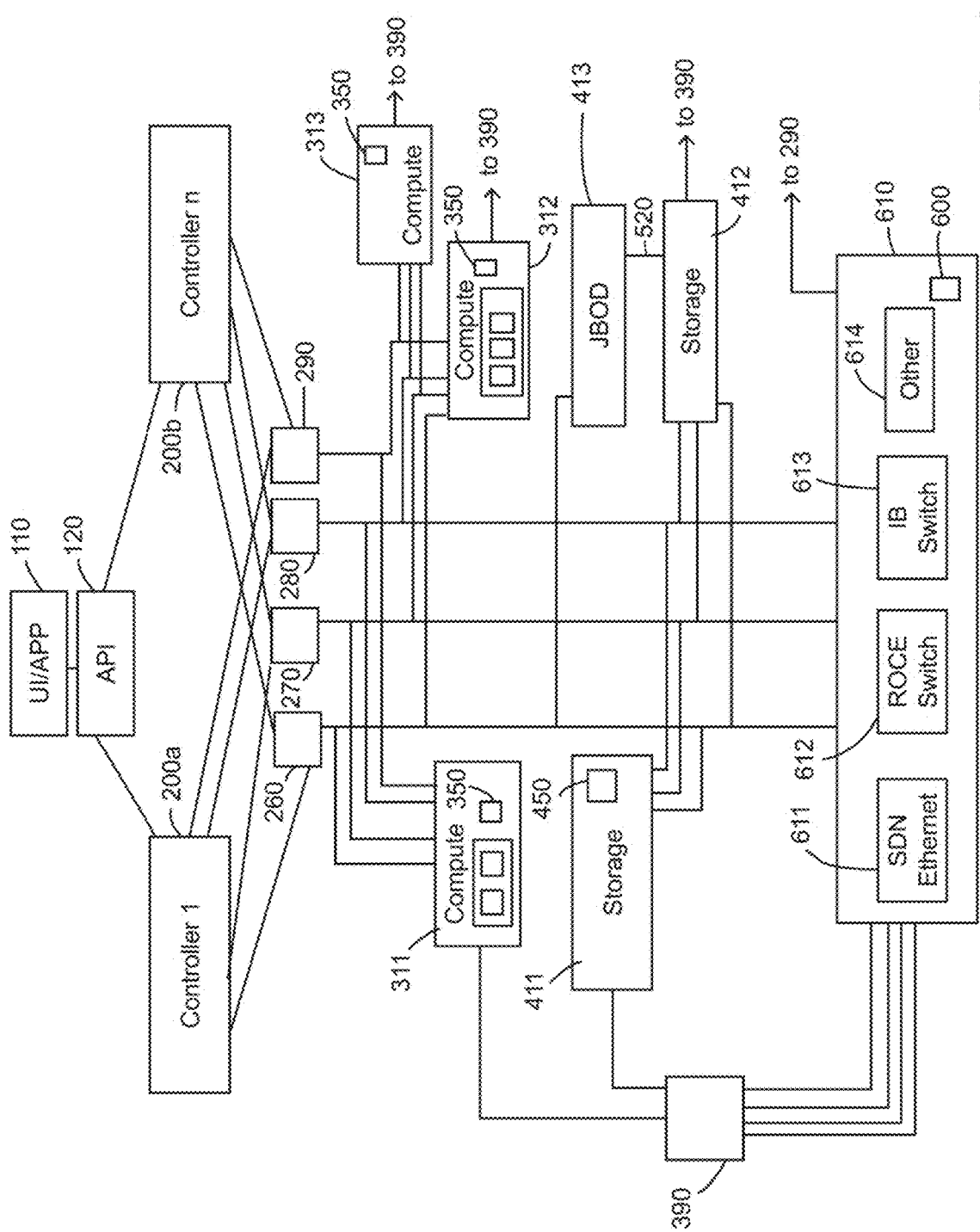
FIG. 10 is a schematic of the system according to an example embodiment in an example deployment.

An Example Multi-Controller System:

Referring to FIG. 10 a system 100 is illustrated with: compute resources 300,310 as described with respect to FIGS. 1-10 herein comprising a plurality of physical compute nodes 311, 312, 313; storage resources 400, 410 as described herein in the form of a plurality of storage nodes 411, 412 and JBOD 413; a plurality of controllers 200a, 200b which include components 205, 210, 220, 230 (FIGS. 1-9C) and are configured as controller 200 described herein; networking resources 600, 610 as described herein containing with a plurality of fabrics 611, 612, 613; and an application network 390.

FIG. 10 illustrates a possible arrangement of components of the system 100 of an example embodiment, while not limiting the possible arrangements of components of the system 100.

A user interface or application 110 communicates with an API application 120, which communicates with either or both controllers 200a or 200b. Controllers 200a, 200b may be coupled to out of band management connection 260, in band management connection 270, SAN 280 or network in band management connection 290. As described herein with reference to FIGS. 1-9C, The controllers 200a, 200b are coupled by way of connections 260, 270, 280 and optionally 290 to compute nodes 311, 312, 313, storage 411, 412 including JBOD 413, and networking resources 610. Applications network 390 is coupled to the compute nodes 311,312, 313, storage resources 411, 412, 413 and networking resources 610.

The controllers 200a, 200b may operate in parallel. Either controller 200a or 200b may initially operate as the master controller 200 as described with respect to FIGS. 1 to 9C herein. The controller(s) 200a, 200b may be arranged to configure the entire system 100 from a powered off state. One of controllers 200a, 200b may also populate the system state 220 from an existing configuration either by probing the other controller through the out of band and in band connections 260, 270. Either controller 200a, 200b may access or receive resource status and related information from the resources or the other controller through one or more connections 260, 270. A controller or other resources may update the other controller. Accordingly, when an additional controller is added to the system it may be configured to recover the system 100 back to the system state 220. In the event of failure of one of the controllers or the master controller, the other controller may be designated as the master controller. The IT system state 220 may also be reconstructable from status information available or stored on the resources. For example, an application may be deployed on compute resources where the application is configured to create virtual compute resources where the system state is stored or duplicated. The global system rules 210, system state 220, and templates 230 may also be saved or copied on a resource or a combination of resources. Accordingly, if all controllers are taken offline and a new one is added, the system may be configured to allow the new controller to recover the system state 220.

Networking resources 610 may comprise a plurality of network fabrics. For example, as shown in FIG. 10, a plurality of network fabrics may include one or more of: an SDN ethernet switch 611, a ROCE switch 612, an Infiniband switch 613, or other switch or fabric 614. Hypervisors comprising virtual machines on the compute nodes may connect to physical switches or virtual switches utilizing a desired one or more of the fabrics. The networking arrangement may permit restrictions of the physical network, e.g. through segmented networking, for example for security or other resource optimizing purposes.

The system 100 through the controller 200 as described in FIGS. 1-10 herein may automatically set up services or applications. A user through user interface 110 or an application may request a service be set up for the system 100. The service may include but is not limited to e-mail service; a web service; a user management service; network provider, LDAP, Dev tools, VOIP, authentication tools, accounting software. The API application 120 translates the user or application request and sends a message to the controller 200. The service templates or images 230 of the controller 200 are used to identify which resources are needed for the service. The resources needed are identified based on availability according to the system state 220. The controller 200 makes a request to a compute resource 310 or compute node 311, 312 or 313 for the compute services required, to the storage resource 410 for the storage resources required, and to the network resource 610 for the networking resources required. The system state 220 is then updated identifying the resources to be allocated. The service is then installed to the allocated resources using global system rules 210 according to the service template.

Figure 13A:
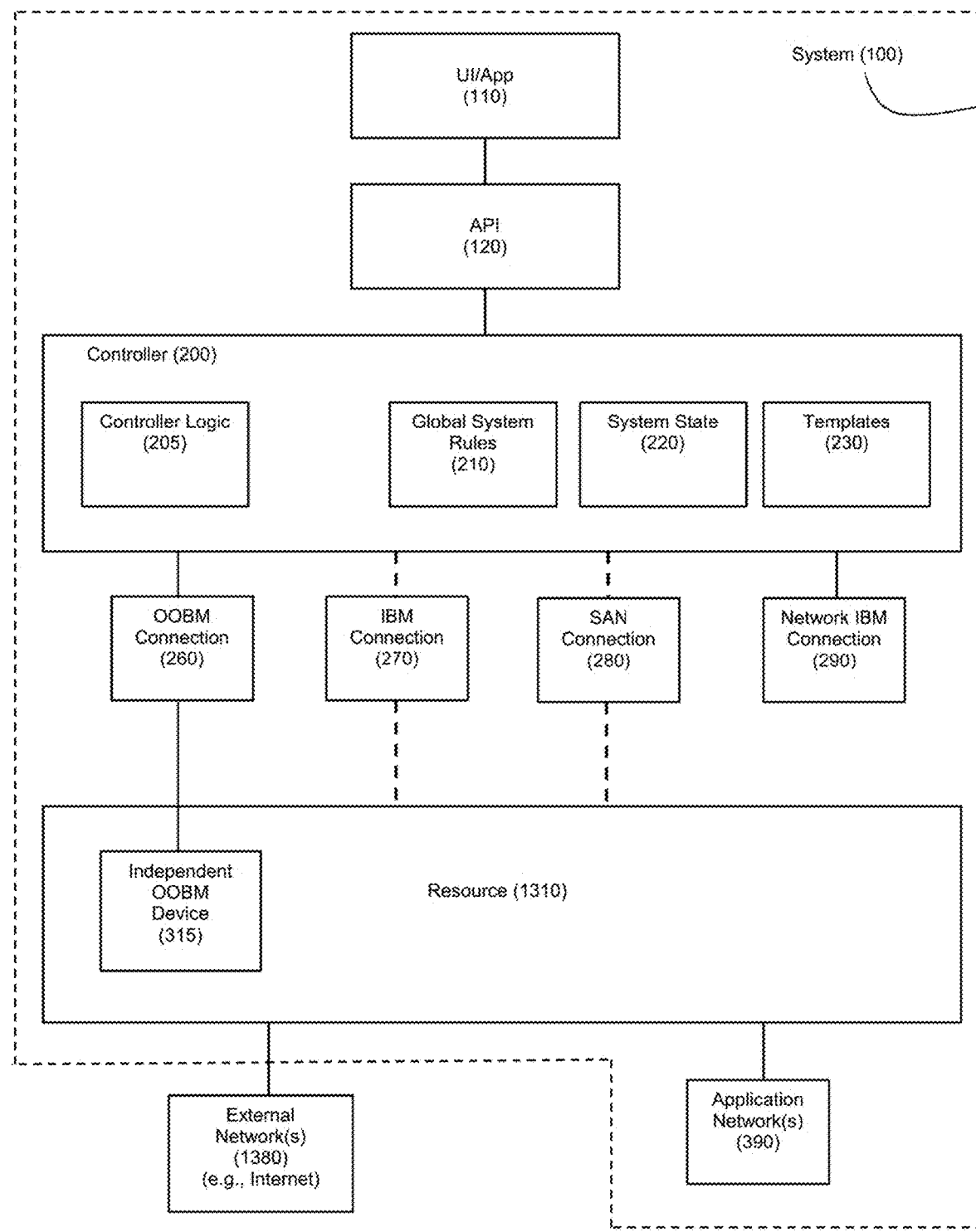
FIG. 13A is a schematic illustration of a system according to an example embodiment.

Enhanced System Security:

Referring to FIG. 13A, an IT system 100 is shown where the system 100 includes a resource 1310, where the resource 1310 can be a bare metal or physical resource. While FIG. 13A shows only a single resource 1310 connected to the system 100, it should be understood that the system 100 may include a plurality of the resources 1310. The resource(s) 1310 may be or may comprise a bare metal cloud node. A bare metal cloud node may include but is not limited to a resource that is connected to an external network 1380 that allows remote access to the physical host or virtual machines, allows the creation of virtual machines, allows external users to execute code on the resource(s). Resource(s) 1310 may be connected directly or indirectly to an external network 1380 or an Applications Network 390. The external network 1380 may be an internet or other resource(s) that is/are not managed by the controller 200 or controllers of the IT system 100. The external network 1380 may include but is not limited to the internet, internet connection(s), resource(s) not managed by the controller, other wide area networks (for example Stratcom, a peer to peer mesh network, or other external networks that may or may not be publically accessible) or other networks.

When the physical resource 1310 is added to the IT system 100a, it is coupled to the controller 200 and may be powered off. The resource 1310 is coupled to the controller 200a by way of one or more networks: the out of band management (OOBM) connection 260, optionally in band management (IBM) connection 270, and optionally the SAN connection 280. A SAN 280 as used in herein may or may not comprise a configuration SAN. A configuration SAN may comprise a SAN that used for powering on or configuring physical resources. A configuration SAN may be part of SAN 280 or may be separate from SAN 280. In-band management may also comprise a configuration SAN that may or may not be SAN 280 as shown herein. The configuration SAN may also be disabled, disconnected or not available when resources are used. While the OOBM connection 260 is not visible to the OS for system 100, the IBM connection 270 and/or the configuration SAN may be visible to the OS for system 100. The controller 200 of FIG. 13A may be configured in a manner similar to controller 200 described with reference to FIGS. 1-12B herein. The resource 1310 may comprise an internal storage. In some configurations the controller 200 may populate the storage and may temporarily configure the resource to connect to the SAN to fetch data and/or information. The out of band management connection 260 may be coupled to an independent out of band management device 315 or circuit of the resource 1310 which is turned on when the resource 1310 is plugged in. The device 315 may allow features including but not limited to power on/off the device, attaching to the console and typing commands, monitoring temperatures and other computer health related elements, and setting BIOS settings and other features out of scope from the operating system. The controller 200 may see the resource 1310 through the out of band management network 260. It may also identify the type of resource and identify its configuration using in band management or out of band management. FIGS. 13C-13E, discussed below, illustrate various process flows for adding a physical resource 1310 to an IT system 100a and/or starting up or managing a system 100 in a manner that enhances the system security.

The term "disable" as used herein with reference to a network, networking resource, network device, and/or networking interface refers to the actions by which such network, networking resource, network device, and/or networking interface is: powered off (manually or automatically), disconnected physically, and/or disconnected virtually or in some other way (e.g., filtered) from a network, virtual network (including but not limited to VLAN, VXLAN, infiniband partition). The term "disable" also encompasses one-way or unidirectional limitations of operability such as preventing a resource from sending or writing data to a destination (while still having the ability to receive or read data from a source), preventing a resource from receiving or reading data from a source (while still having the ability to send or write data to a destination). Such network, networking resource, network device and/or networking interface may be disconnected from an additional network, virtual network, or coupling of resources and remain connected to a previously connected network, virtual network, or coupling of resources. In addition, such networking resource or device could be switched from one network, virtual network or coupling of resources to another one.

The term "enable" as used herein with reference to a network, networking resource, network device, and/or networking interface refers to the actions by which such network, networking resource, network device, and/or networking interface is: powered on (manually or automatically), connected physically, and/or connected virtually or in some other way to a network, virtual network (including but not limited to VLAN, VXLAN, infiniband partition). Such network, networking resource, network device and/or networking interface may be connected to an additional network, virtual network, or coupling of resources if already connected to another system component. In addition, such networking resource or device could be switched from one network, virtual network or coupling of resources to another one. The term "enable" also encompasses one-way or unidirectional allowance of operability such as allowing a resource to send, write, or receive data to or from a destination (while still having the ability to limit data from a source), allowing a resource to send, receive or read data from a source (while still having the ability to limit or data from a destination).

The controller logic 205 is configured to look through out of band management connection 260 or in band management connection 270 and/or configuration SAN 280 for added hardware. If a resource 1310 is detected, then the controller logic 205 may use the global system rules 220 to determine whether the resource is to be configured automatically or by interacting with the user. If it is added automatically, the set up will follow global system rules 210 within the controller 200. If it is added by the user, the global system rules 210 within the controller 200 may ask the user to confirm addition of the resource and what the user wants to do with the resource 1310. The controller 200 may query the API application or otherwise request the user or any program controlling the stack, for confirmation that the new resource is authorized. The authorization process may also be completed automatically and securely using cryptography to confirm the legitimacy of a new resource. The controller logic 205 then adds the resource 1310 to the IT system state 220 including the switches or networks into which the resource 1310 is plugged.

Where the resource is physical, the controller 200 may power on the resource through the out of band management network 260 and the resource 1310 may boot off an image 350 loaded from the templates 230, for example, by way of the SAN 280, using global system rules 210 and controller logic 205. The image may be loaded through other network connections or indirectly by way of another resource. Once booted, the information relating to the resource 1310 may also be gathered and added to the IT system state 220. This may be done through in band management and/or configuration SAN or out of band management connections. The resource 1310 may boot off an image 350 loaded from the templates 230, for example, by way of the SAN 280, using global system rules 210 and controller logic 205. The image may be loaded through other network connections or indirectly by way of another resource. Once booted, the information received through the in-band management connection 270 relating to the compute resource 310 may also be gathered and added to the IT system state 220. The resource 1310 may then be added to the storage resource pool and it becomes a resource that is managed by the controller 200 and tracked in the IT system state 220.

The in band management and/or configuration SAN may be used by controller 200 to set up, manage, use or communicate with the resource 1310 and to run any commands or tasks. Optionally, however the in-band management connection 270 may be configured by the controller 200 to be turned off or disabled at any time or during set up, management, use or operation of the system 100 or controller 200. The in-band management may also be configured to be turned on or enabled at any time or during set up, management, use or operation of the system 100 or controller 200. Optionally, the controller 200 may controllably or switchably disconnect the resource 1310 from the in-band management connection 270 to the controller(s) 200. Such disconnection or disconnectability may be physical, for example using an automated physical switch or a switch to power off the in band management connection and/or configuration SAN of the resource to the network. The disconnection for example, may be accomplished by the network switch shutting off power to the port connected to the resource 1310's in band management 270 and/or configuration SAN 280). Such disconnection or partial disconnection may also be accomplished using software-defined networking, or may be filtered with respect to the controller physically, using software-defined networking. Such disconnection may be accomplished by way of the controller through either in band management or out of band management. According to example embodiments, at any point before, during or after the resource 1310 is added to the IT system, the resource 1310 may be disconnected from in band management connection 270 in response to selective control instructions from controller 200.

Using software-defined networking, the in-band management connection 270 and/or configuration SAN 280 may or may not retain some function. The in band management 270 and/or configuration SAN 280 may be used as a limited connection, for communication to or from the controller 200 or to other resources. The connection 270 may be limited to prevent an attacker from pivoting to the controller 200, other networks or other resources. The system may be configured to prevent devices such as the controller 200 and the resource 1310 from openly communicating to avoid compromising the resource 1310. For example, in band management 270 and/or configuration SAN 280, through software-defined networking or hardware change methods (such as electronic limitations), may only allow in band management and/or configuration SAN to transmit data but not receive anything. The in-band management and/or configuration SAN may be configured to be a one-way write component or as a one-way write connection from the controller 200 to the resource 1310 either physically or using software-defined networking that only allows writing from the controller to the resource. The one-way write nature of the connection may also be controlled or turned on or off according to desirability for security and different stages or times of operation of the system. The system may also be configured so that the writing or communication from the resource to the controller is limited, for example, to communicate logs or alerts. Interfaces may also be moved to other networks or added and removed from networks by way of techniques including but not limited to software defined networking, VLANS, VXLANS and/or infiniband partitioning. For example, an interface may be connected to a setup network, removed from that network and moved to a network used for runtime. The communication from the controller to the resource may be cut off or limited so that the controller may be physically unable to respond to any data sent from the resource 1310. According to an example, once the resource 1310 is added and booted, the in band management 270 may be switched off or filtered either physically or using software defined networking. In band management may be configured so that it is capable of sending data to another resource dedicated to log management.

The in band management may be turned on and off using out of band management or software defined networking. With the in band management disconnected, daemons running may not be needed and in band management may be re-enabled using keyboard functionality.

Further, optionally the resource 1310 may not have an in band management connection and the resource may be managed through out of band management.

Out of band management may alternatively or in addition be used to manipulate various aspects of the system by way of including but not limited to, for example, keyboard, virtual keyboard, disk mounting console, attaching a virtual disk, changing bios settings, changing boot parameters and other aspects of the system, running existing scripts that may exist on a bootable image or install CD, or other features of out of band management for allowing the controller 200 and resource 1310 to communicate with or without exposure of the operating system running on the resource 1310. For example, the controller 200, by way of out of band management 260, may send commands using such tools. The controller 200 may also use image recognition to assist in controlling the resource 1310. Accordingly, using the out of band management connection, the system may prevent or avoid undesirable manipulation of the resource that is connected to the system by way of the out of band management connection. The out of band management connection may also be configured as a one-way communication system during operation of the system or at selected times during operation of the system.

Furthermore, the out of band management connection 260 may also be selectively controlled by the controller 200 in the same manner as the in band management connection if desired by a practitioner.

The controller 200 may be able to turn resources on and off automatically according to global system rules and update the IT system state for reasons determined by the IT system user such as turning resources off to save power or turning on resources to improve application performance or any other reason the IT system user may have. The controller may also be able to turn on and off configuration SAN, in band and out of band management connections or to designate such connections as one way write connections during anytime of system operation and for various security purposes (e.g., disabling the in band management connection 270 or configuration SAN 280 while resource 1310 is connected to external network 1380 or internal network 390. One way in band management may also be used, for example to monitor the health of a system, is to monitor logs and information that may be visible to the operating system.

The resource 1310 may also be coupled to one or more internal networks 390, such as application networks where services, applications users and/or clients can communicate with each other. Such applications network 390 may also be connected or connectable to external network 1380. According to example embodiments herein, including but not limited to FIGS. 2A-12B, the in band management may be disconnected, disconnectable from a resource or the applications network 390 or may provide one way writing from the controller, to provide additional security where the resource or applications network is connected to an external network or where the resource is connected to an applications network that is not connected to an external network.

The IT system 100 of FIG. 13A may be configured similar to IT system 100 as shown in FIG. 3B; an image 350 may be loaded directly or indirectly (through another resource or database) from templates 230 to the resource 1310 for booting the compute resource and/or loading applications. The image 350 may comprise boot files 340 for the resource type and hardware. The boot files 340 may comprise a kernel 341 corresponding to a resource, application or service to be deployed. Boot files 340 may also comprise an initrd or similar filesystem used to aid the booting process. The boot system 340 may comprise a plurality of kernels or initrds configured for different hardware types and resource types. In addition the image 350 may comprise a filesystem 351. The filesystem 351 may comprise a base image 352 and corresponding file system as well as a service image 353 and corresponding files system and a volatile image 354 and corresponding filesystem. The file systems and data loaded may vary depending on the resource type and applications or services to be running. The base image 352 may comprise a base operating system file system. The base operating system may be read only. The base image 352 may also comprise basic tools of the operating system independent of what is being run. The base image 352 may include base directories and operating system tools. The service filesystem 353 may include configuration files and specifications for the resource, application or service. The volatile filesystem 354 may contain information or data specific to that deployment such as binary applications, specific addresses and other information, which may or may not be configured as variables including but not limited to passwords, session keys and private keys. The filesystems may be mounted as one single filesystem using technologies such as overlayFS to allow for some read only and some read-write filesystems reducing the amount of duplicate data used for applications.

Figure 13B:
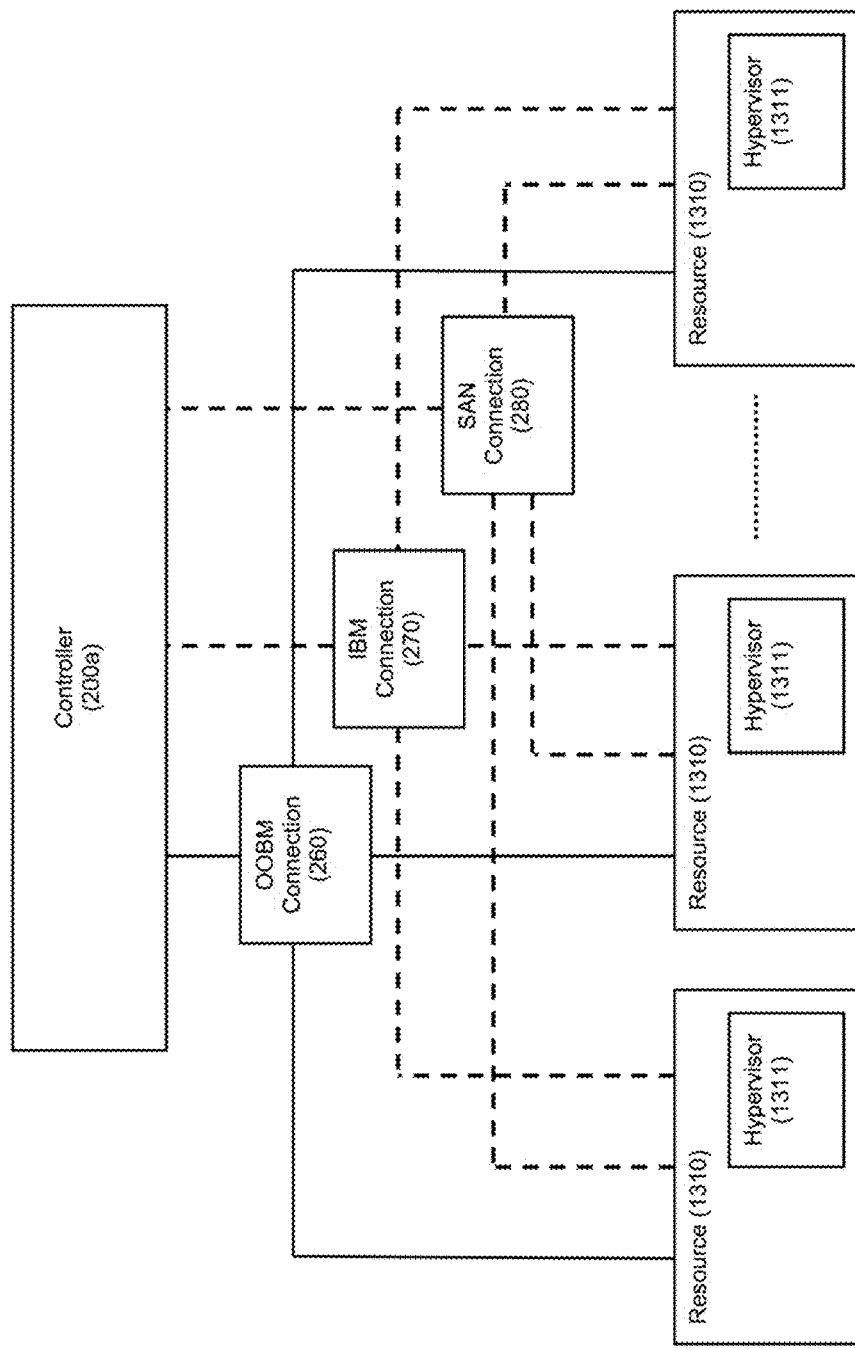
FIG. 13B is another schematic illustration of a system according to an example embodiment.
Figure 13C:
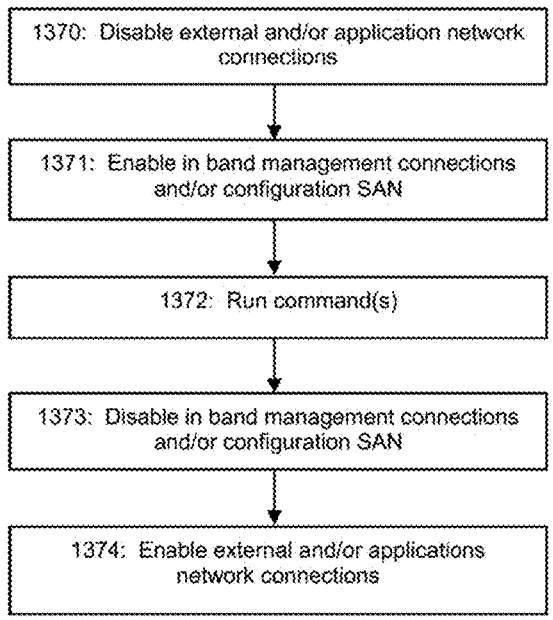
FIGS. 13C-13E illustrate example process flows for a system according to an example embodiment.
Figure 13D:
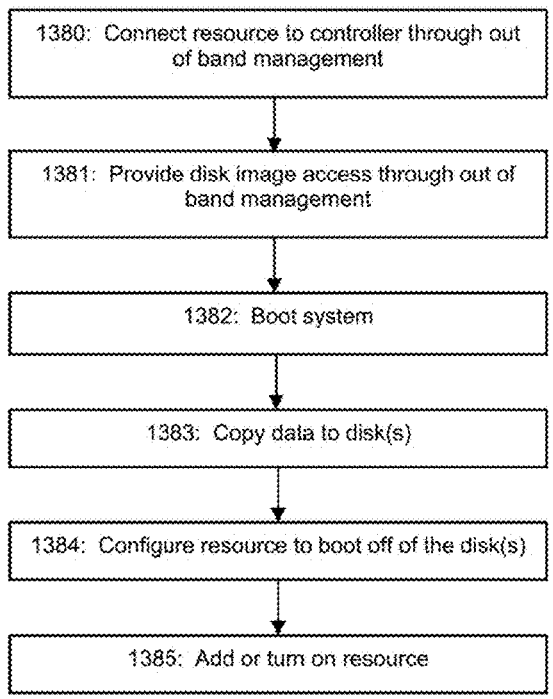
Figure 13E:
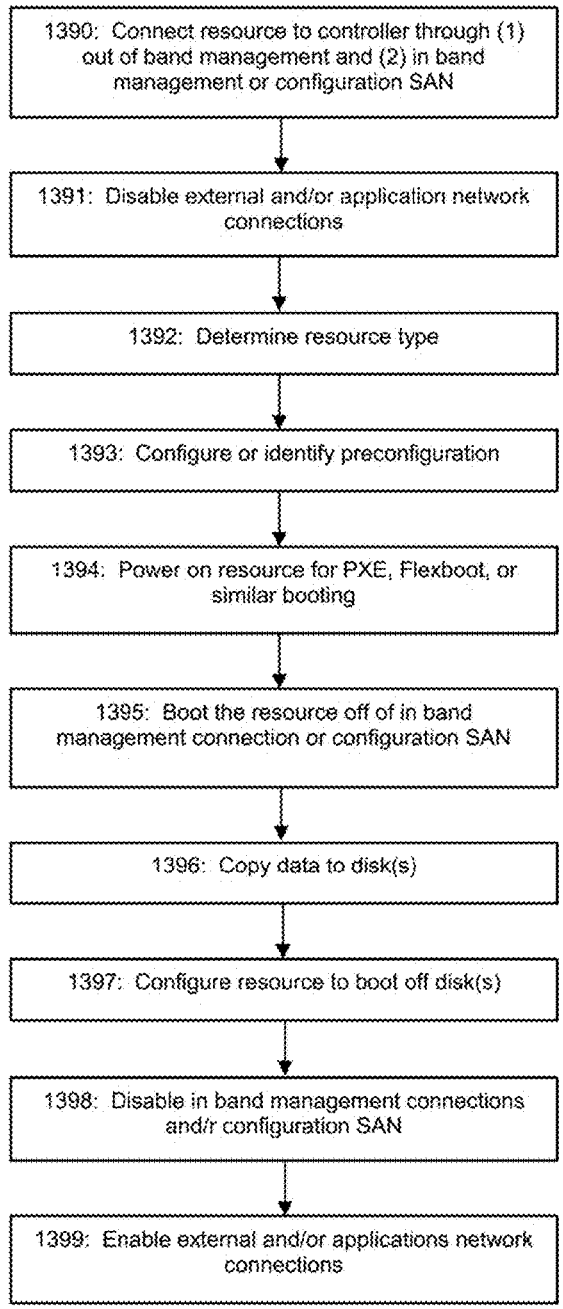

FIG. 13B illustrates a plurality of resources 1310 each comprising one or more hypervisors 1311 hosting or comprising one or more virtual machines. The controller 200a is coupled to resources 1310 that each comprises a bare metal resource. The resources 1310 are each coupled to the controller 200a as shown and described with reference to FIG. 13B. According to example embodiments herein, the in band management connection 270, configuration SAN 280, and/or out of band management connection 260 may be configured as described with respect to FIG. 13A. One or more of the virtual machines or hypervisors may be or become compromised. In conventional systems, the other virtual machines on the other hypervisors may then become compromised. For example, this may occur from a hypervisor exploit run inside a virtual machine. For example, pivoting may go from the compromised hypervisor to the controller 200a and there from the compromised controller 200a to other hypervisors coupled to the controller 200a. For example, the pivoting may occur between the compromised hypervisor and the targeted hypervisor using a network connected to both. The arrangement of the in band management 270, configuration SAN 280, or out of band management 260 of the controller 200a and resources 1310 illustrated in FIG. 13B, where any or all can be selectively controlled to disable the in band (or configuration SAN) and/or out of band connections in a given link between controller 200a and resource 1310 may prevent a compromised virtual machine being used to break out of one hypervisor and pivot to other resources.

The in band management connection 270 and out of band management connection 260 described with respect to FIG. 1 to FIG. 12 above may also be similarly configured as described with respect to FIGS. 13A and 13B.

FIG. 13C illustrates an example process flow for adding or managing a physical resource such as a baremetal node to a system 100. A resource 1310 as shown in FIGS. 13A and 13B or as shown with respect to FIGS. 1-12 herein may be connected by way of out of band management connection 260 and an in band management connection 270 and/or SAN, to a controller of a system 100.

After an instance of a connection of the resource, the external networks and/or applications networks are disabled at step 1370. As noted above, any of a variety of techniques can be used for this disablement. For example, prior to setting up the system, adding the resource, testing the system, updating the system, or performing other tasks or commands, using an in band management connection or configuration SAN, the components of the system 100 (or only those vulnerable to attack) are disabled, disconnected or filtered from any external network or applications network as described with respect to FIGS. 13A and 13B.

After step 1370, an in band management connection and/or configuration SAN is then enabled at step 1371. The combination of steps 1370 and 1371 thus isolate the resource from external networks and/or application networks while the in band management and/or SAN connection is live. Commands may then be run on the resource under control of the controller 200 via the in band management connection (see step 1372). For example, the set up and configuration steps such as, including but not limited to, those described herein with respect to FIGS. 1-13B, may then be performed at step 1372 using in band management and/or configuration SAN. Alternatively or in addition, other tasks may be performed at step 1372 using in band management, and/or configuration SAN including but not limited to operating, updating or managing of the system (which may include but is not limited to any change management or system updates), testing, updating, transferring data, collecting information on performance and health (including but not limited to errors, cpu usage, network usage, filesystem information, and storage usage), and collecting logs as well as other commands that may be used to manage the system 100 as described in FIGS. 1 to 13B herein.

After adding the resource, setting up the system, and or performing such tasks or commands, the in band management connection 270 and/or configuration SAN 280 between the resource and the controller or other components of the system, may be disabled at step 1373 in one or more directions as described herein with respect to FIGS. 13A and 13B. Such disablement may employ disconnections, filtering, and the like as discussed above. After step 1373, the connections to the external network and/or applications network may then be restored at step 1374. For example, the controller may tell a networking resource to allow the resource 1310 to connect to the applications network or the internet. The same steps may be followed where the system is tested or updated, that is the in-band management connection to external networks and/or applications networks may be disconnected or filtered prior to enabling or connecting (one-way or both ways) the in-band management connection to the resource. Accordingly, steps 1373 and 1374 operate together to isolate the resource from connecting to the controller through an in band management connection and/or configuration SAN while the resource is connected to external networks and/or application networks Out of band management may be used to manage a system or resource, to set up a system or resource, to configure, to boot, or to add a system or resource. Out of band management, where used in any of the embodiments herein, may send commands to the machine using the virtual keyboard for changing settings before booting and also may send commands to the operating system by typing to the virtual keyboard; if the machine is not logged in, out of band management may use the virtual keyboard to type in a username and password and may use image recognition to verify logon and to verify the commands it types and check to see if they executed. If the physical resource only has a graphical console a virtual mouse may also be used and image recognition will allow out of band management to make changes.

FIG. 13D another example process flow for adding or managing a physical resource such as a baremetal node to a system 100. At step 1380, a resource as shown in FIGS. 13A and 13B or as shown in FIGS. 1-12 herein may be connected by way of out of band management 260 to a system or resource. A disk may be connected virtually by providing access to a disk image (for example an ISO image) through out of band management facilitated by the controller (see step 1381). The resource or the system may then be booted from the disk image (step 1382), and then files are copied from the disk image to a bootable disk (see step 1383). This may also be used to boot a system where the resources are set up in this manner using out of band management. This may also be used to configure and/or boot a plurality of resources that may be coupled together (including but not limited to with a networking resource) whether or not the plurality of resources also comprise a controller or make up a system. Accordingly, a virtual disk may be used to allow the controller to connect a disk image to the resource as if the virtual disk were attached to the resource. Out of band management may also be used for sending files to the resource. Data may be copied to local disks from the virtual disk at step 1383. The disk image may contain files that the resource can copy and use in its operation. The files may be copied or used either through a scheduled program or instructions from out of band management. The controller, through out of band management, may use the virtual keyboard to log on to the resource and enter commands to copy the files from the virtual disk to its own disk or other storage accessible to the resource. At step 1384, the system or a resource is configured to boot, by setting bios, efi, or boot order settings so it will boot from the bootable disk. The boot configuration may use an EFI manager in the operating system such as efibootmgr which may be run directly through out of band management or by including it in an installer script (e.g. when the resource boots it automatically runs a script that uses efibootmgr). In addition, the boot options and any other bios changes may be set through an out of band management tool such as Supermicro Boot Manager using either boot order commands or uploading a bios configuration (such as an XML BIOS configuration supported by the Supermicro Update Manager). The bios may also be configured using the keyboard and image recognition from the console to set the proper bios settings including the boot order. An installer may be run on a preconfigured image loaded. The configuration may be tested by watching a screen and using image recognition. After configuration, the resource can then be enabled (e.g., powered on, booted, connected to an application network, or combinations thereof) (step 1385).

FIG. 13E illustrates another example process flow for adding or managing a physical resource such as a baremetal node to a system 100, in this case using PXE, Flexboot or similar network booting. At step 1390, a resource 1310 as shown in FIGS. 13A and 13B or as shown with respect to FIGS. 1-12 herein may be connected by way of (1) an in band management connection 270 and/or a SAN and (2) out of band management connection 260, to a controller of a system 100. The external networks and/or applications network connections may then be disabled (e.g., filtered or disconnected in whole or in part, physically, with SDN or virtually) at step 1391 (similar to as discussed above in relation to step 1370). For example, prior to setting up the system, adding the resource, testing the system, updating the system, or performing other tasks or commands, using an in band management connection or SAN, the components of the system 100 (or only those vulnerable to attack) are disabled, disconnected or filtered from any external network or applications network as described with respect to FIGS. 13A and 13B.

At step 1392, the type of resource is determined. For example, information concerning the resource may be gathered from the mac address, using out of band management tools or by connecting a disk image (e.g. an ISO image) to the resource as if the disk were attached to the resource, to temporarily boot up an operating system that has tools that can be used to identify resource information. At step 1393, the resource is then configured, or identified as being preconfigured for PXE or flexbooting or the like. Then, at step 1394, the resource is powered on to do PXE, Flexboot or similar booting (or in the case where it was temporarily booted, powered on again.). The resource is then booted off of or from the in band management connection or SAN at step 1395. At step 1396, data is copied to disks accessible by the resource in a manner similar to that described with reference to step 1383 of FIG. 13D. At step 1397, the resource is then configured to boot off of the disk(s) in a manner similar to that described above with respect to step 1384 of FIG. 13D. In the case where the resource is identified as preconfigured for PXE, flexbooting or the like, files may be copied at any step from 1393 to 1396. If the in band management was enabled, it may be disabled at step 1398, and the applications network or external network may be reconnected or enabled at step 1399.

Further still, it should be understood that techniques other than OOBM could be used to enable (such as power on) a resource remotely and verify that it has been booted. For example the system could prompt the user to push the power button and tell the controller manually that the system is booted (or use a keyboard/console connection to the controller). Also, the system could ping the controller through IBM once it has been booted and the controller logs on and tells it to reboot (e.g., through a method such as ssh, telnet or another method over the network). For example, the controller could ssh in and send the reboot command. If PXE is being used and there is no OOBM, in any case, the system should have a way to remotely instruct the resource to power on or tell the user to power it on manually.

Deploying Controllers and/or Environments:

In example embodiments, a controller may be deployed within a system from an originating controller 200 (where such an originating controller 200 can be referred to as a "main controller". Accordingly, a main controller may set up systems or environments that may be isolated or isolatable IT systems or environments.

An environment as described herein refers to a collection of resources within a computer system that are capable of interoperating with each other. A computer system may include multiple environments within it; although this need not be the case. The resource(s) of an environment may comprise one or more instances, applications or sub applications running on the environment. Further still, an environment may comprise one or more environments or sub-environments. An environment may or may not include a controller, and an environment may operate one or more applications. Such resources of an environment may include, for example, networking resources, compute resources, storage resources, and/or applications networks that are used to run a particular environment including applications in the environment. Accordingly, it should be understood that an environment may provide the functionality of one or more applications. In some examples, environments described herein may be physically or virtually separated or separable from other environments. Also, in other examples, environments may have network connections to other environments, where such connections may be disabled or enabled as desired.

In addition, a main controller may set up, deploy and/or manage one or more additional controllers in various environments or as separate systems. Such additional controllers may be or become independent of the main controller. Such additional controllers may take instructions from or send information to a main controller (or a separate monitor or environment via a monitoring application) at various times during operation, even if independent or quasi-independent from the main controller. The environments may be configured for security purposes (e.g., by making environments isolatable from each other and/or a main controller) and/or for a variety of management purposes. An environment may connect to an external network while another related environment may or may not connect or be connected to an external network.

A main controller may manage environments or applications whether or not they are separate systems and whether or not they comprise a controller or subcontroller. A main controller may also manage shared storage of global configuration files or other data. A main controller may also parse global system rules (e.g., system rules 210) or subsets thereof to different controllers depending on their function. Each new controller (which can be referred to as a "sub-controller") may receive new configuration rules that may be a subset of the configuration rules of the main controller. Subsets of the global configuration rules deployed to a controller may depend on or correspond to the type of IT system that is being set up. A main controller may set up or deploy new controllers or separate IT systems that are then separated permanently from the main controller, e.g. for shipping or distribution or otherwise. The global configuration rules (or subset thereof) may define frameworks for setting up the applications or sub applications in various environments and how they may interact with each other. Such applications or environments may run on a sub-controller that comprises a subset of global configuration rules deployed by a main controller. In some examples, such applications or environments can be managed by the main controller. However, with other examples, such applications or environments are not managed by the main controller. If a new controller is being spawned from the main controller to manage the applications or environments, there can be dependence checking for applications across multiple applications to facilitate control by the new controller.

Thus, in an example embodiment, a system may comprise a main controller configured to deploy another controller or an IT system comprising such other controller. Such an implemented system may be configured to be disconnected completely from a main controller. Once independent, such system may be configured to operate as a stand-alone system; or it may be controlled or monitored by another controller (or environment with an application) such as the main controller at various discrete or continuous times during operation.

FIG. 14A shows an example system where a main controller 1401 has deployed controllers 1401a and 1401b on different systems 1400a and 1400b respectively (where 1400a and 1400b may be referred to as sub-systems; although it should be understood that sub-systems 1400a and 1400b could also serve as environments). Main controller 1401 can be configured in a manner similar to that of controller 200 discussed above. As such, it may include controller logic 205, global system rules 210, a system state 220, and templates 230.

Systems 1400a and 1400b respectively comprise controllers 1401a, 1401b respectively coupled to resources 1420a, 1420b. The main controller 1401 may be coupled to one or more other controllers such as controller 1401a of sub-system 1400a and controller 1401b of sub-system 1400b. The global rules 210 of the main controller 1400 may include rules that may manage and control other controllers. Main controller 1401 may use such global rules 210 along with controller logic 205, system state 220 and templates 230 to set up, provision and deploy sub-systems 1400a, 1400b, through controllers 1401a, 1401b in a manner similar to that described with reference to FIGS. 1 to 13E herein.

For example, the main controller 1401 may load the global rules 210 (or a subset thereof) onto the sub-systems 1400a, 1400b as rules 1410a, 1410b respectively in a manner that the global rules 210 (or subset thereof) dictate the operation of the controllers 1401a, 1401b and their sub-systems 1400a, 1400b. Each controller 1401a, 1401b may have rules 1410a, 1410b that may be the same or a different subset of global rules 210. For example, which subset of global rules 210 gets provisioned to a given sub-system may depend on the type of sub-system that is being deployed. The controller 1401 may also load or direct data to be loaded to the system resources 1420a, 1420b or controller 1401a, 1401b.

The main controller 1401 may be connected to other controllers 1401a, 1401b, through in band management connection(s) 270 and/or out of band management connection(s) 260 or SAN connections 280 that may be enabled or disabled at various stages of deployment or management in a manner as described herein; for example, with reference to FIGS. 13A-E. Using selective enablement and disablement of in band management connections 270 or out of band management connections 260, sub-systems 1400a, 1400b may be deployed in a manner that the sub-systems 1400*a*, 1400*b* at various times may have no knowledge (or limited, controlled or restricted knowledge) of the main system 100 or controller 1401 or with respect to each other.

In an example embodiment, a main controller 1401 may operate a centralized IT system that has local controllers 1401*a*, 1401*b* deployed and configured by the main controller 1401 so that the main controller 1401 may deploy and/or run a plurality of IT systems. Such IT systems may or may not be independent of each other. The main controller 1401 may set up monitoring as a separate application that is isolated or air-gapped from the IT systems it has created. A separate console for monitoring may be provided with connections between the main controller and local controller(s) and/or connections between environments that may be selectively enabled or disabled. The controller 1401 may deploy for example, isolated systems for various uses including but not limited to businesses, systems for manufacturing with data storage, a data center, as well as other various functional nodes, each having a different controller in the event of an outage or compromise. Such isolation may be complete or permanent, or may be quasi-isolated, e.g., temporary, time or task dependent, communication direction dependent or other parameter dependent. For example, a main controller 1401 may be configured to provide instructions to the system which may or may not be limited to certain pre-defined situations, while the sub system may have limited or no ability to communicate with the main controller. Thus, such a subsystem may not be able to compromise the main controller 1401. The main controller 1401 and subcontrollers 1401*a*, 1401*b* may be separated from each other by disabling in band management 270, by one-way writing and/or or by limiting communication to out of band management 260, for example as described herein (with specific examples discussed below). For example, if a breach occurs, one or more controllers may have in band management connections 270 disabled with respect to one or more other controllers to prevent spreading of a breach or access. System sections can be turned off or isolated.

The sub-systems 1400*a*, 1400*b* also may share resources with or be connected through in band management 270 or out of band management 260 to another environment or system.

FIGS. 14B and 14C are example flows illustrating possible steps to provision a controller with a main controller.

In FIG. 14B, at step 1460, the main controller provisions or sets up a resource such as resource 1420*a* or 1420*b*. At step 1461, the main controller provisions or sets up a sub-controller. The main controller can use the techniques discussed above for setting up a resource within a system to perform steps 1460 and 1461. Furthermore, while FIG. 14B shows step 1460 being performed prior to step 1461, it should be understood that this need not be the case. Using its system rules 210, the main controller 1401 may determine which resources are needed and locate the resources on a system or network. The main controller may set up or deploy a sub-controller at step 1461 by loading system rules 210 on to a system to set up the sub-controller (or by providing instructions to the sub-controller on how to set up and get its own system rules). These instructions may include but are not limited to: configuration of resources, configuration of applications, global system rules to create an IT system run by a sub-controller, instructions to reconnect to a main controller to gather new or changed rules, instructions to disconnect from an applications network to make room for a new production environment. After deploying the resource, at step 1463, the main controller may then assign the resource to the sub-controller via system rules 210 and/or updates to system state 220.

FIG. 14C shows an alternate process flow for deployment. In the example of FIG. 14C, the main controller deploys the sub-controller at step 1470 (which can proceed as described with respect to step 1461). Then, at step 1475, the sub controller deploys the resource using techniques such as those shown by FIG. 3C and FIG. 7B.

Figure 15A:
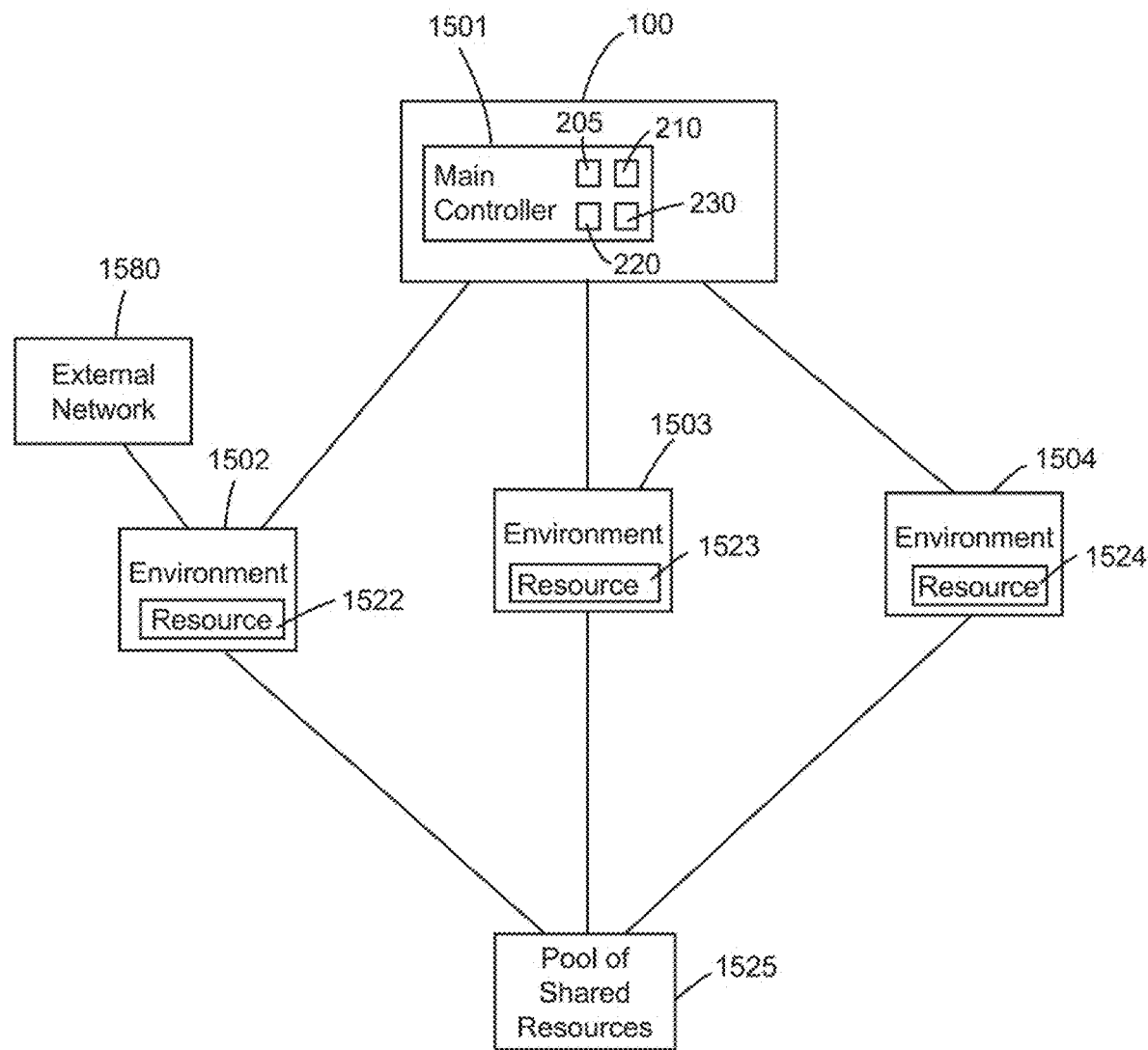
FIG. 15A shows an example system where a main controller spawns environments.

FIG. 15A shows an example system where a main controller 1501 for system 100 spawns environments 1502, 1503, and 1504. Environment 1502 includes resource 1522, environment 1503 includes resource 1523, and environment 1504 includes resource 1524. Furthermore, environments 1502, 1503, 1504 may share access to a pool of shared resources 1525. Such shared resources may include but are not limited to, for example, shared data sets, an API, or applications running that need to communicate with each other.

In the example of FIG. 15A, each environment 1502, 1503, 1504 shares the main controller 1501. The global system rules 210 of the main controller 1501 may include rules that deploy and manage environments. Resources 1522, 1523, and/or 1524 may be needed by their respective environments 1501, 1502, 1503 to manage one or more applications. Configurations rules for such applications may be implemented by the main controller (or by a local controller in the environment if present) in order to define how each such environment operates and interacts with other applications and environments. Main controller 1401 may use global rules 210 along with controller logic 205, system state 220 and templates 230 to set up, provision and deploy environments in a manner similar to the deployment of resources and systems described with reference to FIGS. 1 to 14C herein. If an environment comprises a local controller, the main controller 1501 may load the global rules 210 (or a subset thereof) onto the local controller or associated storage in a manner that the global rules (or subset thereof) define the operation of that environment.

The controller 1501 may deploy and configure the resources 1522, 1523, 1524 respectively of environments 1502, 1503, 1504 and/or shared resource 1525 using configuration rules with system rules 210. The controller 1501 may also monitor the environments or configure resources 1522, 1523, 1524 (or shared resource 1525) to allow monitoring of the respective environments 1502, 1503, 1504. Such monitoring may be by way of connections to a separate monitoring console that may be enabled or disabled, or may be through the main controller. The main controller 1501 may be connected to one or more of the environments 1502, 1503, 1504 through in band management connection(s) 270 and/or out of band management connection(s) 260 or SAN connections 280 that may be enabled or disabled at various stages of deployment or management in a manner as described herein with reference to deployment and management of resources in FIGS. 13A-E and 14A. Using enablement and disablement of in band management connections 270 or out of band management connections 260 or SAN connections 280, environments 1502, 1503, 1504 may be deployed in a manner that they may have, at various times, no or limited, or controlled knowledge of or connectivity with respect to each other or of the main system 100 or controller 1501.

The environments may comprise a resource or plurality of resources coupled or interacting with the other resources or to an external network 1580 that connects to an external, outside environment. The environments may be physical or non-physical. Non-physical in this context means that environments share the same physical host(s) but are separated from each other virtually. The environments and systems may be deployed on identical, similar but different, or non-identical hardware. In some examples, the environments 1502, 1503, 1504 may be effective copies of each other; but in other examples the environments 1502, 1503, 1504 may provide different functionality than each other. As an example, a resource of an environment may be a server.

Placing systems and resources in separate environments or sub-systems according to techniques described herein, may allow for isolating applications for security and/or for performance reasons. Separating environments may also mitigate impacts of compromised resources. For example, one environment may contain sensitive data and can be configured with less internet exposure while another environment may host internet-facing applications.

Figure 15B:
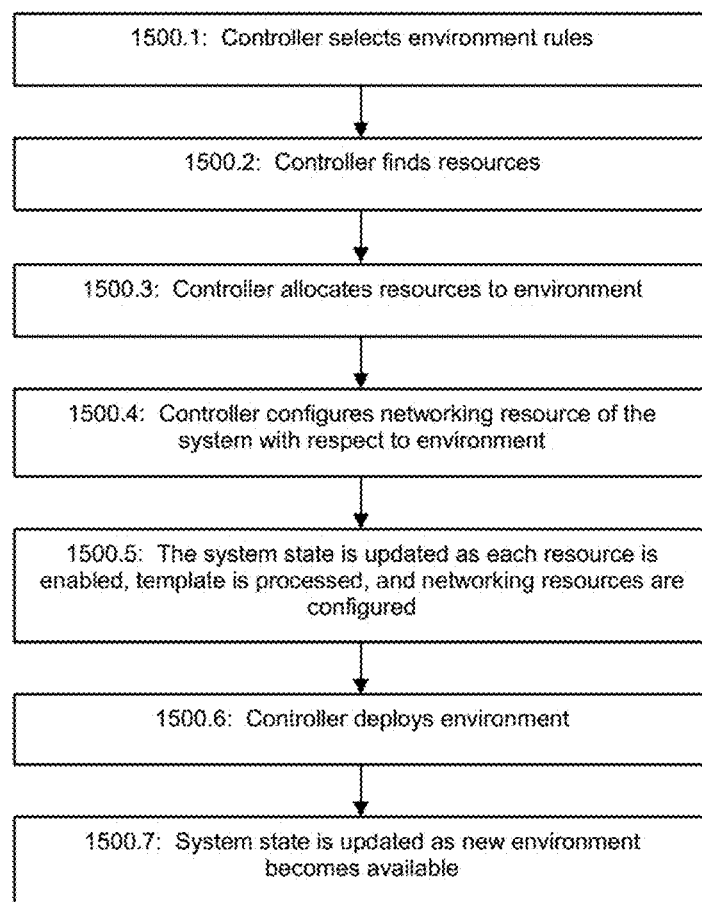
FIG. 15B illustrates an example process flow where a controller sets up an environment.

FIG. 15B illustrates an example process flow where a controller as shown in FIG. 15A sets up an environment. In such an example, the system may be tasked to create and set up a new environment. This may be triggered by a user request or by system rules performed when engaging in a particular task or series of tasks. FIGS. 17A-18B, discussed below, illustrate examples of particular change management tasks or series of tasks where the system creates a new environment. However, there may be a multitude of situations in which a controller may create and set up a new environment.

Thus, with reference to FIG. 15B, in setting up a new environment the controller selects environment rules (step 1500.1). According to the environment rules, using the global system rules 210 and templates 230, the controller finds resources for the environment (step 1500.2). The rules may have a hierarchy of preferred resource selection that it goes through until finds the resources required for the environment. At step 1500.3, the controller allocates the resources found at step 1500.2 to the environment; for example using techniques described in FIG. 3C or 7B. The controller then configures the networking resources of the system with respect to the new environment to ensure compatible and efficient connections between the new environment and other system components (step 1500.4). The system state is updated at step 1500.5 as each resource is enabled and each template is processed. The controller then sets up and enables integration and interoperability of the resources of the environment and powers on any applications to deploy the new environment (step 1500.6). The system state is again updated at step 1500.7 as the environment becomes available.

Figure 15C:
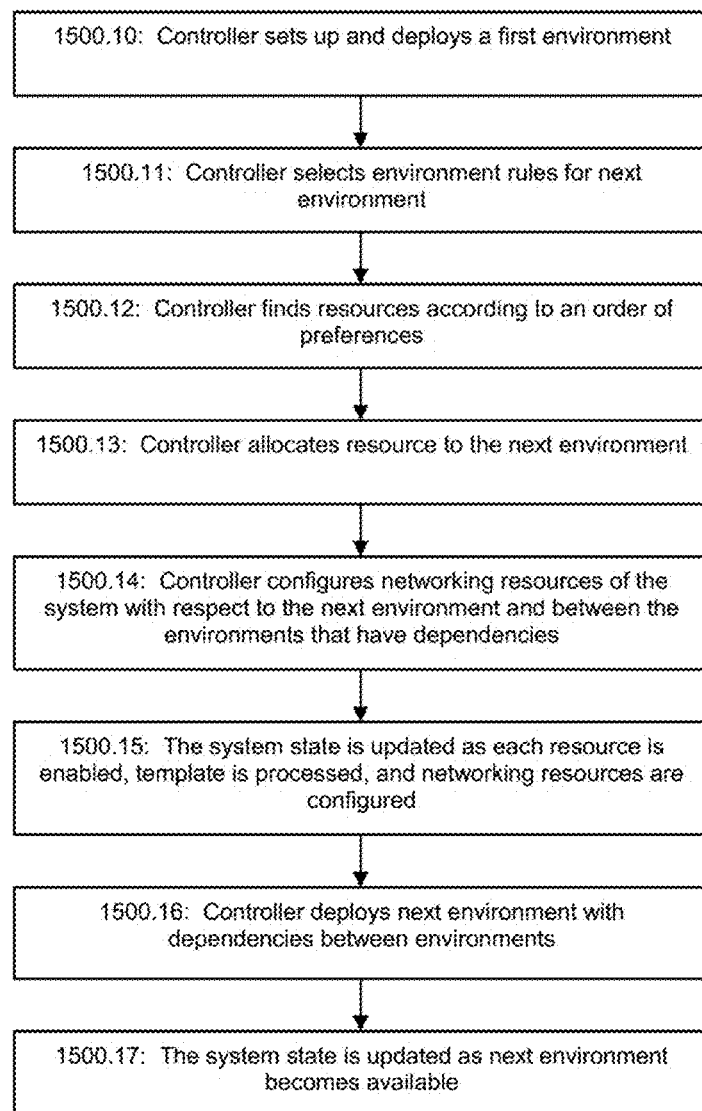
FIG. 15C illustrates an example process flow where a controller sets up multiple environments.

FIG. 15C illustrates an example process flow where a controller as shown in FIG. 15A sets up multiple environments. When setting up multiple environments, the environments may be set up in parallel using the techniques described in FIG. 15B for each environment. However, it should be understood that the environments may be set up in a sequential order or in series as described in FIG. 15C. With reference to FIG. 15C, at step 1500.10, the controller sets up and deploys a first new environment (which can be performed as described with respect to step 1500.1 of FIG. 15B). There may be different environment rules for different types of environments and for how different environments interoperate. At step 1500.11, the controller selects the environment rules for the next environment. At step 1500.12, the controller finds resources according to an order of preferences which can be defined by system rules 210. At step 1500.13, the controller allocates the resources found at step 1500.12 to the next environment. The environments may or may not share resources. At step 1500.14, the controller configures the networking resources of the system with respect to the next environment and between the environments that have dependencies using system rules 210. The system state is updated at step 1500.15 as each resource is enabled, template is processed and networking resources are configured including with dependencies of environments. The controller then sets up and enables integration and interoperability of the resources of the next environment and between environments, and powers on any applications to deploy the new environment (step 1500.16). The system state is updated at step 1500.17 as the next environment becomes available.

Figure 16A:
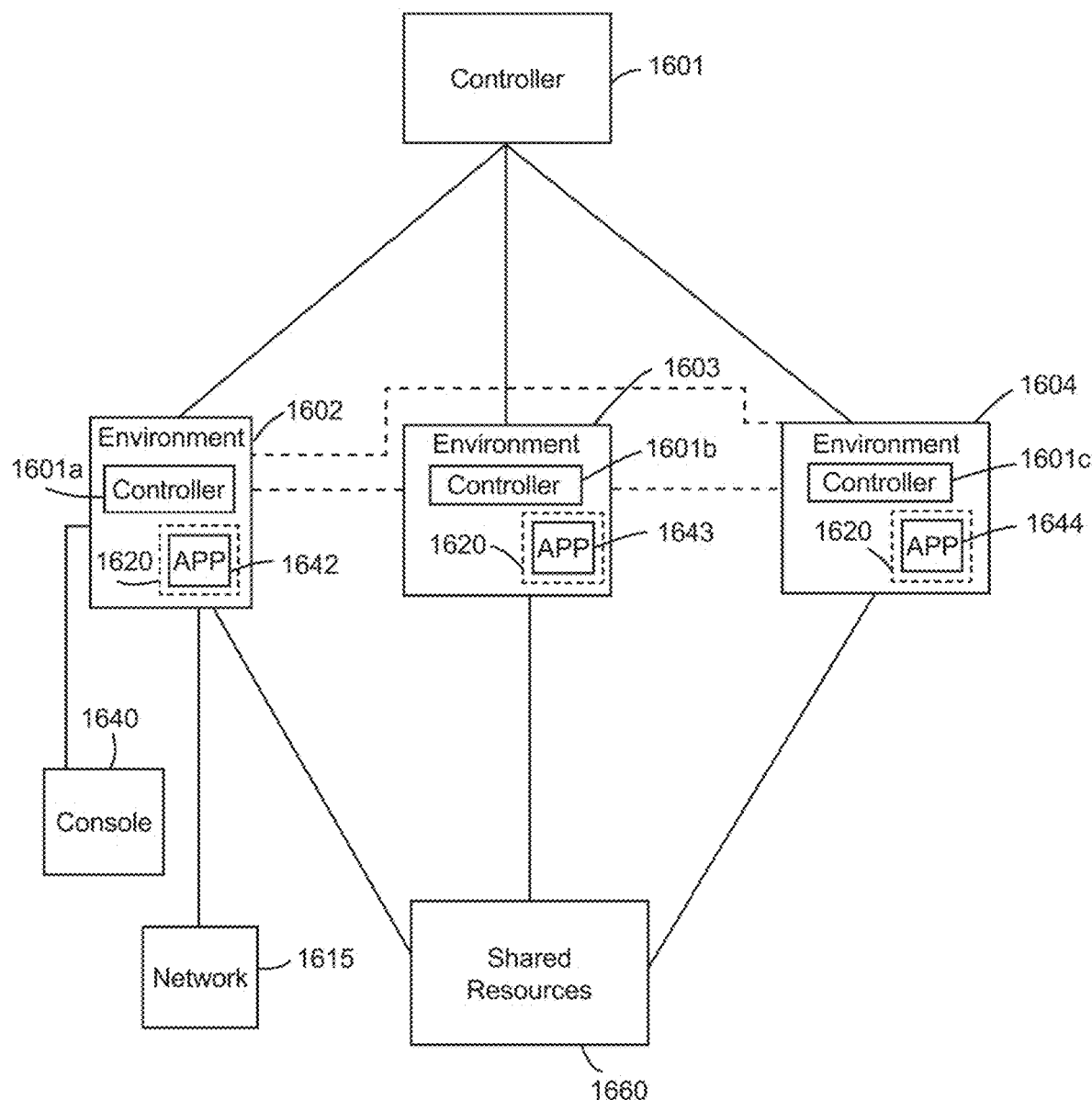
FIG. 16A illustrates an example embodiment where a controller operates as a main controller to set up one or more controllers.

One-Way Communications to Support Monitoring:

FIG. 16A illustrates an example embodiment where a first controller 1601 operates as a main controller to set up one or more controllers such as 1601a, 1601b, and/or 1601b. The main controller 1601 may be used to spawn multiple clouds hosts, systems and/or applications as environments 1602, 1603, 1604 that may or may not depend on each other in their operation using the techniques discussed above with respect to controllers such as controllers 200/1401/1501. As illustrated in FIG. 16A, IT systems, environment, clouds and/or any combination(s) thereof may be spawned as environments 1602, 1603, 1604. Environment 1602 comprises a second controller 1601a, environment 1603 comprises a third controller 1601b, and environment 1604 comprises a fourth controller 1601c. The environments 1602, 1603, 1604 may each also comprise one or more resources 1620, respectively. Resources 1620 may comprise one or more applications 1642, 1643, 1644 that may be running on them. These applications may connect to allocated resources whether or not shared. These or other applications may run on an internet or one or more shared resources in pool 1660 which may also comprise shared applications or an applications network. Applications may provide services for the users or one or more of the environments or clouds. The environments 1602, 1603, 1604 may share resources or a database and/or may comprise or use resources in pool 1660 specifically allocated to a particular environment. Various components of the system including the main controller 1601 and/or one or more environments may also be connectable to an applications network or an external network 1615 such as an internet.

Between any resource, environment or controller, and another resource, environment, controller or external connection, there may be a connection that may be configured to be selectively enabled and/or disabled in a manner as described with respect to FIGS. 13A to 13E herein. For example, any resources, controllers, environments or external connection may be disabled or disconnectable from the controller 1601, environment 1602, environment 1603, and/or environment 1604, resources, or applications, by way of in band management connection 270, out of band management connection 270, or SAN connection 280 or by physical disconnection. As an example, the in-band management connection 270 between the controller 1601 and any of the environments 1602, 1603, 1604 may be disabled in order to protect the controller 1601. As another example, such in band management connection(s) 270 may be selectively disabled or enabled during operation of the environments 1602, 1603, 1604. In addition to security purposes discussed with respect to FIGS. 13A-13E herein, disabling or disconnecting the main controller 1601 from the environments 1602, 1603, 1604 may allow the main controller 1601 to spin environments 1602, 1603, 1604 as clouds that may then be separated from the main controller 1601 or from other clouds or environments. In this sense, the controller 1601 is configured to spawn multiple clouds, hosts or systems.

Using disablement or disconnection elements described herein, a user may be allowed limited access to an environment through the main controller 1601 for particular uses. For example, a developer may be provided access to a development environment. As another example, an administrator of an application may be limited to particular applications or application networks. As another example, logs may visible through a main controller 1601 for collecting data without subjecting itself to being compromised by environments or controllers that it spawns.

After the main controller 1601 sets up environment 1602, the environment 1602 may then be disconnected from the main controller 1601 whereupon environment 1602 may operate independently of main controller 1601 and/or may be selectively monitored and maintained by the main controller 1601 or other application associated with or run by the environment 1602.

An environment such as environment 1602 may be coupled to a user interface or console 1640 that allows access to the environment 1602 by a purchaser or user. The environment 1602 may host the user console as an application. The environment 1602 may be remotely accessed by the user. Each environment 1602, 1603, 1604 may be accessed by a common or separate user interface or console.

Figure 16B:
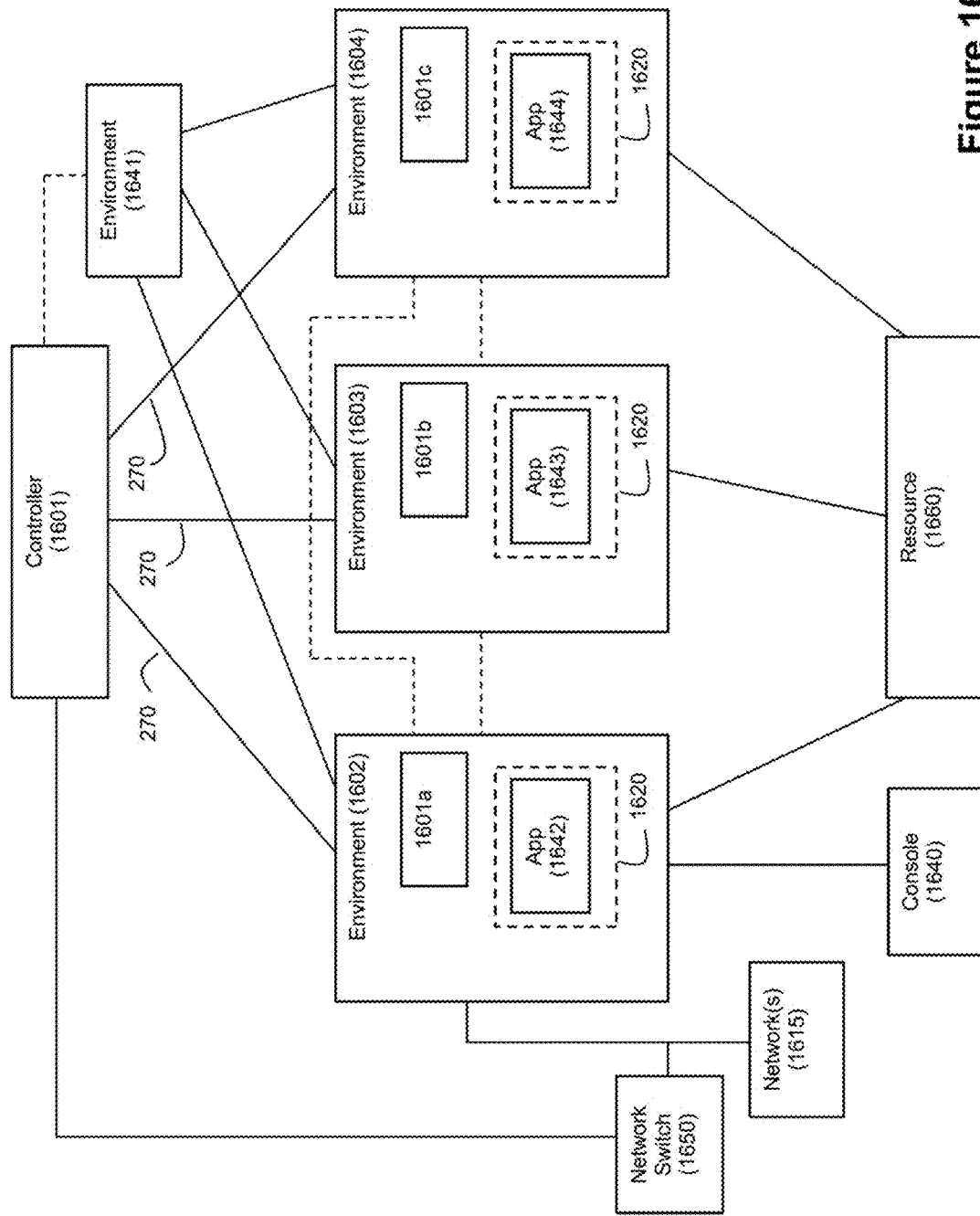
FIGS. 16B-D show an example system where environments may be configured to write to another environment.

FIG. 16B shows an example system where environments 1602, 1603, 1604 may be configured to write to another environment 1641 where logs may be viewed for example using a console (which can be any console that can connect with environment 1641 either directly or indirectly). In this fashion, environment 1641 can function as a log server to which one or more of environments 1602, 1603, 1604 write events. Main controller 1601 can then access the log server 1641 to monitor events on the environments 1602, 1603, 1604 without maintaining a direct connection with such environments 1602, 1603, 1604 as discussed below. Environment 1641 may also be selectively disconnected from the main controller 1601 and may be configured to read only from the other environments 1602, 1603, 1604.

Figure 16C:
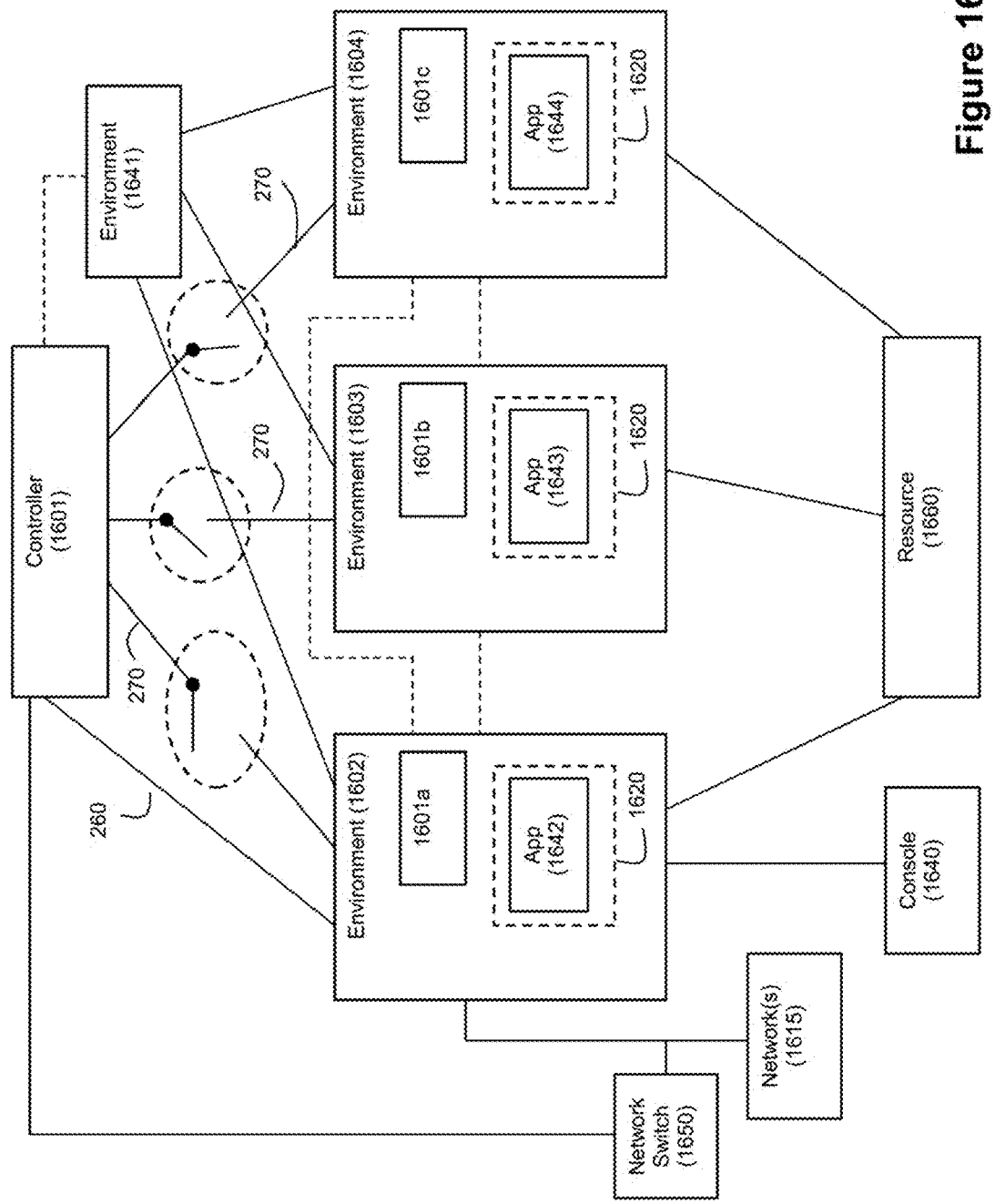
Figure 16D:
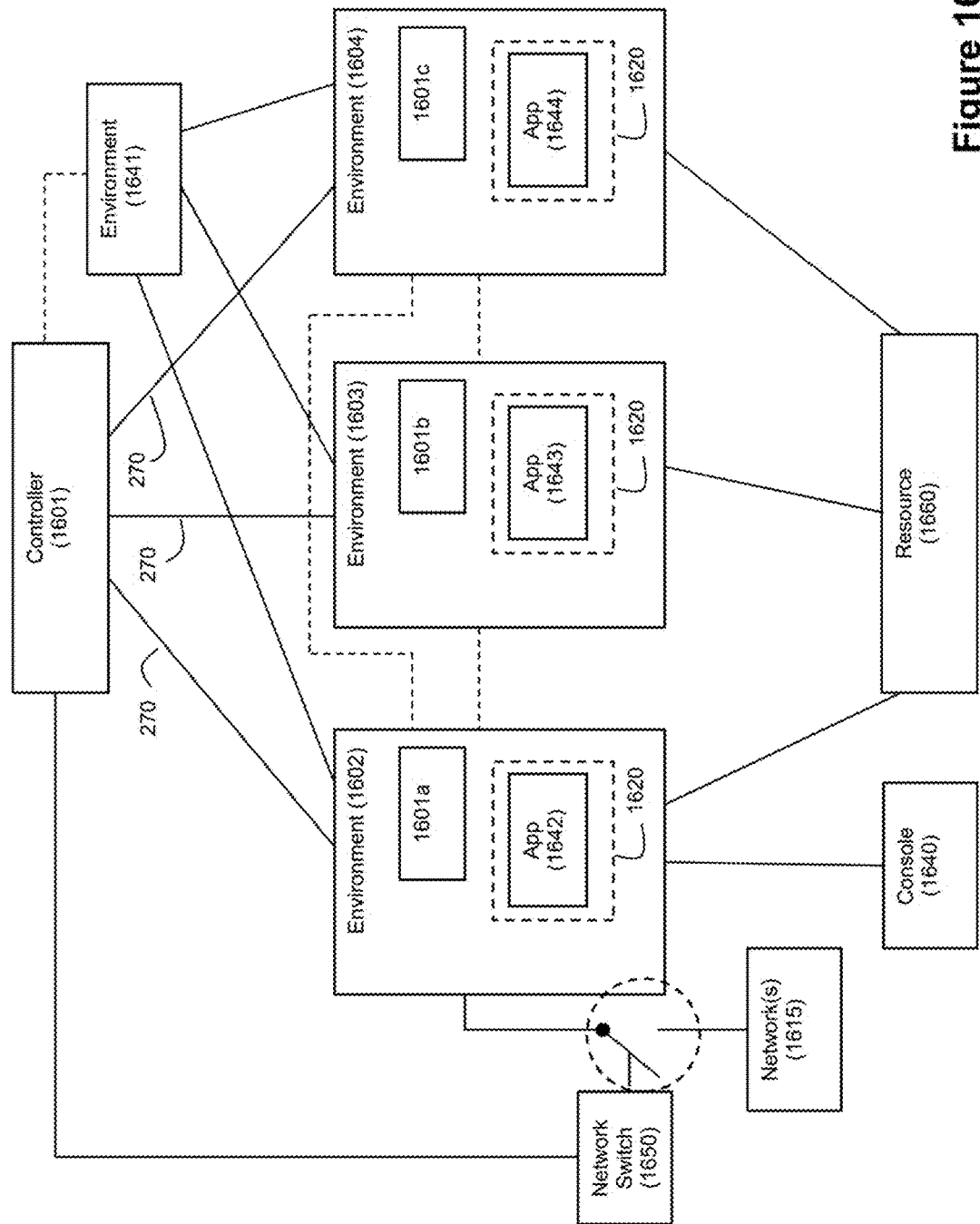

The main controller 1601 may be configured to monitor some or all of its environments 1602, 1603, 1604 even if the main controller 1601 is disconnected from any of it environments 1602, 1603, 1604 as shown by FIG. 16C. FIG. 16C shows that the in band management connections 270 between main controller 1601 and environments 1602, 1603, 1604 has been disconnected which can help protect the main controller 1601 in the event an environment 1602, 1603, 1604 is compromised. As shown by FIG. 16C, an out of band connection 260 could still be maintained between main controller 1601 and an environment such as 1602 even if the in band connection 270 between the main controller 1601 and environment 1602 have been disconnected. Also, environment 1641 may have a connection to the main controller 1601 that may be selectively enabled or disabled. The main controller 1601 may set up monitoring as a separate application within environment 1641 that is isolated or air-gapped from the environments 1602, 1603, 1604. The main controller 1601 may use one-way communication for monitoring. For example, logs may be provided through a one-way communication from the environments 1602, 1603, 1604 to environment 1641. Through such a one-way write and via the connection between environment 1641 and main controller 1601, the main controller 1601 can gather data and monitor the environments 1602, 1603, 1604 by way of environment 1641 even though there is no in band connection 270 between main controller 1601 and environments 1602, 1603, 1604, thereby mitigating the risk of an environment 1602, 1603, 1604 compromising the main controller 1601. The access may be filtered or controlled and/or access may be independent of the internet. For example, as shown by FIG. 16D, if the in band connection 270 between main controller 1601 and environment 1602 is connected, then the main controller 1601 can control a network switch 1650 to disconnect environment 1602 from an external network 1615 such as the Internet. The disconnection of environment 1602 from external network 1615 when environment 1602 is connected by an in band connection 270 with main controller 1601 can provide enhanced security for the main controller 1601.

Accordingly, it should be understood that the example embodiment of FIGS. 16B-16D show how the main controller can safely monitor environments 1602, 1603, 1604 while minimizing exposure to those environments 1602, 1603, 1604. Thus, the main controller 1601 can disconnect itself (or at least disconnect itself from an in band link) from environments 1602, 1603, 1604 while still maintaining a mechanism to monitor them via the log server of environment 1641 to which the environments 1602, 1603, 1604 can have one-way write privileges. Accordingly, if in the course of reviewing the logs of environment 1641, the main controller 1601 discovers that environment 1602 may be compromised by malware, then the main controller 1601 can use SDN tools to isolate that environment 1602 so that only out of band connections 260 are present (e.g., see FIG. 16C). Furthermore, the controller 1601 can send notifications to an administrator for environment 1602 about the possible problem. The controller can also isolate the compromised environment 1602 by selectively disabling any connections (e.g., an in band management connection 270) between compromised environment and any of the other environments 1603, 1604. In another example, the main controller 1601 may discover through the logs that a resource within environment 1603 is running too hot. This may cause the main controller to intervene and migrate applications or services from environment 1603 to a different environment (whether it be a pre-existing environment or a newly spawned environment).

Figure 16E:
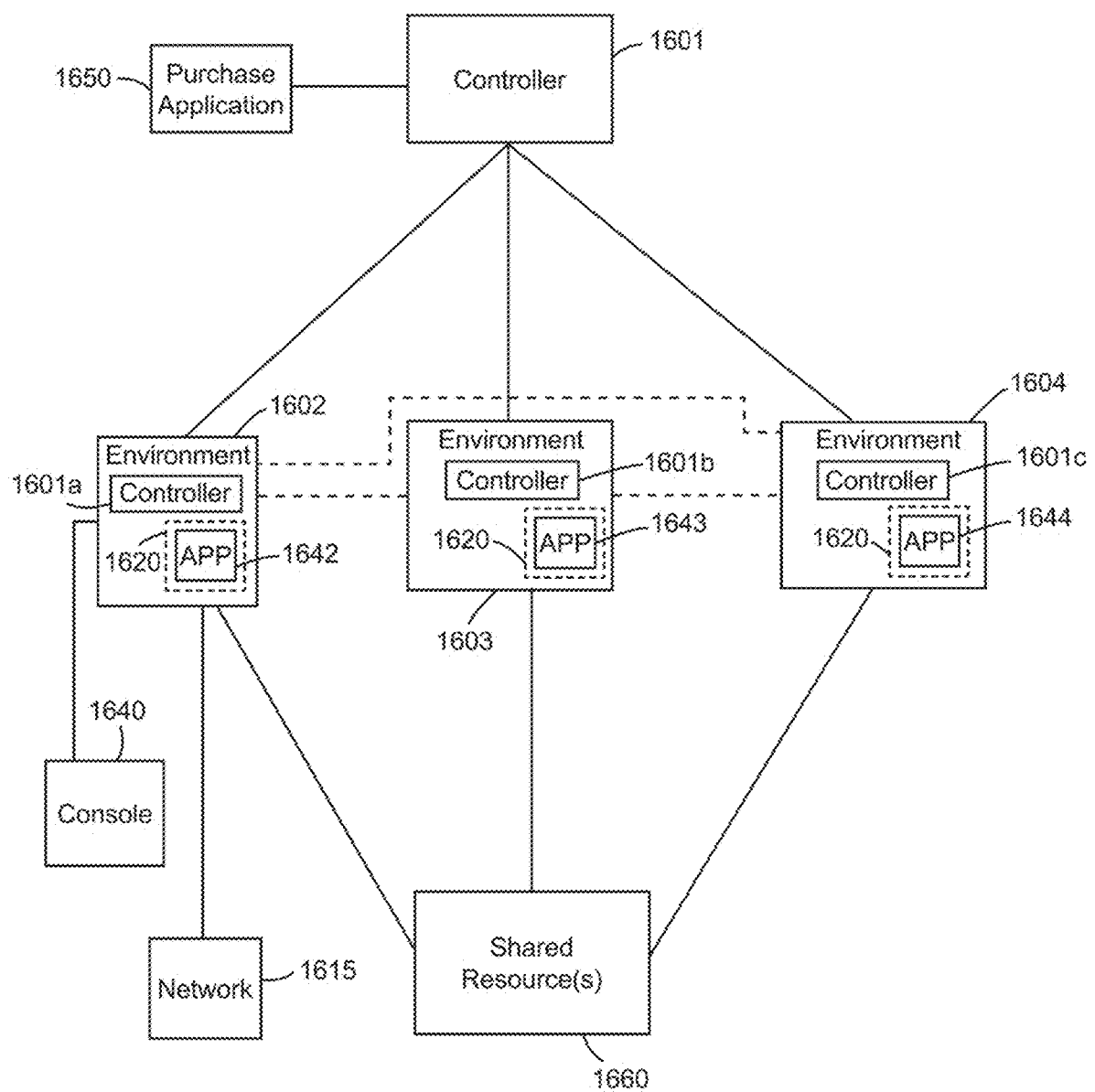
FIG. 16E shows an example system a user can purchase a new environment to be spawned by a controller.

The controller 1601 may also set up a similar system or systems according to a purchaser or user request. As shown in FIG. 16E, a purchase application 1650 may be provided, for example on a console or otherwise, which allows a purchaser to purchase or request a cloud, host, system environment or application be set up for the purchaser. The purchase application 1650 may instruct the controller 1601 to set up an environment 1602. The environment 1602 may comprise a controller 1601a that will deploy or build the IT system, for example, by allocating or assigning resources to the environment 1602.

Figure 16F:
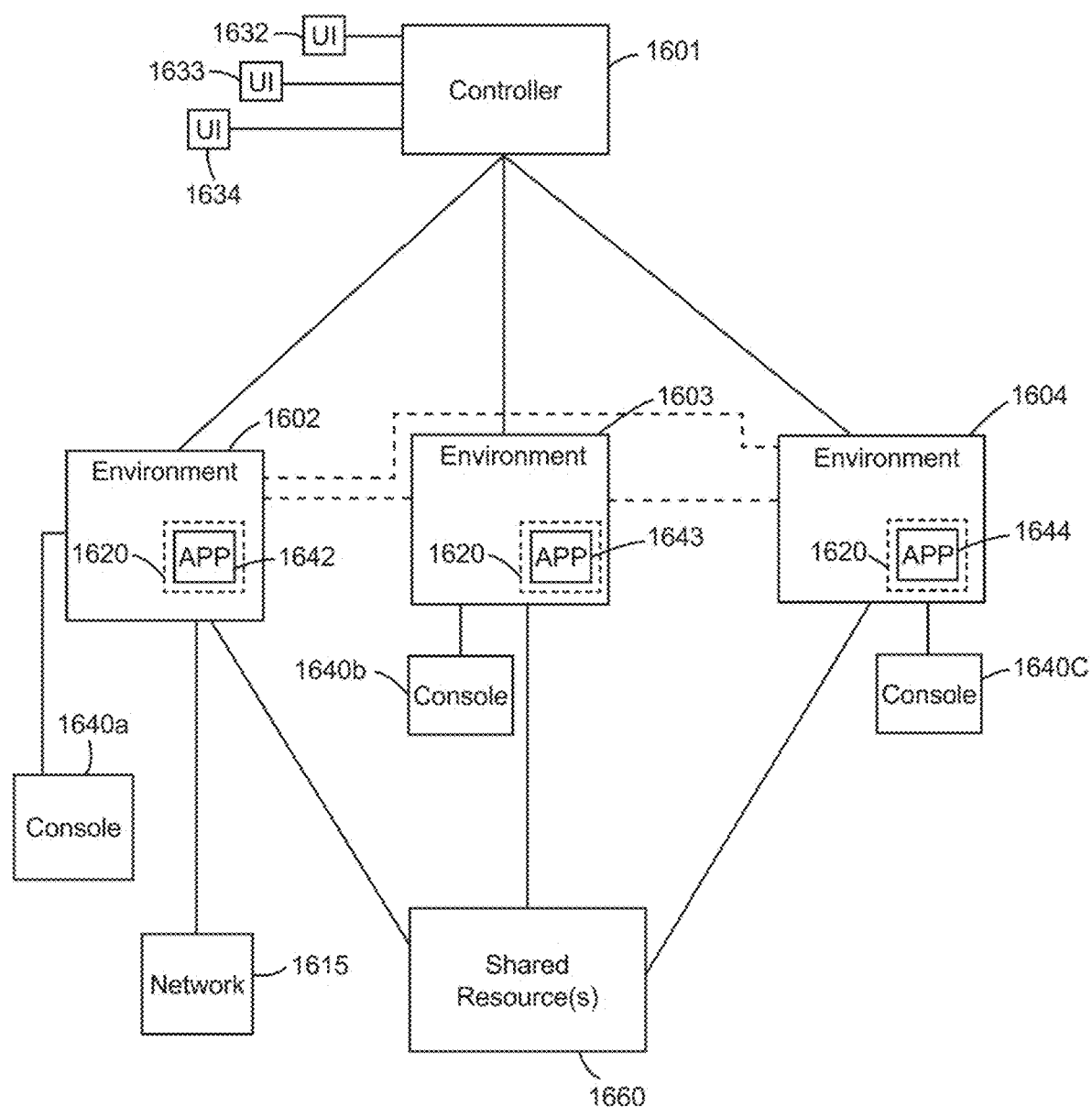
FIG. 16F illustrates an example system where user interfaces are provided for interfacing into environments spawned by a controller.

FIG. 16F illustrates user interfaces 1632, 1633, 1634 that may be used where environments 1602, 1603, 1604 are each operating as a cloud and may or may not comprise a controller. User interfaces 1632, 1633, 1634 (which respectively correspond to environments 1602, 1603, 1604) may each connect through main controller 1601 which manages the connections of the user interfaces with the environments. Alternatively, or in addition, interface 1640a (which may take the form of a console) may be directly coupled to environment 1602, interface 1640b (which may take the form of a console) may be directly coupled to environment 1603 and interface 1640c (which may take the form of a console) may be directly coupled to environment 1604. Whether connections with the main controller 1601 are separated, disconnected or disabled or not, a user may use one or more of the interfaces to use the environment or cloud.

Cloning and Backing Up Systems for Change Management Support:

Some of the environments 1602, 1603, 1604 may be clones of typical setups software that developers use. They may also be clones of current working environments as a method to scale; for instance cloning an environment in another datacenter in a different location to reduce latency due to location.

Accordingly, it should be understood that the main controller setting up systems and resources in separate environments or sub-systems may allow cloning or backing up portions of an IT system. This may be used in testing and change management as described herein. Such changes may include but are not limited to changes to code, configuration rules, security patches, templates and/or other changes.

According to example embodiments, an IT system or controller as described herein may be configured to clone one or more environments. A new or cloned environment may or may not comprise the same resources as the original environment. For example, it may be desirable or necessary to use an entirely different combination of resources physical and/or virtual in a new or nearly cloned environment. It may be desirable to clone environments to different locations or time zones where optimization of use may be managed. It may be desirable to clone an environment to a virtual environment. In cloning an environment, global system rules 210 and global templates 230 of a controller or main controller may comprise information on how to configure and/or run various types of hardware. Configuration rules within system rules 210 may dictate arrangement and use of the resources so that the resources and applications are more optimal given the particular available resources.

The main controller structure provides its ability to set up systems and resources in separate environments or sub-systems, provides structure for cloning environments, provides structure for creating development environments, and/or provides structure for deploying a standardized set of applications and/or resources. Such applications or resources may include, for example, including but not limited to those that can be used for developing and/or running an application or backing up portions or restoring from the backups of an IT system and other disaster recovery applications (e.g. a LAMP (apache, mysql, php) stack, a system containing servers running a web frontend and react/redux, and resources running node.js, and a mongo database and other standardized "stacks"). Sometimes the main controller may deploy environments that are clones of another environment, and it may derive configuration rules from the subset of the configuration rules that were used to create the original environment.

According to example embodiments, change management of systems or subsets of systems may be accomplished by cloning one or more environments and the configuration rules or subsets of configuration rules of such environments. Changes may be desired, for example, to make changes to code, configuration rules, security patches, templates, hardware changes, adding/removing components and dependent applications and other changes.

According to example embodiments, such changes to a system may be automated to avoid errors of direct manual input of changes. Changes may be tested by a user in a development environment before automatically implementing the changes to a live system. According to example embodiments, a live production environment may be cloned by using a controller to automatically power on, provision, and/or configure an environment that is configured using the same configuration rules as the production environment. The cloned environment can be run and worked up (whereas a backup environment can preferably be left to remain as a contingency in the event there is a need to roll back a change. This may be done using the controller to create, configure and/or provision new systems, or environments as described with reference to FIGS. 1 to 16F above using system rules 210, templates 230 and/or system state 220. A new environment may be used as a development environment to test changes to be later implemented in a production environment. The controller may generate the infrastructure of such environment from a software defined structure into a development environment.

A production environment as defined herein means an environment that is being used for to operate a system as opposed to an environment solely for development and testing, i.e., a development environment.

When a production environment is cloned, the infrastructure or a cloned development environment is configured and generated by the controller according to global system rules 210 as was the production environment. Changes in the development environment may be made to the code, to the templates 230 (either changing existing templates or changes relating to the creation of new templates), to security, and/or to applications or to infrastructure configuration. When the new changes implemented in the development environment are ready as desired through development and/or testing, the system automatically makes changes to the development environment that will then go live or be deployed as a production environment. New system rules 210 are then uploaded to either the controller of the environment and/or to the main controller which will apply the system rule changes for the particular environment. System state 220 is updated in the controllers and additional or revised templates 230 may be implemented. Accordingly, full system knowledge of infrastructure may be maintained by the development environment and/or main controller along with ability to re-create it. Full system knowledge as used herein may include but is not limited to system knowledge of the state of the resources, resource availability, and configuration of systems. Full system knowledge may be gathered by a controller from system rules 210, system state 220 and/or using in-band management connection(s) 270, out of band management connection(s) 260 and/or SAN connection(s) 280 to query resources. Resources can be queried among other things to determine resource, network or application utilization, configuration state or availability.

The cloned infrastructure or environment may be software defined via system rules 210; although this need not be the case. The cloned infrastructure or environment generally may or may not comprise a front end or user interface, and one or more allocated resources that may or may not include compute, networking, storage and/or applications networking resources. The environment may or may not be arranged as a front end, middleware and a database. Services or the development environment may be booted with the system rules 210 of the production environment. The infrastructure or environment that is allocated for use by a controller may be software defined, particularly for purposes of cloning. Accordingly, the environment can be deployable by system rules 210 and cloneable by similar means. The cloned or development environment may be automatically set up by a local or main controller using system rules 210, prior to or when changes are desired.

The data of the production environment may be written into a read only data storage until the development environment is isolated from the production environment, whereupon it will be used by the development environment in the development and testing process.

The user or client may make and test changes in the development environment while the production environment is online. The data in the data storage may change while development and changes are being tested in the development environment. With a volatile or writeable system, hot synching of the data with that of the production environment may also be used after the development environment is set up or deployed. Desired changes to systems, applications, and/or environments may be made to and tested in the development environment. Desired changes are then made to the scripts of the system rules 210 to create a new version for the environment or for the entire system and main controller.

According to another example embodiment, a newly developed environment may be then implemented automatically as a new production environment while the previous production environment is maintained or fully functional so the reversion to the earlier state production environment is possible without losing significant amounts of data. The development environment is then booted with the new configuration rules within the system rules 210, and the database is synched with the production database and switched to be a writeable database. The original production database may then be switched to be a read only database. The previous production environment remains intact as a copy of the previous production environment for a desired period of time in the event it is desirable to revert back to the previous production environment.

The environment may be configured as a single server or instance that may include or contain physical and/or virtual hosts, networks, and other resources. In another example embodiment, the environment may be a plurality of servers containing physical and/or virtual hosts, networks, and other resources. For example, there may be a plurality of servers forming a load-balanced internet-facing application; and those servers may connect to a plurality of API/middleware applications (that may be hosted on one or a plurality of servers). A database of an environment may comprise one or more databases with which the API communicates queries in the environment. The environment may be built from system rules 210 in a form that is static or volatile. The environments or instances may be virtual or physical or a combination of each.

An application's configuration rules or a system's configuration rules within system rules 210 may specify various compute backends (for example, baremetal, AMD epyc server, Intel Haswell on qemu/kvm) and may include rules on how to run the application or service on the new compute backend. Accordingly, applications may be virtualized if, for example, there is a situation with reduced availability of resources for testing.

Using and according to examples described herein, a test environment may be deployed on virtual resources where an original environment uses physical resources. Using a controller as described herein with reference to FIGS. 1 to 18B, and as further described herein, a system or environment may be cloned from a physical environment to an environment that may or may not comprise virtual resources in whole or in part.

Figure 17A:
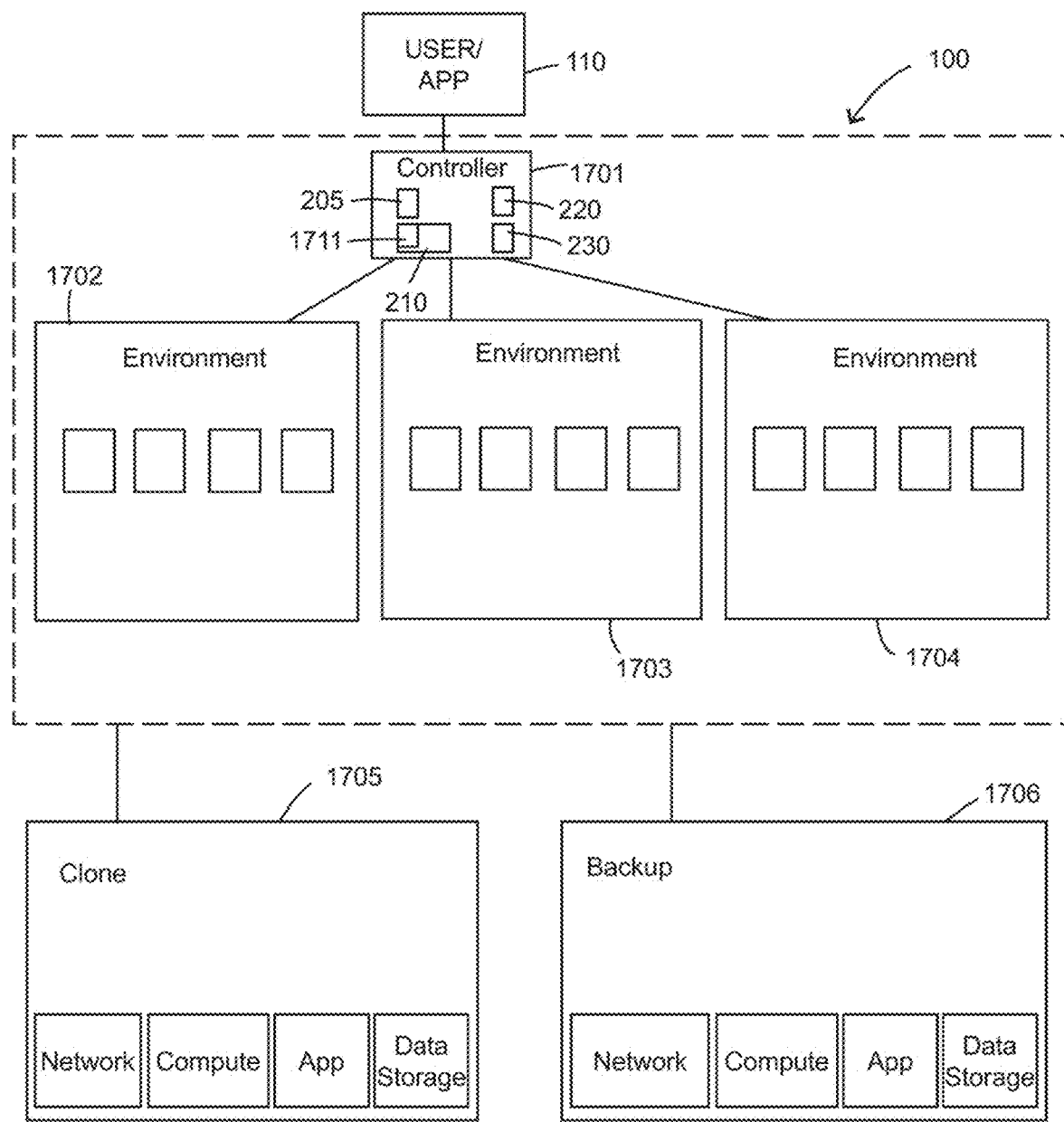
FIGS. 17A-18B illustrate examples of change management tasks with respect to new environments.

FIG. 17A illustrates an example embodiment where a system 100 comprises a controller 1701 and one or more environments, e.g., 1702, 1703, 1704. The system 100 may be a static system, i.e., one in which active user data is not constantly changing the state of the system or manipulating data on a frequent basis; for example, a system only hosting static web pages. The system may be coupled to a user (or application) interface 110.

The controller 1701 can be configured in a similar manner as controllers 200/1401/1501/1601 described herein, and may similarly include global system rules 210, controller logic 205, templates 230 and system state elements 220. The controller 1701, may be coupled to one or more other controllers or environments in a manner as described with reference to FIGS. 14A-16F herein. The global rules 210 of the controller 1701 may include rules that may manage and control other controllers and/or environments. Such global rules 210, controller logic 205, system state 220 and templates 230 may be used to set up, provision and deploy systems or environments through controller 1701 in a manner similar to that described with reference to FIGS. 1 to 16F herein. Each environment may be configured using a subset of the global system rules 210 that define the operation of the environment including with respect to the other environments.

The global system rules 210 may also comprise change management rules 1711. Change management rules 1711 comprise a set of rules and/or instructions that may be used when changes to the system 100, global system rules 210, and/or controller logic 205 may be desired. The change management rules 1711 may be configured to allow a user or developer to develop changes, test changes in a test environment, and then implement the changes by automatically converting the changes into a new set of configuration rules within the system rules 210. The change management rules 1711 may be a subset of the global system rules 210 (as shown by FIG. 17A) or they may be separate from the global system rules 210. The change management rules may use a subset of the global system rules 210. For example, the global system rules 210 may comprise a subset of environment creation rules that are configured to create a new environment. The change management rules 1711 may be configured to set up and use systems or environments configured and set up by the controller 1701 to copy and clone some or all aspects of the system 100. The change management rules 1711 may be configured to permit testing of proposed new changes to the system prior to implementing by using a clone of a system for testing and implementation.

A clone 1705 as shown by FIG. 17A may comprise rules, logic, applications and or resources of particular environment or a portion of the system 100. The clone 1705 may comprise similar or dissimilar hardware as system 100 and may or may not use virtual resources. The clone 1705 may be set up as an application. The clone 1705 may be set up and configured using configuration rules within the system rules 210 of the system 100 or controller 1701. The clone 1705 may or may not comprise a controller. The clone 1705 may comprise allocated networking, compute resources, applications networks and/or data storage resources as described in more detail above. Such resources may be allocated using change management rules 1711 as controlled by the controller 1701. The clone 1705 may be coupled to a user interface that allows changes to be made to the clone 1705 by a user. The user interface may be the same or different from the user interface 110 of the system 100. The clone 1705 may be used for the entire system 100 or for a portion of the system 100 such as one or more environments and/or the controller. The clone 1705 may or may not be a complete copy of the system 100. The clone 1705 may be coupled to the system 100 by way of an in-band management connection 270, an out of band management connection 260 and/or a SAN connection 280 that may be selectively enabled and/or disabled fully, and/or converted to a single direction read and/or write connection. Accordingly, the connection to data in the cloned environment 1705 may be changed to make the clone data read only when the cloned environment 1705 is isolated from the production environment during testing or until the cloned environment 1705 is ready to go online as a new production environment. For example, if clone 1705 has a data connection to environment 1702, this data connection can be made read-only for isolation purposes.

An optional back-up 1706 may or may not be used for the entire system or for a portion of the system such as one or more environments and/or the controller. The back-up 1706 may comprise networking, compute, applications networks and/or data storage resources as described in more detail above. The back-up 1706 may or may not comprise a controller. The back up 1706 may be a complete copy of the system 100. The back up 1706 may be set up as an application or using similar or dissimilar hardware than the system 100. The back up 1706 may be coupled to the system 100 by way of an in band management connection 270, an out of band management connection 260 and/or a SAN connection 280 that may be selectively enabled and/or disabled fully, and/or converted to a single direction read and/or write connection.

Figure 17B:
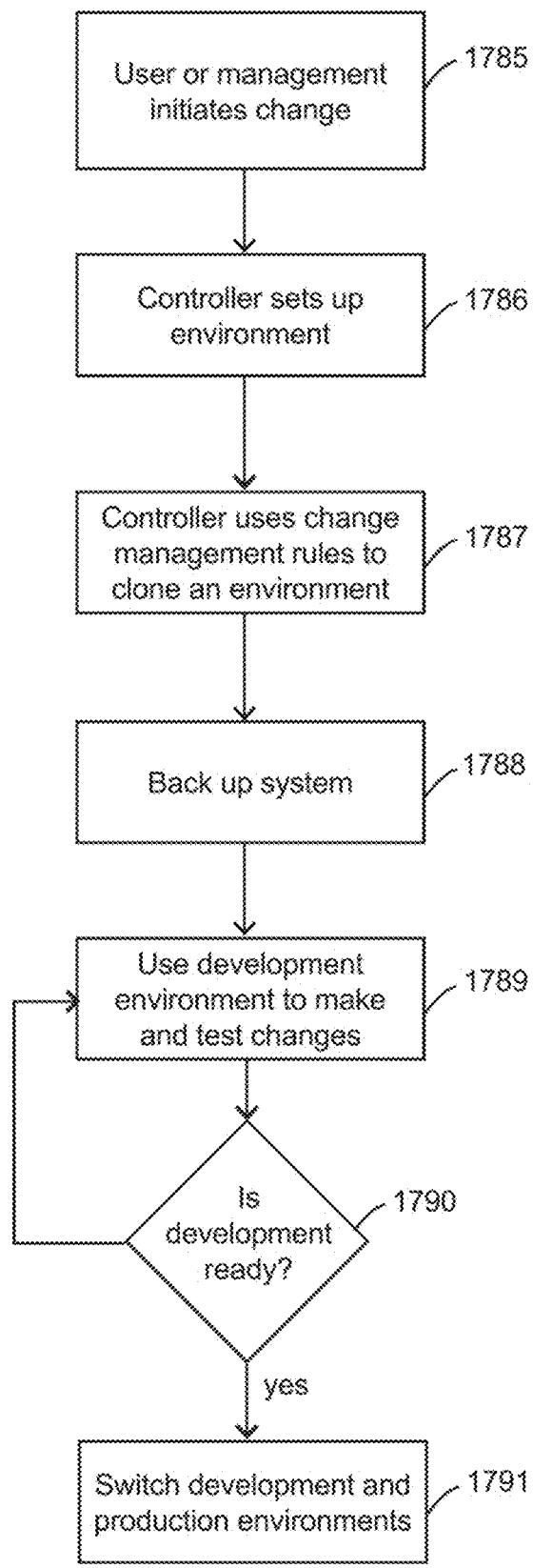

FIG. 17B illustrates an example process flow for use of the clone and back-up system of FIG. 17A in system change management. At step 1785, a user or management application initiates a change to the system. Such changes may include but are not limited to changes to code, configuration rules, security patches, templates, hardware changes, adding/removing components and/or dependent applications and other changes. At step 1786, the controller 1701 sets up an environment in a manner described with respect to FIGS. 14A-16F to become the cloned environment 1705 (where cloned environment may have its own new controller or it may use the same controller for the original environment).

At step 1787, the controller 1701 can use the global rules 210 including change management rules 1711 to clone all or part of an environment or environments of the system (e.g., a "production environment") to the cloned environment 1705 (e.g., where the cloned environment 1705 can serve as the "development environment"). As such the controller 1701 identifies and allocates resources, uses system rules 210 to set up and allocate the clone resources and copies any of the following from the environment to the clone: data, configurations, code, executables and other information needed to power the application. At step 1788, the controller 1701 optionally backs up the system by setting up another environment to serve as backup 1706 (with or without a controller) using configuration rules within the system rules 210 and copies the templates 230, controller logic 205 and global rules 210.

After the clone 1705 is made of the production environment, the clone 1705 may be used as a development environment where changes can be made to the clone's code, configuration rules, security patches, templates and other changes. At step 1789, the changes to the development environment may be tested before implementation. During the testing, the clone 1706 can be isolated from the production environment (system 100) or the other components of the system. This can be achieved by having the controller 1701 selectively disable the one or more of the connections between system 100 and clone 1706 (for example, by disabling the in band management connection 270 and/or disabling an applications network connection). At step 1790, a determination is made as to whether the changed development environment is ready.). If step 1709 results in a determination that the development environment is not yet ready (which is a decision that would typically be made by a developer), then the process flow returns to step 1789 for further changes to the clone environment 1705. If step 1790 results in a determination that the development environment is ready, then the development and production environments can be switched at step 1791. That is, the controller turns the development environment 1705 into the new production environment and the former production environment may remain until transition to the development/new production environment is complete and satisfactory.

Figure 18A:
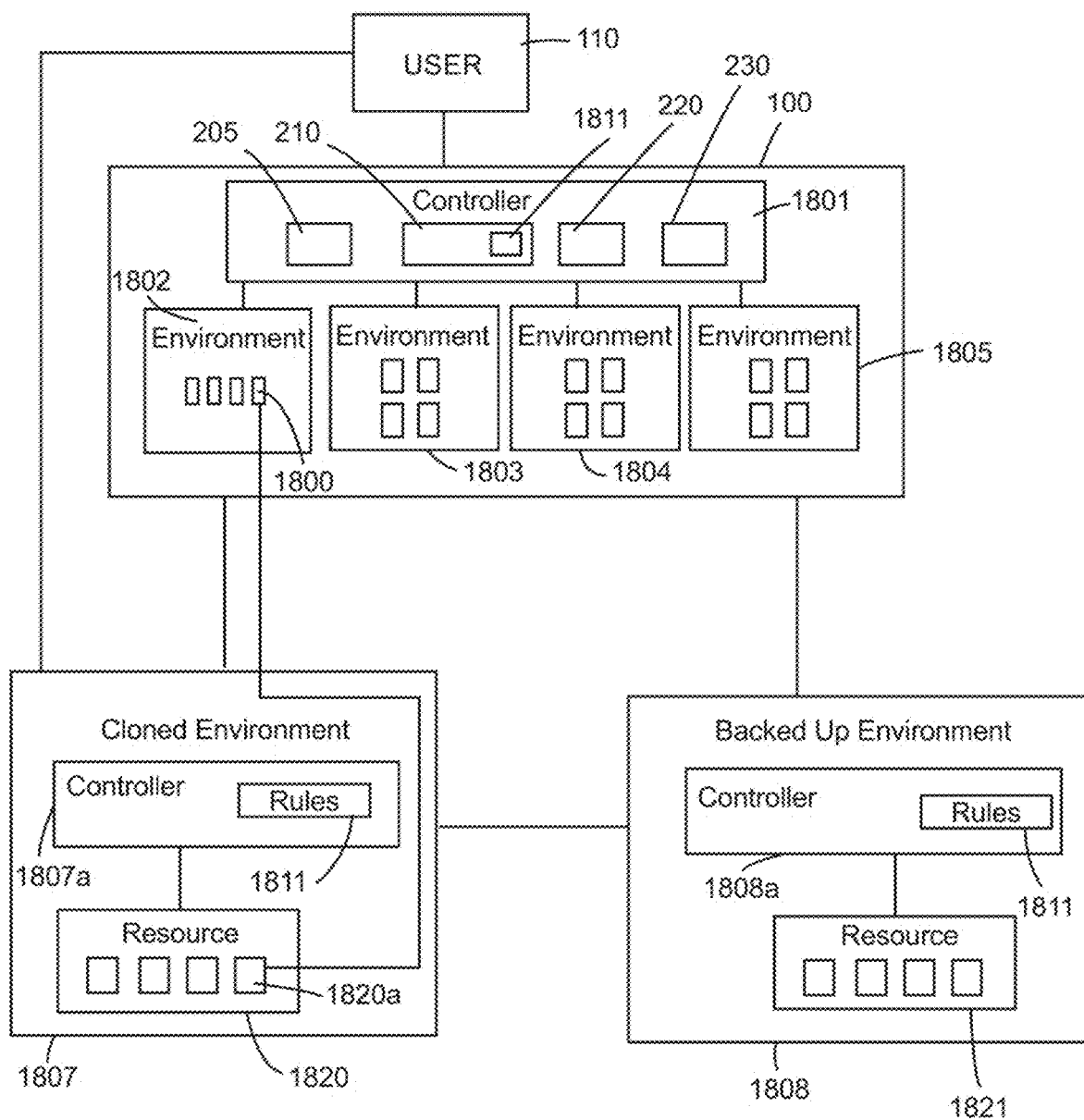

FIG. 18A illustrates another example embodiment of a system 100 that may be set up and used in change management of systems. In the example of FIG. 18A, the system 100 comprises a controller 1801 and one or more environments 1802, 1803, 1804, 1805. The system is shown with a cloned environment 1807 and a back-up system 1808.

The controller 1801 is configured in a similar manner as controllers 200/1401/1501/1601/1701 described herein, and may include global system rules 210, controller logic 205, templates 230 and system state 220 elements. The controller 1801, may be coupled to one or more other controllers or environments in a manner as described with reference to FIGS. 14A-16F herein. The global rules 210 of the controller 1801 may include rules that may manage and control other controllers and/or environments. Such global rules 210, controller logic 205, system state 220 and templates 230 may be used to set up, provision and deploy systems or environments through controller 1801 in a manner similar to that described with reference to FIGS. 1 to 17B herein. Each environment may be configured using a subset of the global rules 210 that define the operation of the environment including with respect to the other environments.

The global rules 210 may also comprise change management rules 1811. Change management rules 1811 may comprise a set of rules and/or instructions that may be used when a change to the system, global rules, and/or logic may be desired. The change management rules may be configured to allow a user or developer to develop changes, test changes in a test environment, and then implement the changes by automatically converting the changes into a new set of configuration rules within system rules 210. The change management rules 1711 may be a subset of the global system rules 210 (as shown by FIG. 18A) or they may be separate from the global system rules 210. The change management rules 1711 may use a subset of the global system rules 210. For example, the global system rules 210 may comprise a subset of environment creation rules that are configured to create a new environment. The change management rules 1811 may be configured to set up and use systems or environments set up and deployed by the controller 1801 to copy and clone some or all aspects of the system 100. The change management rules 1811 may be configured to permit testing of proposed new changes to the system prior to implementing by using a clone of a system for testing and implementation.

The cloned environment 1807 as shown by FIG. 18A may comprise a controller 1807a having rules, controller logic, templates, system state data, and allocated resources 1820 that may be allocated into one or more environments and set up according to the global system rules 210 and change management rules 1811 of the controller 1801. The back-up system 1808 also comprises a controller 1808a having rules, controller logic, templates, system state data, and allocated resources 1821 that may be allocated into one or more environments and set up according to the global system rules 210 and change management rules 1811 of the controller 1801. The system may be coupled to a user (or application) interface 110 or another user interface.

The cloned environment 1807 may comprise rules, logic, templates, system state, applications and/or resources of particular environment or a portion of the system. A clone 1807 may comprise similar or dissimilar hardware as the system 100, and the clone 1807 may or may not use virtual resources. The clone 1807 may be set up as an application. The clone 1807 may be set up and configured using configuration rules within system rules 210 of the system 100 or controller 1801 for the environment. The clone 1807 may or may not comprise a controller. and it may share a controller with the production environment. The clone 1807 may comprise allocated networking, compute resources, applications networks and/or data storage resources as described in more detail above. Such resources may be allocated using change management rules 1811 as controlled by the controller 1801. The clone 1807 may be coupled to a user interface that allows changes to be made to the clone 1807 by a user. The user interface may be the same or different from the user interface 110 of the system 100.

The clone 1807 may be used for the entire system or for a portion of the system such as one or more environments and/or the controller. In an example embodiment, the clone 1807 may include a hot standby data resource 1820a that is coupled to a data resource 1820 of the environment 1802. The hot standby data resource 1820a may be used when setting up the clone 1807 and in testing of changes. The hot standby data resource 1820a may be selectively disconnectable or isolated from the storage resource 1820 during change management, for example, as described herein with respect to FIG. 18B. The clone 1807 may or may not be a complete copy of the system 100. The clone 1807 may be coupled to the system 100 by way of an in-band management connection 270, an out of band management connection 260 and/or a SAN connection 280 that may be selectively enabled and/or disabled fully, and/or converted to a single direction read and/or write connection. Accordingly, the connection to the volatile data in the cloned environment 1807 may be changed to make the clone data read-only when the cloned environment 1807 is isolated from the production environment during testing or until the cloned environment is ready to go online as a new production environment.

When switching an old production environment to a new production environment, the controller 1801 may instruct a front end, a load balancer or other application or resource to point to the new production environment. Accordingly, users, applications resources and/or other connections may be redirected when the change is to occur. This may be accomplished for example, with methods, including but not limited to, changing the list of ip/ipoib addresses, infiniband GUIDs, dns servers, infiniband partitions/opensm configuration, or changing software-defined networking (SDN) configurations which may be accomplished by sending instructions to networking resources. A front end, load balancer or other application and/or resource may point to systems, environments, and/or other applications including but not limited to databases, middleware, and/or other backends. As such a load balancer may be used in change management to switch from an old production environment to the new environment.

The clone 1807 and back-up 1808 may be set up and used in managing aspects of change to a system. Such changes may include but are not limited to: changes to code, configuration rules, security patches, templates, hardware changes, adding/removing components and/or dependent applications and other changes. The back-up 1808 may be used for the entire system or for a portion of the system such as one or more environments and/or the controller 1801. The back-up 1808 may comprise networking, compute resources, applications networks and/or data storage resources as described in more detail above. The back-up 1808 may or may not comprise a controller. The back-up 1808 may be a complete copy of the system 100. A backup 1808 may comprise data required to rebuild the system/environment/application from configuration rules included in the backup and may include all application data. The back-up 1808 may be set up as an application or using similar or dissimilar hardware than the system 100. The back-up 1808 may be coupled to the system 100 by way of an in-band management connection 270, an out of band management connection 260 and/or a SAN connection 280 that may be selectively enabled and/or disabled, and/or converted to a one way read and/or write connection.

Figure 18B:
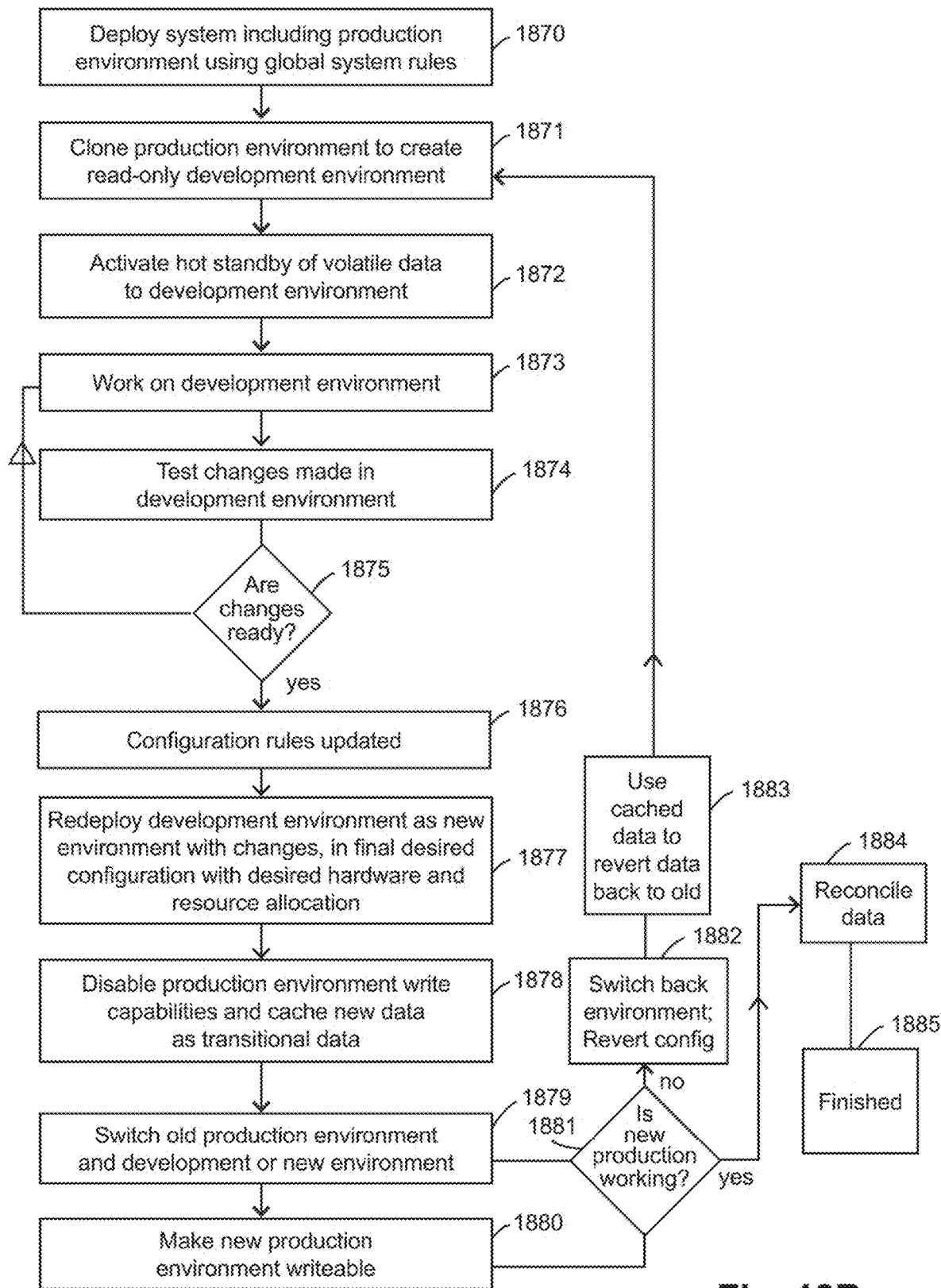

FIG. 18B is an example process flow illustrating the use of the FIG. 18A system in change management, particularly where the FIG. 18A system includes volatile data or where the database is writeable. Such database could be part of the storage resources used by an environment in the system. At step 1870, the system is deployed (including a production environment) using global system rules.

At step 1871, the production environment is then cloned using global system rules 210 including change management rules 1811, and resource allocation by the main controller 1801 or a controller in the cloned environment to create a read-only environment where the cloned environment is disabled from writing to the system. The cloned environment can then be used as a development environment.

At step 1872, a hot standyby 1820a is activated and allocated to the cloned environment 1807 for storing any volatile data being changed in the system 100. The cloned data is updated so that the new version in the development environment can be tested with updated data. The hot synched data may be turned off at any time. For example the hot synched data may be turned off when writing is being tested from the old environment or the production to the development environment.

At step 1873, the user may then work on changes using the cloned environment 1807 as a development environment. The changes to the development environment are then tested at step 1874. At step 1875, a determination is made as to whether the changed development environment is ready (typically such a determination is made by a developer). If step 1875 results in a determination that the changes are not ready, then the process flow may return to step 1873 for the user may go back and make other changes to the development environment. If step 1875 results in a determination that the changes are ready to go live, then the process flow proceeds to step 1876 where the configuration rules are updated in the system or controller with respect to the particular environment and will be used to deploy a new updated environment.

At step 1877, the development environment (or a new environment) may then be redeployed with the changes in a desired final configuration with desired resources and hardware allocation prior to going live. In the next step at 1878, the original production environment's write capabilities are disabled, and the original production environment becomes read-only. While the original production environment is read-only, any new data from the original production environment (or perhaps also the new production environment) may be cached and identified as transitional data as part of 1878. As an example, the data can be cached in a database server or other suitable location (e.g., a shared environment). The development environment (or new environment) and the old production environment are then switched at step 1879 so that the development environment (or new environment) becomes the production environment.

After this switch, the new production environment is made writable at step 1880. If the new production environment is deemed to be working at step 1881 as determined by a developer, then any data loss during the process of switching (where such data had been cached at step 1878) may be reconciled at step 1884 with data written to the new environment. After such reconciliation, the change is finished (step 1885).

If step 1881 results in a determination that the new production environment is not working (e.g., problems are identified that require the system to revert to the old system), then the environments are switched back at step 1882 so that the old production environment becomes the production environment again. As part of step 182, the configuration rules for the subject environment on the controller 1801 are reverted back to the previous version that had been used for the now reverted production environment.

At step 1883, changes in the database may be determined, e.g. using the cached data; and the data is restored to the old production environment with the old configuration rules. To support step 1883, a database can maintain a log of changes that were made to it, thereby permitting step 1883 to determine the changes that may need to be reversed. A back up database may be used to cache the data as described above where the cached data is tracked and clocked, and the clock can be reverted to determine what changes were made. Snapshots and logs may be used for this purpose.

After cached data is restored at 1883, the process may return to step 1871 if desired to begin again.

The example change management systems discussed herein may be used, for example, when upgrading, adding or removing hardware or software, when patching software, when system failures are detected, when migrating a host during hardware failures or detection, for dynamic resource migration, for changes of configuration rules or templates, and/or in making any other system related changes. The controller 1801 or system 100 may be configured to detect failures and may automatically implement change management rules or existing configuration rules onto other hardware available for the system to the controller upon detection of a failure. Examples of failure detection methods that may be used include but are not limited to: pinging hosts, querying applications and running various tests or test suites. Change management configuration rules described herein may be implemented when a failure is detected. Such rules may trigger automatic generation of back up environments, automatic migration of data or resources implemented by a controller when a failure is detected. Selection of back up resources may be based on resource parameters. Such resource parameters may include but are not limited to usage information, speed, configuration rules, and data capacity and use.

As described herein, any time a change occurs, the controller will create a log of it and what was actually executed. For security or system updating, a controller described herein may be configured to turn on and off automatically according to configuration rules and update the IT system state. It may turn resources off to save power. It may turn on or migrate resources for different efficiencies at different times. In the migration, the configuration rules are followed and backups or copies may be made of environments or systems. If there is a security breach a controller may separate and shut off an attacked area.

While the invention has been described above in relation to its example embodiments, various modifications may be made thereto that still fall within the invention's scope. Such modifications to the invention will be recognizable upon review of the teachings herein.

APPENDIX A: EXAMPLE STORAGE CONNECTION PROCESS

This describes an example process and example rules associated with sharing Storage Resources between multiple Systems. It should be understood that this is only an example of a storage connection process and that other techniques for connecting a compute resource to a storage resource could be used. Unless otherwise noted, these rules apply to all systems attempting to initiate a Storage Connection.

Definitions for this Appendix A

Storage Resource: A Block, File, or File System that can be shared via a Storage Transport.

Storage Transport: A method of sharing Storage Resources locally or remotely. Examples would be iSCSI/ISER, NVMEOF, NFS, Samba File Share.

System: Anything that could try to connect to a Storage Resource over a specified Storage Transport. Systems may support any number of Storage Transports, and may make their own decisions on which Transports to use.

Read-Only: Read-Only Storage Resources do not allow for modification of the data that they contain. This constraint is enforced by the Storage Daemon that handles exporting the Storage Resource on the Storage Transport. For additional insurance, some Datastores may set the Storage Resource backing data to be readonly (eg, setting an LVM LV as ReadOnly).

Read-Write (or Volatile): Read-Write (Volatile) Storage Resources are Storage Resources which may have their contents modified by Systems connecting to the Storage Resource.

Rules: There are a set of rules that must be adhered to when the Controller determines whether or not a System may connect to a given Storage Resource.
  1. Read-Write Storage Resources SHALL only be exported on a single Storage Transport.
  2. Read-Write Storage Resources SHALL only be connected to by a single System.
  3. Read-Write Storage Resources SHALL NOT be connected to as Read-Only.
  4. Read-Only Storage Resources MAY be exported on multiple Storage Transports.
  5. Read-Only Storage Resources MAY be connected to from multiple Systems.
  6. Read-Only Storage Resources SHALL NOT be connected to as Read-Write.

Process
If we are to think of the Connection Process as a function, it would take 2 arguments:
  1. Storage Resource ID
  2. List of Supported Storage Transports (prioritized by order)

First, we determine if the requested Storage Resource is Read-Only or Read-Write.

If it is Read-Write, we have to check to see if the Storage Resource is already connected to, since we limit Read-Write Storage Resources to a single connection. If it does already have a connection, then we make sure that the System requesting the Storage Resource is the currently connected System (this would happen in the case of a reconnect, for example). Otherwise, we error out since multiple Systems cannot connect to the same Read-Write Storage Resource. If the requesting System is the System that is connected to this Storage Resource, then we make sure that one of the available Storage Transports matches the current Export for this Storage Resource. If it does, we pass the connection information to the requesting System. If it does not, we error out, as we cannot serve a Read-Write Storage Resource on multiple Storage Transports.

For Read-Only and non-connected Read-Write Storage Resources, we iterate over the list of supplied Storage Transports, and attempt to export the Storage Resource using that Transport. If the export fails, we continue through the list until we succeed or run out of Storage Transports. If we run out, we inform the requesting System that the Storage Resource could not be connected to. On a successful export, we store the connection information, and the new (resource, transport)=> (System) relation in the database. The requesting System is then passed the Storage Transport connection info.

Systems: Storage Connection is currently performed by the Controller and the Compute Daemon during normal operation. However, future iterations may have Services connecting directly to the Storage Resources and bypassing the Compute Daemon. This could be a requirement for an example Service Physical Deployment and it makes sense to use the same process for Virtual Machine Deployment as well.

APPENDIX B: EXAMPLE CONNECTION TO OVERLAYFS

Services utilize OverlayFS to reuse common file system objects, and reduce Service Package size.

A Service in this example comprises 3 or more Storage Resources:
1. Platform. This contains the base linux filesystem and is accessed Read Only.
2. Service. This contains all software directly related to the operation of the Service (NetThunder ServiceDaemon, OpenRC scripts, binaries, etc). This Storage Resource is accessed Read Only.
3. Volatile. These Storage Resources contains all changes to the system, and are managed by LVM from within the Service (for Physical, Container, and Virtual Machine deployment).

When run in a virtual machine, Services are Direct Kernel Booted in Qemu using a custom Linux Kernel with an initramfs that contains logic to do the following:
1. Assemble the LVM Volume Group (VG) from the available read-write disks
    This VG contains one Logical Volume (LV) that contains all the volatile storage data for the Service.
2. Mount the Platform, Service, and LV
3. Combine the three filesystems using a union Filesystem (in our case, OverlayFS).

The same process can be used for Physical Deployment. One option is to remotely provide the Kernel to a lightweight OS booted via PXEBoot or IPMI ISO Boot, and then kexec into the new, real kernel. Or to skip the lightweight OS, and PXE boot directly into our Kernel. Such a system may require additional logic in the Kernel initramfs to connect to the Storage Resources.

The OverlayFS configuration can look like FIG. 19.

Due to some restrictions with OverlayFS, we allow for a special directory '/data' to be marked as "out of tree". This directory is available to the Service if it creates a '/data' directory when the Service Package is created. This special directory is mounted via 'mount-rbind' to allow access to a subset the volatile layer that is not inside the OverlayFS. This is required for applications such as NFS (Network File System) which do not support sharing directories that are a part of OverlayFS.

FIG. 20 shows a Kernel Filesystem layout.

We create the/new_root directory, and use that as the target for configuring our OverlayFS. Once the OverlayFS has been configured, we exec_root into/new_directory and the system starts as normal with all available resources.

What is claimed is:

1. A computer system comprising:
    a controller;
    a plurality of templates;
    a system state;
    a physical compute resource; and
    an out of band management connection;
    wherein the controller is configured to provide automated management of infrastructure for the computer system based on the system rules, the templates, and the system state;
    wherein the controller is configured to (1) add a storage resource to the computer system and (2) update the system state with (i) a location of the storage resource within the computer system and (ii) a transport type of the storage resource;
    wherein the controller or the physical compute resource is configured to query the system state for the location of the storage resource and the transport type of the storage resource;
    wherein the controller is configured to couple the storage resource to the physical compute resource based on a response to the query;
    wherein the controller is configured to instruct the physical compute resource to boot from the storage resource; and
    wherein the physical compute resource is configured to boot from the storage resource by way of the out of band management connection.

2. The system of claim 1 wherein the controller is configured to use the out of band management connection to configure a BIOS of the physical compute resource.

3. The system of claim 2 wherein at least one of the templates comprises BIOS settings for configuring the BIOS.

4. The system of claim 1 wherein the controller is configured to process a template from among the templates to derive an image to boot the storage resource.

5. The system of claim 1 wherein the controller is configured to add the physical compute resource to the computer system by sending an image to the physical compute resource.

6. The system of claim 1 wherein the controller is configured to process a template from among the templates to derive an image to power on the storage resource.

7. The system of claim 1 wherein the controller is configured to process a template from among the templates to derive an image to enable the storage resource.

8. The system of claim 1 wherein the physical compute resource comprises hardware that provides computing, storage, caching, networking, or specialized computing.

9. The system of claim 1 wherein the physical compute resource comprises a GPU.

10. The system of claim 1 wherein the physical compute resource comprises a co-processor.

11. The system of claim 1 wherein the physical compute resource comprises an ASIC.

12. The system of claim 1 wherein the physical compute resource comprises an FPGA.

13. The system of claim 1 wherein the physical compute resource comprises a plurality of physical compute resources.

14. The system of claim 3 wherein the controller is configured to (1) add the physical compute resource to the computer system, (2) instruct the added physical compute resource to boot, and (3) track the added and booted physical compute resource in the system state.

15. A computer system comprising:
a controller;
a plurality of system rules;
a plurality of templates;
a system state;
a physical compute resource; and
a storage area network (SAN);
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource;
wherein the controller or the physical compute resource is configured to query the system state for the location of the storage resource and the transport type of the storage resource;
wherein the controller is configured to couple the storage resource to the physical compute resource based on a response to the query;
wherein the controller is configured to instruct the physical compute resource to boot from the storage resource; and
wherein the physical compute resource is configured to boot from the storage resource by way of the SAN.

16. A computer system comprising:
a controller;
a plurality of system rules;
a plurality of templates;
a system state;
a physical compute resource; and
an in band management connection;
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource;
wherein the controller or the physical compute resource is configured to query the system state for the location of the storage resource and the transport type of the storage resource;
wherein the controller is configured to couple the storage resource to the physical compute resource based on a response to the query;
wherein the controller is configured to instruct the physical compute resource to boot from the storage resource; and
wherein the physical compute resource is configured to boot from the storage resource by way of the in band management connection.

17. The system of claim 16 further comprising a network connection, and wherein the physical compute resource is configured to boot from the storage resource by way of the network connection.

18. A computer system comprising:
a controller;
a plurality of system rules;
a plurality of templates;
a system state; and
a storage area network (SAN);
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource;
wherein the controller is configured to add a physical compute resource to the computer system by sending an image to the physical compute resource;
wherein the controller is configured to send the image to the physical compute resource by way of the SAN;
wherein the controller or the physical compute resource is configured to query the system state for the location of the storage resource and the transport type of the storage resource; and
wherein the controller is configured to couple the storage resource to the physical compute resource based on a response to the query.

19. A computer system comprising:
a controller;
a plurality of system rules;
a plurality of templates;
a system state; and
an out of band management connection;
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource;
wherein the controller is configured to add a physical compute resource to the computer system by sending an image to the physical compute resource;
wherein the controller is configured to send the image to the physical compute resource by way of the out of band management connection;
wherein the controller or the physical compute resource is configured to query the system state for the location of the storage resource and the transport type of the storage resource; and wherein the controller is configured to couple the storage resource to the physical compute resource based on a response to the query.

20. The system of claim 19 wherein the controller is configured to process a template from among the templates to derive an image to boot the storage resource, power on the storage resource, or enable the storage resource.

21. The system of claim 19 wherein the controller is configured to add the physical compute resource to the computer system with a PCI express switch.

22. The system of claim 21 further comprising the PCI express switch.

23. A computer system comprising:
a controller;
a plurality of system rules;
a plurality of templates;
a system state;
a physical compute resource; and
a storage area network (SAN);
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource;
wherein the controller or the physical compute resource is configured to query the system state for the location of the storage resource and the transport type of the storage resource;
wherein the controller is configured to couple the storage resource to the physical compute resource based on a response to the query;
wherein the controller is configured to couple the physical compute resource and the storage resource to the SAN; and
wherein the controller is configured to use the SAN to boot the physical compute resource.

24. The system of claim 23 further comprising an out of band management connection, and wherein the controller is configured to configure a BIOS of the physical compute resource through the out of band management connection.

25. A computer system comprising:
a controller;
a plurality of system rules;
a plurality of templates;
a system state;
a resource; and
a physical compute resource;
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource;
wherein the controller or the physical compute resource is configured to query the system state for the location of the storage resource and the transport type of the storage resource;
wherein the controller is configured to couple the storage resource to the physical compute resource based on a response to the query;
wherein the controller is configured to send an image from a template from among the templates to the resource; and
wherein the physical compute resource is configured to boot off the image sent to the resource.

26. The system of claim 25 wherein the resource to which the image is sent is the storage resource.

27. The system of claim 25 wherein the controller is configured to instruct where the image to be used for booting is located.

28. The system of claim 25 wherein the resource to which the image is sent is a different resource than the storage resource and the physical compute resource.

29. A computer system comprising:
a controller;
a plurality of system rules;
a plurality of templates;
a system state;
a resource;
a physical compute resource; and
a storage area network (SAN);
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource;
wherein the controller or the physical compute resource is configured to query the system state for the location of the storage resource and the transport type of the storage resource;
wherein the controller is configured to couple the storage resource to the physical compute resource based on a response to the query; and
wherein the physical compute resource is configured to boot off an image loaded, by way of the SAN, to the resource from a template from among the templates.

30. A computer system comprising:
a controller;
a plurality of system rules;
a plurality of templates;
a system state;
a resource;
a physical compute resource; and
a network connection;
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource;
wherein the controller or the physical compute resource is configured to query the system state for the location of the storage resource and the transport type of the storage resource;
wherein the controller is configured to couple the storage resource to the physical compute resource based on a response to the query; and
wherein the physical compute resource is configured to boot off an image that is loaded to the resource through the network connection.

31. The system of claim 30 wherein the controller is configured to process a template from among the templates to derive an image to boot the storage resource, power on the storage resource, or enable the storage resource.

32. A computer system comprising:
a controller;
a plurality of system rules;
a plurality of templates; and
a system state;
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource;
wherein the controller is configured to (1) add a physical compute resource to the computer system, (2) instruct the added physical compute resource to boot, and (3) track the added and booted physical compute resource in the system state;
wherein the controller or the physical compute resource is configured to query the system state for the location of the storage resource and the transport type of the storage resource; and
wherein the controller is configured to couple the storage resource to the physical compute resource based on a response to the query.

33. The system of claim 32 wherein the controller is configured to add the physical compute resource to the computer system with a PCI express switch.

34. The system of claim 33 further comprising the PCI express switch.

35. The system of claim 32 wherein the physical compute resource comprises hardware that provides computing, storage, caching, networking, or specialized computing.

36. The system of claim 35 wherein the physical compute resource is dynamically added to the computer system by the controller.

37. The system of claim 32 wherein the physical compute resource comprises a GPU.

38. The system of claim 32 wherein the physical compute resource comprises a co-processor.

39. The system of claim 32 wherein the physical compute resource comprises an ASIC.

40. The system of claim 32 wherein the physical compute resource comprises an FPGA.

41. The system of claim 32 wherein the controller is configured to send an image from a template from among the templates to a resource of the computer system, the image for use in adding the physical compute resource to the computer system;
wherein the image is loaded onto the resource through a network connection;
wherein the physical compute resource is configured to (1) receive instructions for booting from the controller via an out of band management connection or the network connection, (2) initiate booting based on the received instructions, (3) receive the image from the resource via the network connection, and (4) boot based on the received image.

42. The system of claim 41 wherein the resource to which the image is sent comprises the physical compute resource, the storage resource, or another resource of the computer system.

43. The system of claim 32 wherein the controller is configured to process a template from among the templates to derive an image to boot the physical compute resource;
wherein the image is sent to a resource of the computer system (1) through a network connection or (2) indirectly by way of another resource of the computer system;
wherein the resource to which the image is sent comprises (1) the storage resource or (2) a different resource of the computer system than the storage resource and the physical compute resource;
wherein the controller is configured to instruct where the image to be used for booting the physical compute resource is located; and
wherein the physical compute resource is configured to (1) power on by way of an out of band management connection and (2) boot from a storage area network using the image sent to the resource.

44. A computer system comprising:
a controller;
a plurality of system rules;
a plurality of templates;
a system state; and
a physical compute resource;
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource, wherein the transport type is an internet small computer system interface (iscsi);
wherein the controller or the physical compute resource is configured to query the system state for the location of the storage resource and the transport type of the storage resource; and
wherein the controller is configured to couple the storage resource to the physical compute resource based on a response to the query.

45. A computer system comprising:
a controller;
a plurality of system rules;
a plurality of templates;
a system state; and
a physical compute resource;
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource, wherein the transport type is non volatile memory express over fabrics (nvmeof);
wherein the controller or the physical compute resource is configured to query the system state for the location of the storage resource and the transport type of the storage resource; and
wherein the controller is configured to couple the storage resource to the physical compute resource based on a response to the query.

46. A computer system comprising:
a controller;
a plurality of system rules;
a plurality of templates;
a system state; and
a physical compute resource;
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource;
wherein the controller or the physical compute resource is configured to query the system state for the location of the storage resource and the transport type of the storage resource;
wherein the controller is configured to couple the storage resource to the physical compute resource based on a response to the query; and
wherein the system rules comprise self-assembly rules, wherein the self-assembly rules include rules that are configured to assemble infrastructure of the computer system without requiring an external planning document.

47. A computer system comprising:
a controller;
a plurality of system rules;
a plurality of templates;
a system state; and
an in band management connection;
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource;
wherein the controller is configured to add a physical compute resource to the computer system by sending an image to the physical compute resource;
wherein the controller is configured to send the image to the physical compute resource by way of the in band management connection;
wherein the controller or the physical compute resource is configured to query the system state for the location of the storage resource and the transport type of the storage resource; and
wherein the controller is configured to couple the storage resource to the physical compute resource based on a response to the query.

48. The system of claim 47 wherein the controller is configured to process a template from among the templates to derive an image to boot the storage resource, power on the storage resource, or enable the storage resource.

49. The system of claim 47 wherein the controller is configured to add the physical compute resource to the computer system with a PCI express switch.

50. The system of claim 49 further comprising the PCI express switch.

51. A computer system comprising:
a controller;
a plurality of system rules;
a plurality of templates;
a system state; and
a network connection;
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource;
wherein the controller is configured to add a physical compute resource to the computer system by sending an image to the physical compute resource;
wherein the controller is configured to send the image to the physical compute resource by way of the network connection;
wherein the controller or the physical compute resource is configured to query the system state for the location of the storage resource and the transport type of the storage resource; and
wherein the controller is configured to couple the storage resource to the physical compute resource based on a response to the query.

52. The system of claim 51 wherein the controller is configured to process a template from among the templates to derive an image to boot the storage resource, power on the storage resource, or enable the storage resource.

53. The system of claim 51 wherein the controller is configured to add the physical compute resource to the computer system with a PCI express switch.

54. The system of claim 53 further comprising the PCI express switch.

55. A computer system comprising:
a controller;
a plurality of system rules;
a plurality of templates;
a system state;
a physical compute resource; and
another resource;
wherein the controller is configured to provide automated management of infrastructure for the computer system based on the system rules, the templates, and the system state;
wherein the controller is configured to (1) add a storage resource to the computer system and (2) update the system state with (i) a location of the storage resource within the computer system and (ii) a transport type of the storage resource;
wherein the controller or the physical compute resource is configured to query the system state for the location of the storage resource and the transport type of the storage resource;
wherein the controller is configured to couple the storage resource to the physical compute resource based on a response to the query; and
wherein the physical compute resource is configured to boot off an image that is loaded indirectly to the physical resource by way of the another resource.

56. The system of claim 55 wherein the controller is configured to process a template from among the templates to derive an image to boot the storage resource, power on the storage resource, or enable the storage resource.

* * * * *